(12) United States Patent
Lin

(10) Patent No.: US 12,317,864 B2
(45) Date of Patent: Jun. 3, 2025

(54) BODY-WORN STRUCTURE

(71) Applicant: Che-Wen Lin, New Taipei (TW)

(72) Inventor: Che-Wen Lin, New Taipei (TW)

( * ) Notice: Subject to any disclaimer, the term of this patent is extended or adjusted under 35 U.S.C. 154(b) by 0 days.

(21) Appl. No.: 17/823,884

(22) Filed: Aug. 31, 2022

(65) Prior Publication Data

US 2022/0408891 A1    Dec. 29, 2022

Related U.S. Application Data

(60) Continuation-in-part of application No. 16/847,421, filed on Apr. 13, 2020, now Pat. No. 11,457,706, which is a continuation-in-part of application No. 15/884,928, filed on Jan. 31, 2018, now abandoned, which is a continuation-in-part of application No. 14/723,149, filed on May 27, 2015, now Pat. No. 9,913,515, which is a division of application No. 13/652,330, filed on Oct. 15, 2012, now abandoned, which is a continuation-in-part of application No. 12/955,678, filed on Nov. 29, 2010, now abandoned, (Continued)

(30) Foreign Application Priority Data

May 30, 2008   (CN) .......................... 200810028408.4
Feb. 11, 2020  (TW) ................................. 109104316

(51) Int. Cl.
   *A01K 27/00*        (2006.01)
(52) U.S. Cl.
   CPC .......... *A01K 27/002* (2013.01); *A01K 27/008* (2013.01)

(58) Field of Classification Search
   CPC .... A01K 27/00; A01K 27/001; A01K 27/005; A01K 27/008; A01K 13/006
   See application file for complete search history.

(56) References Cited

U.S. PATENT DOCUMENTS

| 798,320 | A | * | 8/1905 | Carli | ..................... A01K 13/008 54/79.2 |
| 1,595,834 | A | * | 8/1926 | Griffiths | ............... A01K 13/006 119/855 |
| 3,061,057 | A | | 10/1962 | Miller | |

(Continued)

FOREIGN PATENT DOCUMENTS

| CN | 2101393 U | 4/1992 |
| CN | 2756055 Y | 2/2006 |

(Continued)

*Primary Examiner* — Monica L Perry
*Assistant Examiner* — Aaron M Rodziwicz
(74) *Attorney, Agent, or Firm* — Taiwan Intellectual Property Agent Co, Ltd.

(57) ABSTRACT

A body-worn structure includes a support enclosure provided with a front harness, the front harness is provided with a first traverse belt and a second transverse belt, the first traverse belt is connected with the second traverse belt. Two ends of the first traverse belt are respectively fitted with left and right female buckles. Two ends of the second traverse belt are respectively fitted with a second traverse belt male buckle and a corresponding second traverse belt female buckle to facilitate clasping each other together; either side of the second traverse belt male buckle or the second traverse belt female buckle is provided with at least a fixing ring; the second traverse belt female buckle is replaceable alternatively by the second traverse belt male buckle and vise versa.

2 Claims, 43 Drawing Sheets

Related U.S. Application Data and a continuation of application No. PCT/CN2009/000596, filed on May 27, 2009.

(56) References Cited

U.S. PATENT DOCUMENTS

| | | | |
|---|---|---|---|
| 4,081,061 A | 3/1978 | Tucker | |
| 4,117,874 A | 10/1978 | Berenguer | |
| 4,566,255 A * | 1/1986 | DeGroot | A01K 27/002 |
| | | | 119/831 |
| 5,146,875 A * | 9/1992 | Bolt | A01K 27/007 |
| | | | 119/860 |
| 5,167,203 A * | 12/1992 | Scott | A01K 27/002 |
| | | | 297/485 |
| 5,184,762 A * | 2/1993 | Nevitt | A01K 27/002 |
| | | | 119/858 |
| 5,297,835 A * | 3/1994 | Wengler | B63H 20/36 |
| | | | 294/157 |
| 5,443,037 A * | 8/1995 | Saleme | A01K 27/002 |
| | | | 297/473 |
| 5,511,515 A * | 4/1996 | Brown | A01K 27/002 |
| | | | 119/864 |
| 5,531,187 A * | 7/1996 | Ward | B62J 11/20 |
| | | | 119/856 |
| 5,544,792 A | 8/1996 | Arnwine | |
| 5,632,235 A * | 5/1997 | Larsen | A01K 27/006 |
| | | | 119/858 |
| 5,644,902 A * | 7/1997 | Kemp | B68C 1/00 |
| | | | 119/858 |
| D383,255 S * | 9/1997 | Caditz | D30/145 |
| D384,780 S * | 10/1997 | McLaughlin | D30/162 |
| 5,738,043 A * | 4/1998 | Manuel | A01K 1/029 |
| | | | 119/497 |
| 5,743,448 A | 4/1998 | Tsai | |
| 5,774,912 A * | 7/1998 | Dominique | A47K 10/02 |
| | | | 5/419 |
| 5,819,999 A | 10/1998 | Tennant | |
| 5,887,772 A * | 3/1999 | Dooley | A01K 27/008 |
| | | | 119/858 |
| 5,896,831 A * | 4/1999 | Alpert | A61D 9/00 |
| | | | 119/856 |
| 5,937,794 A * | 8/1999 | Hediger | B68B 3/00 |
| | | | 119/856 |
| 5,964,384 A | 10/1999 | Young | |
| D429,390 S * | 8/2000 | Grady | D30/152 |
| D429,391 S * | 8/2000 | Grady | D30/152 |
| 6,279,706 B1 | 8/2001 | Mao | |
| 6,305,587 B1 | 10/2001 | Miller | |
| 6,530,507 B2 | 3/2003 | Oh | |
| 6,571,745 B2 * | 6/2003 | Kerrigan | A01K 27/002 |
| | | | 119/858 |
| D480,843 S * | 10/2003 | Sullivan | A01K 27/008 |
| | | | D30/152 |
| 6,637,367 B1 * | 10/2003 | Dost | A01K 27/006 |
| | | | 119/28.5 |
| 6,640,751 B1 * | 11/2003 | Cool | A01K 15/027 |
| | | | 119/728 |
| D483,940 S | 12/2003 | Dolan | |
| 6,679,198 B1 * | 1/2004 | LaGarde | A01K 27/006 |
| | | | 119/858 |
| 6,802,282 B2 * | 10/2004 | Muckleroy | A01K 1/029 |
| | | | 119/725 |
| 6,923,352 B2 | 8/2005 | Oh | |
| 7,225,483 B1 * | 6/2007 | Remblad | H04W 4/12 |
| | | | 5/419 |
| 7,395,930 B2 | 7/2008 | Tauchen | |
| 7,617,956 B1 | 11/2009 | Sabbah | |
| 7,918,192 B1 | 4/2011 | Digh et al. | |
| 8,256,045 B2 | 9/2012 | Cruz | |
| 8,292,136 B2 | 10/2012 | Tonelli | |
| 8,336,506 B2 * | 12/2012 | Zimmerman | A01K 1/0263 |
| | | | 119/856 |
| 8,490,230 B2 | 7/2013 | Rovin | |
| 8,820,596 B1 | 9/2014 | Bergquist | |
| 9,320,260 B2 * | 4/2016 | Zimmerman | A01K 27/003 |
| 9,913,515 B2 | 3/2018 | Lin | |
| 2002/0121248 A1 * | 9/2002 | Rooks | A01K 15/04 |
| | | | 119/856 |
| 2003/0066494 A1 * | 4/2003 | Hippensteel | A01K 27/003 |
| | | | 119/792 |
| 2003/0079695 A1 * | 5/2003 | Kerrigan | A01K 27/006 |
| | | | 119/858 |
| 2005/0028755 A1 * | 2/2005 | Le Fevre | A01K 23/00 |
| | | | 119/868 |
| 2005/0072376 A1 * | 4/2005 | Kerrigan | A01K 13/006 |
| | | | 119/850 |
| 2005/0076853 A1 * | 4/2005 | Leo | A01K 1/0254 |
| | | | 119/497 |
| 2005/0236102 A1 | 10/2005 | Griffith et al. | |
| 2005/0263102 A1 * | 12/2005 | Sherman | A01K 1/0263 |
| | | | 119/792 |
| 2006/0090711 A1 * | 5/2006 | Richards | A01K 1/0263 |
| | | | 119/850 |
| 2007/0012732 A1 * | 1/2007 | Adams | A01K 27/008 |
| | | | 224/148.2 |
| 2007/0102460 A1 | 5/2007 | Lottman | |
| 2007/0245979 A1 * | 10/2007 | Millan | A01K 27/001 |
| | | | 119/864 |
| 2008/0184943 A1 * | 8/2008 | Brauer | A01K 27/002 |
| | | | 119/792 |
| 2008/0276880 A1 * | 11/2008 | Swisher | A01K 27/002 |
| | | | 119/728 |
| 2008/0289587 A1 * | 11/2008 | Millan | A01K 27/002 |
| | | | 119/864 |

FOREIGN PATENT DOCUMENTS

| | | | | |
|---|---|---|---|---|
| CN | 101336768 A | | 1/2009 | |
| CN | 201274838 Y | | 7/2009 | |
| DE | 4436845 A1 | | 4/1996 | |
| DE | 29614835 U1 | | 3/1997 | |
| GB | 2157937 A | * | 11/1985 | ........ A01K 1/0263 |
| GB | 2393112 A | | 3/2004 | |
| JP | H09206117 A | | 8/1997 | |
| TW | 1577309 B | | 4/2017 | |
| WO | WO-9202128 A | * | 2/1992 | ........ A01K 1/0263 |

* cited by examiner

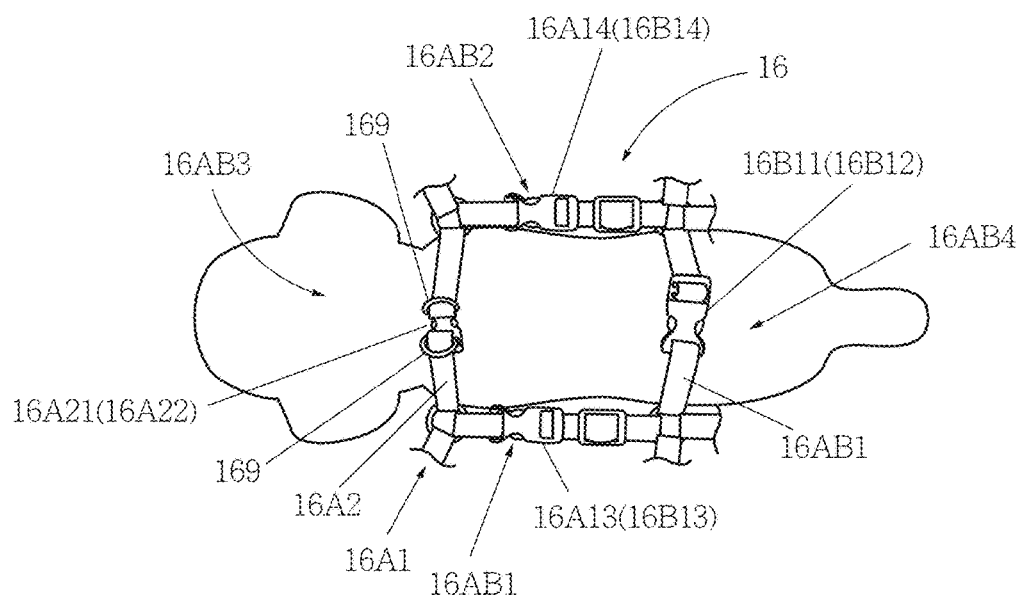
FIG. 4
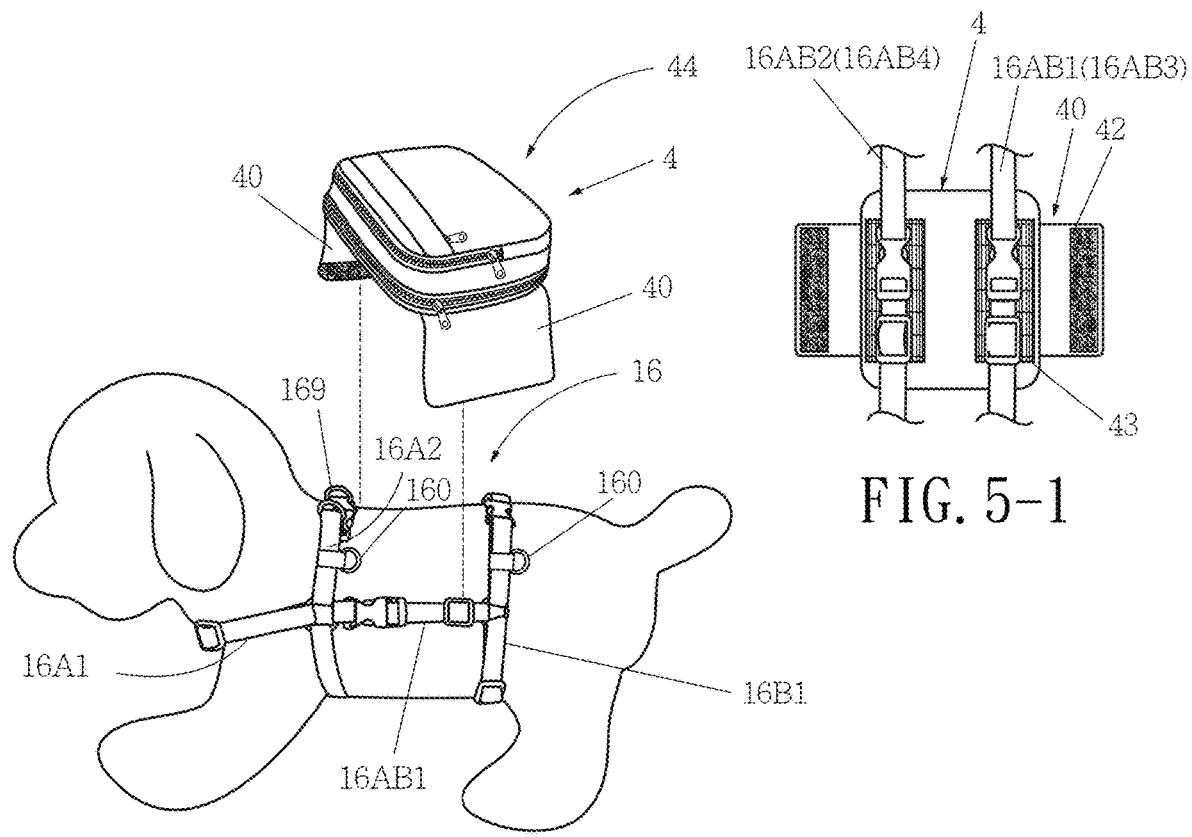
FIG. 5-1
FIG. 5

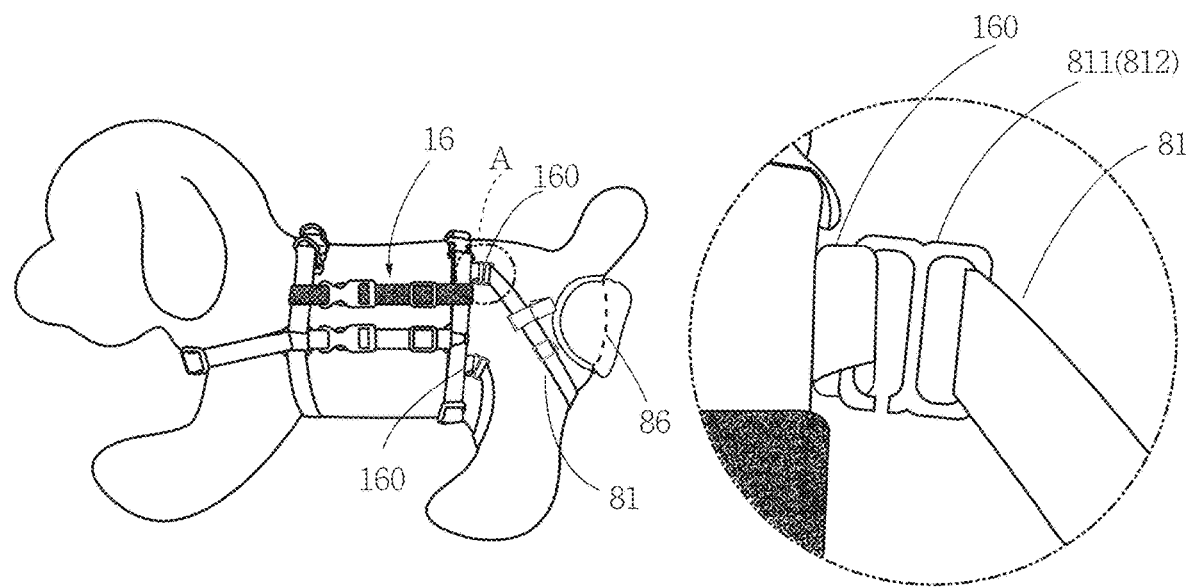
FIG. 16
FIG. 16A
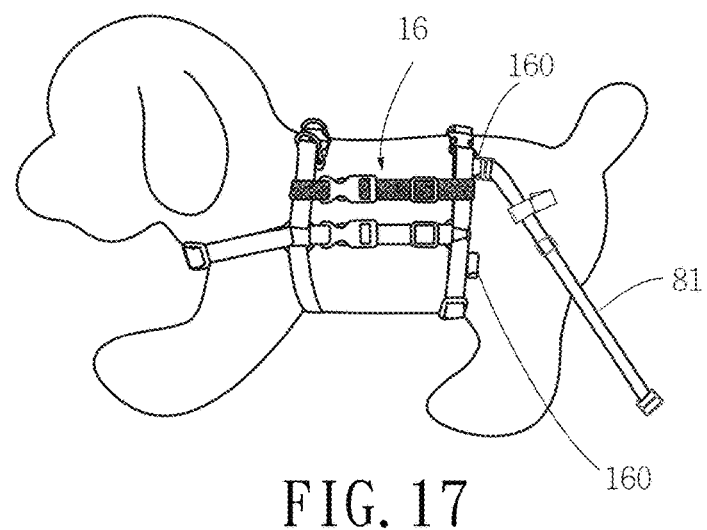
FIG. 17

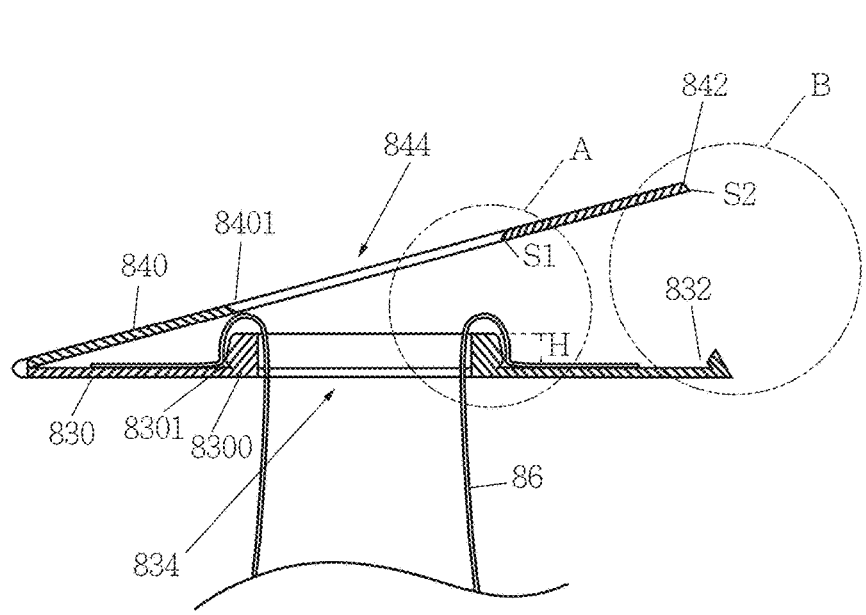
FIG. 24
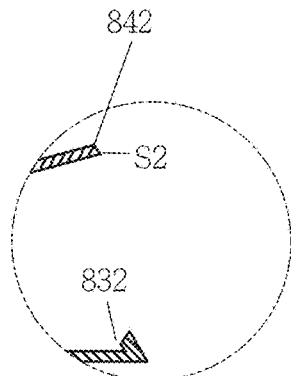
FIG. 24B
FIG. 24A
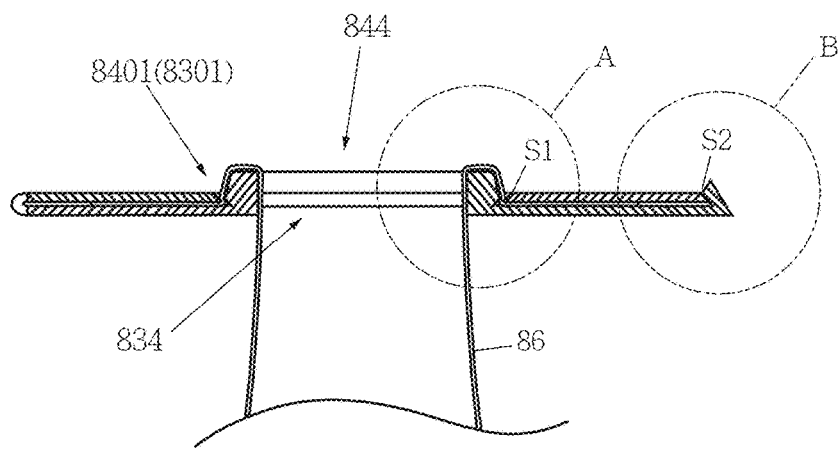
FIG. 25
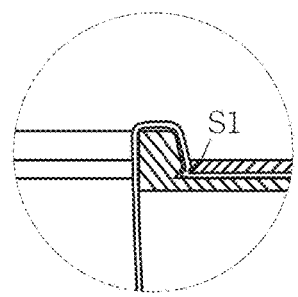
FIG. 25B
FIG. 25A

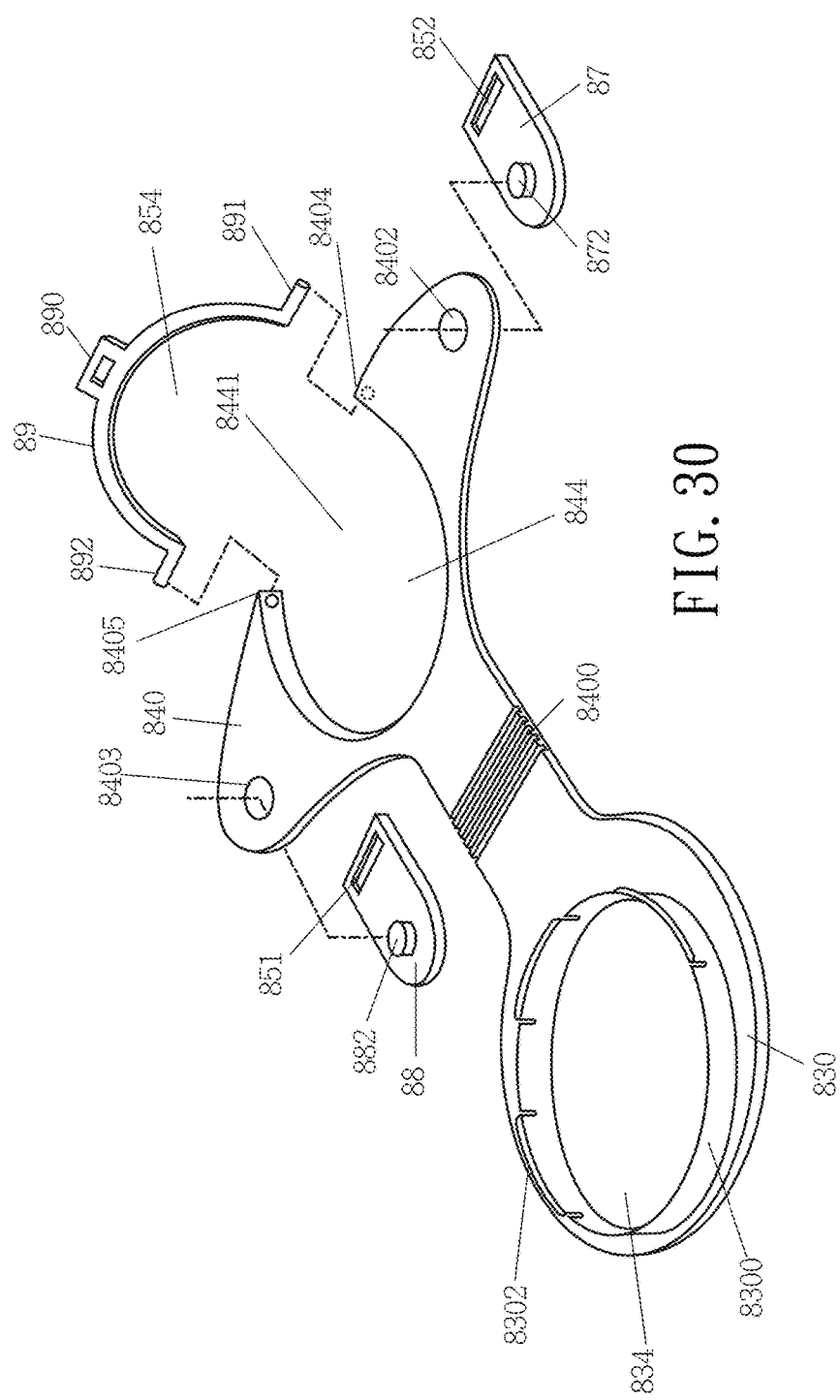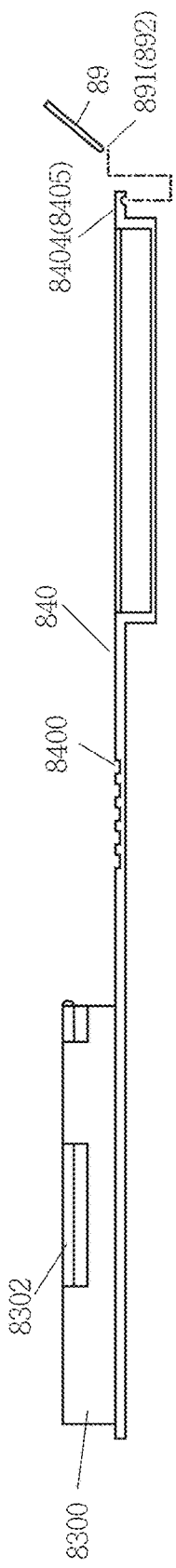

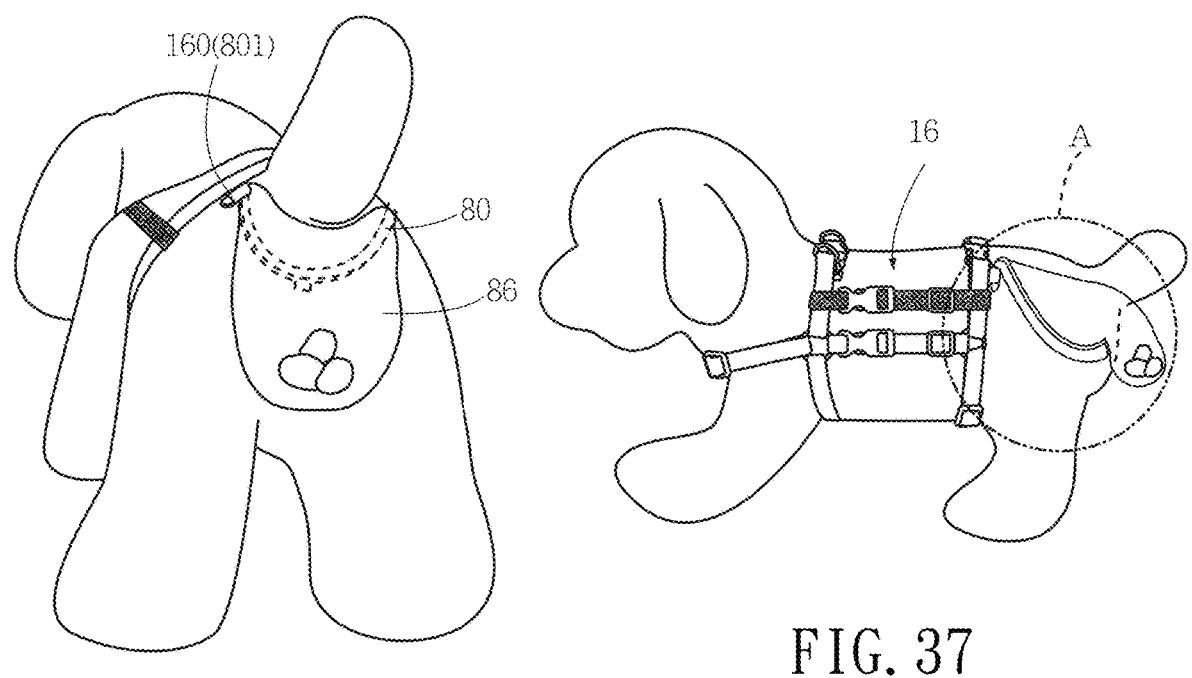
FIG. 36
FIG. 37
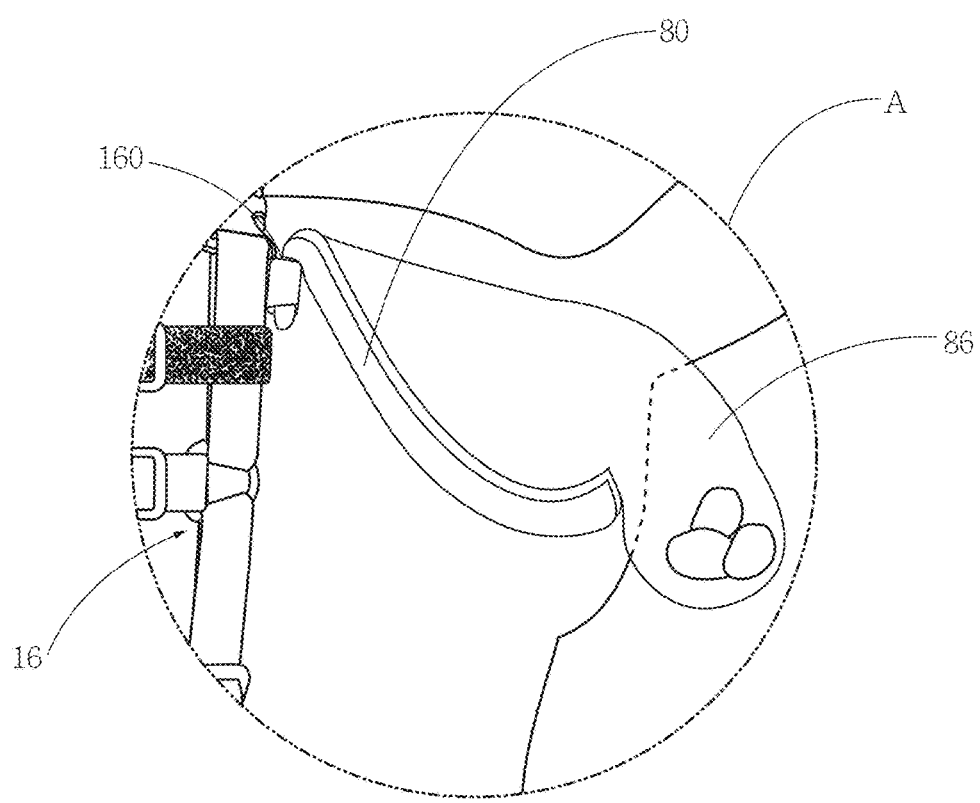
FIG. 37A

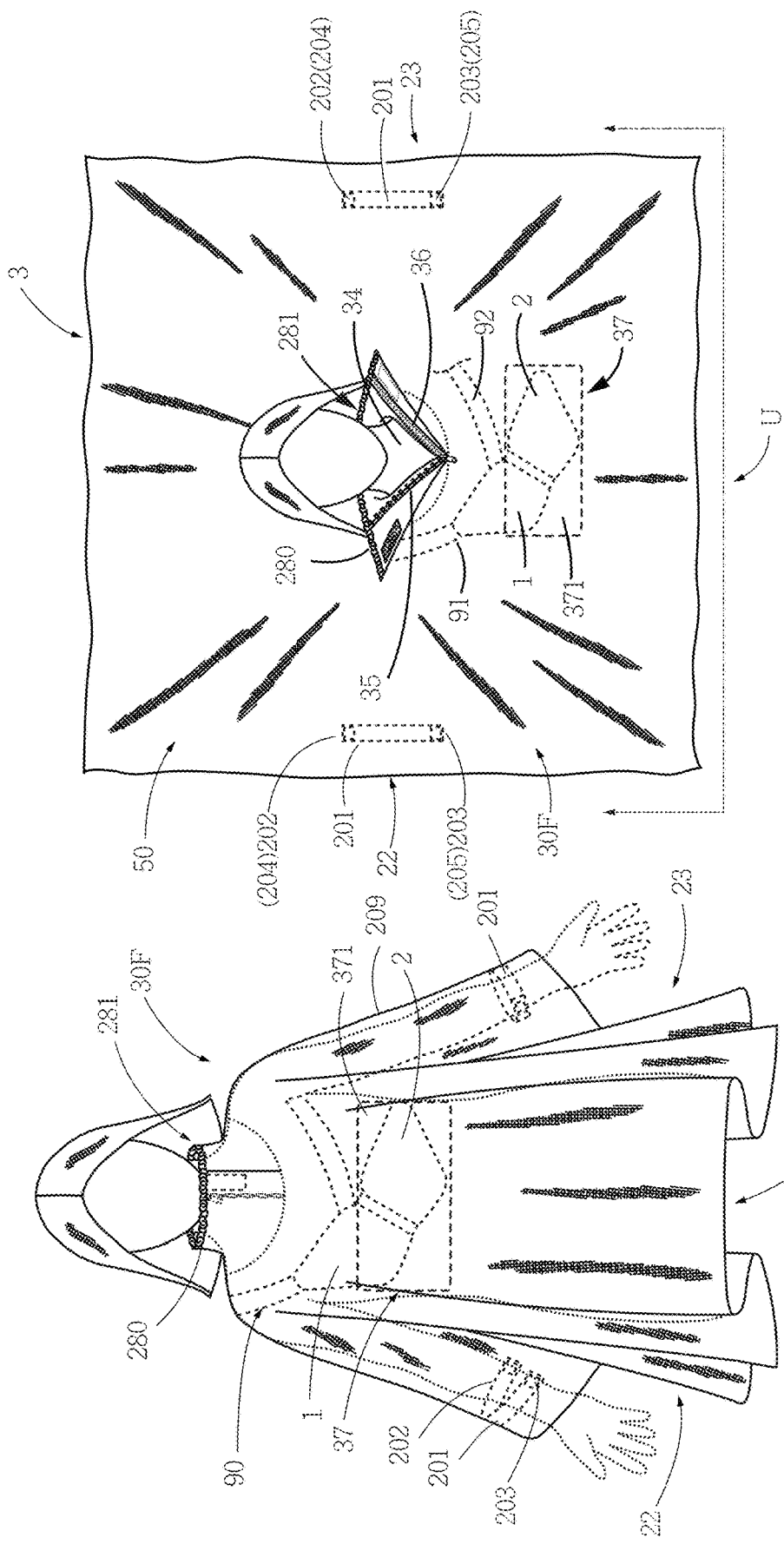

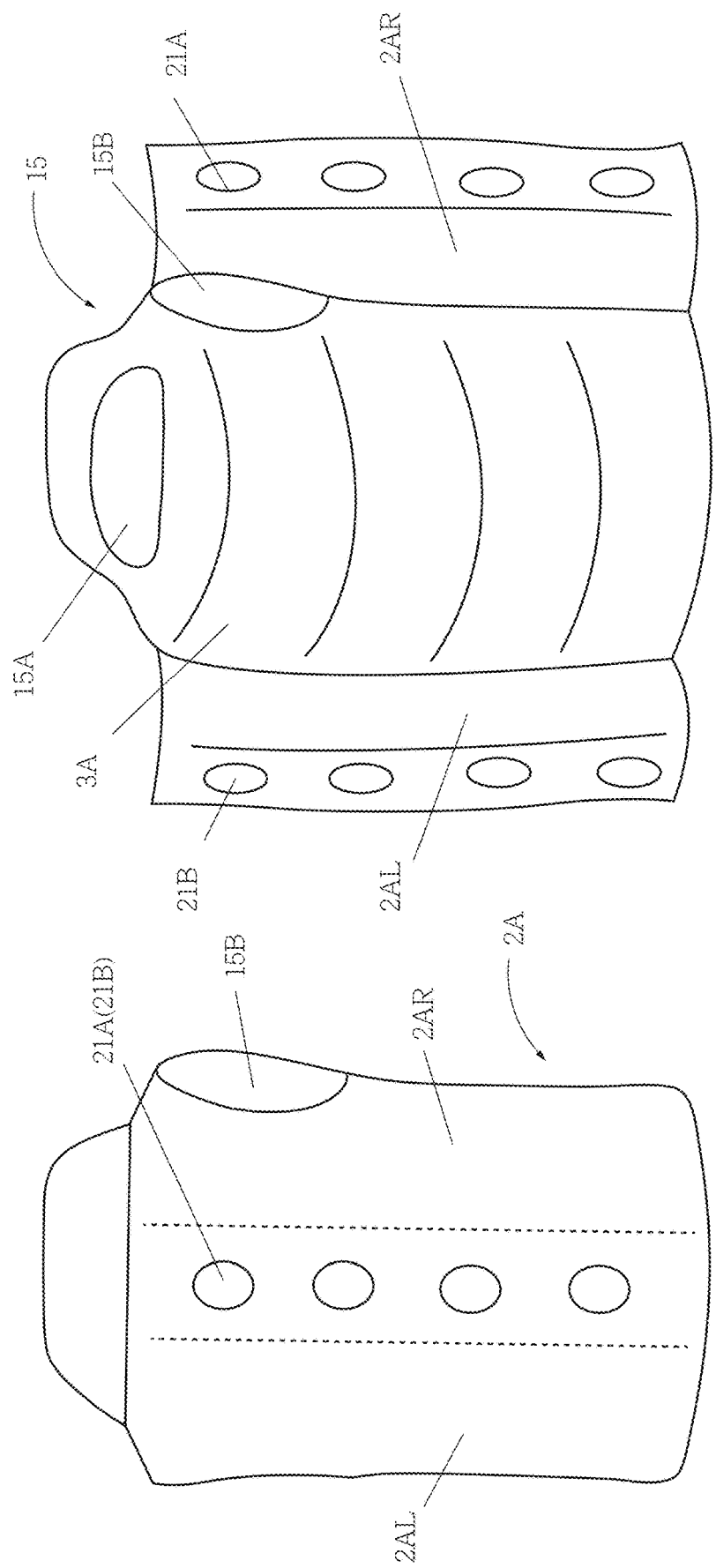

BODY-WORN STRUCTURE

RELATED APPLICATION

This application is a Continuation-in-Part of currently pending U.S. patent application Ser. No. 16/847,421 filed on 2020 Apr. 13.

BACKGROUND OF THE INVENTION

(a) Field of the Invention

The present invention relates to a body-worn structure, and more particularly to a structure that uses a support enclosure or a jacket body with combined multiple functions to facilitate the user in meeting the various different needs for outdoor activities.

(b) Description of the Prior Art

The body-worn structure not only apply to people but also can be applied in pet supplies, for examples, rain covering body, traction rope breast strap and droppings collector for pet. The existing droppings collector for pet use available in the market, which primarily relative to a holding device that is clipped onto a dog's tail, and a paper bag or a plastic bag is concurrently securely fixed to the holding device corresponding to the position of the dog's anus to receive droppings, whereby, when the dog is defecating and discharging the droppings onto the floor, the droppings collector can prevent not only impacting environmental sanitation but also troubling the pet owner to clean up the excrement. Because the aforementioned conventional holding device needs to be firmly clipped onto the dog's tail, apart from causing discomfort to the dog, when the dog is wagging its tail, the paper bag or a plastic bag used to receive the dog droppings at the same time when swinging along with the wagging tail, thus affecting use effectiveness and degree of difficulty in use. Furthermore, the structure of the holding device can only be applied to long tailed dogs, meaning the holding device cannot be used on other short-tailed or tailless dogs, and is thus extremely unideal.

Apart from applying embodiments of the flexible enclosure for pets, the present invention can also apply a structure using the same principle for the body-worn structure to cover a variety of target subjects, including people and other animals. Moreover, apart from the above-described covering body having waterproof and windproof functions, the application range of the body-worn structure further includes application in body protective devices for either protective clothing, hollow sphere, hollow airbag, or airbag clothing.

For a bike, scooter or motorcycle rider, a conventional raincoat or windbreaker is usually folded and then put into a storage compartment of the vehicles. When there is unexpected heavy rain in a rainy season, the rider must stop the vehicle and have it parked by a road side before opening the storage compartment and fetching the raincoat. The rider then puts on the raincoat and restarts the vehicle to hit a road. This process normally needs at least 5 minutes. However, when many riders park the bike/scooter/motorcycle by a road side at the same time, and wear on the raincoats by the same process, traffic will be jammed severely and safety can be affected.

On the other hand, when a mountain climber is climbing a mountain or soldiers are marching, they will usually carry a large backpack and other gears. If there is unexpected heavy rain during the activities, the mountain climber or the soldiers must stop and unload the large and heavy backpacks, get the raincoats out of the backpack, and then put it on before hitting the road again. This can delay time and cause inconvenience; in addition, the body, the clothes or the gears will still get wet by the heavy rain.

In view of the above shortcomings, the applicant, having accumulated many years of experience in related arts, and following continuous research and experimentation, finally succeeded in producing a new and improved containing structure able to achieve the objective of combining multiple functions, which can also further variably apply the body-worn structure in products for pet and also for people.

SUMMARY OF THE INVENTION

The objective of the present invention lies in providing a body-worn structure, and more particularly to a body-worn structure that is worn on a pet's body using a support enclosure. When a user is taking their dog for a walk outdoors, apart from allowing the pet to walk on the ground using a pull cord, the support enclosure also concurrently combines multiple functions, enabling the user to use in various different circumstances e.g. a fixing ring for a leash to hook on, a fixing member for carrier backpack to be assembled or attached thereupon, and a fixing device for placing a pet droppings collection bag.

Based on the aforementioned features of the structure, the support enclosure is fitted with a front harness and a rear harness, and a lengthwise belt, wherein, the rear harness is optional and movable to be assembled with the front harness depends on whether or not the functions provided by assembly of the front harness with the rear harness are needed. For examples, in case the pet's body length is longer than pet's average size, then having the front harness assembled with rear harness may effectively extend the length in size, or if the carrier backpack and the droppings collection bag are required to attach onto the support enclosure. In other words, the front harness can be used alone or combined with the rear harness depending on needs. The two ends of the first traverse belt are respectively fitted with a left, right female buckle, and the two ends of the second traverse belt are respectively fitted with a second traverse belt male buckle and a corresponding second traverse belt female buckle to enable fastening together to form a front connected section. In addition, at least one fixing to ring is provided on the second traverse belt buckle, or each side of the second traverse belt buckles can respectively be fitted with a corresponding fixing rings, which facilitate connecting a hook ring fitted at the front end of a pull cord of the leash to the fixing rings when taking a dog for a walk outdoors. The rear harness comprises a third transverse belt, the two ends of the third traverse belt are respectively fitted with a third traverse belt male buckle and a corresponding third traverse belt female buckle to facilitate forming a rear connected section after mutual fastening; moreover, the third transverse belt is respectively fitted with left, right connecting male buckles corresponding to the left, right female buckles at the two ends of the first traverse belt, which facilitate forming left, right assembly sections after connecting together.

After assembling all the belts as described above, the support enclosure assumes a square belt harness structure, which provides for mounting a holding portion like a carrier backpack, wherein, two sides of the holding portion are respectively provided with a side portion, and a fixing member is disposed on each side portions respectively, and corresponding fixing members are either disposed on the main body of the holding portion or disposed on each of the side portions, next to where the fixing members are disposed, the fixing members along with the side portions are used to fold toward the corresponding fixing members to facilitate fastening each other by joining them together, and to movable cover and fix either the left, right assembly sections or the front, rear connected sections therebetween, thus enabling positioning the holding portion on the upper side of the square belt structured support enclosure.

Based on the aforementioned features of the structure, a first, a second upper female buckle are further fitted above the left, right female buckles respectively nearby the second traverse belt female buckle and the second traverse belt male buckle; a first, second upper male buckles are further fitted above the left, right male buckles respectively nearby the third traverse belt female buckle and the third traverse belt male buckle; a first, second upper connected sections are constructed by having the first, second upper female buckles and the first, second upper male buckles clasped correspondingly; after the first, second upper connected sections along with the front, rear connected sections being clasped altogether, the support enclosure movably assembled by the front harness and the rear harness further assumes a rectangular belt structured enclosure, which provides for mounting a holding portion like a carrier backpack. At least one fixing member can be provided on any surface of the rectangular belt structured enclosure, corresponding to the corresponding fixing member provided on a bottom side of the holding portion. Also, either/both the first upper connected section or/and second upper connected section can be provided with a fixing member, correspond to a bottom side of the holding portion provided with the corresponding fixing member, allowing the holding portion to be movably attached onto the first, second upper connected sections with each other. The rectangular belt structure is performed right on top of the pet's back, therefore, the holding portion can directly attached onto the support enclosure using the hook and loop fasteners without the necessity of using the fixing member and the corresponding fixing member provided on two sides of the holding portion respectively.

Based on the aforementioned features of the structure, the front portion of the covering is provided with a through hole corresponding to the position of the fixing ring, and the through hole is provided with a first waterproof piece and a second waterproof. The first waterproof piece effects a structure on the upper portion of the second waterproof piece that overlaps and covers a partial area of the through hole to form a variable opening, which is used to prevent rain water from seeping into the through hole. When it's raining, and the covering is in an unfolded state, the user is able to pass the fixing ring through the through hole so as to fasten the hook ring at the front end of the pull cord, thereby achieving the objective allowing the user to still able to walk their pet on the ground using the pull cord on a rainy day.

Based on the aforementioned features of the structure, the covering comprises a forepart, one side of which is provided with a second fastening portion, and another side is provided with a second fastening assembly portion corresponding to the second fastening portion. The second fastening portion and the second fastening assembly portion are mutually joined to enable covering and securely fixing the covering to the chest position of a pet. The left side and the left rear angled end of the covering are respectively provided with a third fastening portion and a third fastening assembly portion, while the right side and the right rear angled end are respectively provided with a fourth fastening portion and a fourth fastening assembly portion. The mutual joining between the third fastening portion and the third fastening assembly portion and the mutual joining between the fourth fastening portion and the third fastening assembly portion are used to enable the covering to respectively cover and be securely fixed on the hind legs portions of a pet.

Based on the aforementioned features of the structure, the support enclosure being worn on a pet's body, and being further applied in a fixing device for a pet droppings collection bag, wherein, at least one retaining element is fitted on either the front harness or the rear harness of the support enclosure; the retaining element provides for external connecting a fixing device thereto, and the fixing device is used to fixedly position a pet droppings collection bag at an area surrounding the pet's anus.

Based on the aforementioned features of the above structure, the fixing device is a ring member provided with corresponding male and female clasp fasteners; a bending structure enables the male and female clasp grooves to achieve an opening/closing function; an opening of the pet droppings collection bag is correspondingly positioned at a clip opening formed before closing the male and female clasp grooves, whereupon the clip opening and the closing action of the male and female fasteners are used to securely fix the pet droppings collection bag; the female clasp groove is able to be replaced alternatively by male clasp groove and vise versa.

Based on the aforementioned features of the structure, the rear cover sheet is provided with a holding portion to form a carrier backpack, thereby facilitating the user to use the holding portion to place pet paraphernalia, such as: plastic bags and related supplies for cleaning up pet droppings. The carrier backpack is provided with a switching piece and a switching assembly.

Based on the aforementioned features of the structure, wherein either the structure rear side, the support enclosure rear side, the front harness, or the rear harness formed by the front cover sheet and rear cover sheet is fitted with at least one retaining element, and the retaining elements are fitted to an external connected fixing device, which is used to securely fix the pet droppings collection bag. The retaining elements include any type of ring members or sleeve members used for retaining/holding purposes. The fixing device is provided with left, right positioning devices able to fixedly position to the retaining elements. Either the two left, right positioning devices, the two left, right hook members, or the fixing belts are used to pass through and be fixed to the retaining elements, thereby enabling achieving the function to securely position the pet droppings collection bag at the position of the pet's anus and receive the excrement discharged by the pet.

Based on the aforementioned features of the structure, the fixing device is a ring member provided with corresponding male and female clasp grooves. The bend structures on the two ends of the male and female clasp grooves are used to achieve an open/close function. Moreover, the male and female clasp grooves comprise a male fastener and a female fastener, respectively. When in use, the opening of the pet droppings collection bag is correspondingly positioned at a clip opening formed before closing the male and female clasp grooves, whereupon the clip opening and the closing action of the male and female fasteners are used to securely fix the pet droppings collection bag; the female clasp groove or fastener can alternatively be replaced by male clasp groove or fastener and vise versa.

Based on the aforementioned features of the structure, the support enclosure worn on the pet's body, with a fixing device for a pet droppings collection bag, wherein, the fixing device comprises a left fixing belt and a right fixing belt; a plurality of retaining elements corresponding to the left, right fixing belt. The left hook member comprises a left upper hook member and a left lower hook member provided on the left fixing belt. The right hook member comprises a right upper hook member and a right lower hook member provided on the right fixing belt. The left fixing belt is wrapped round the pet's left leg after securely hooking the left upper hook member with one of the corresponding retaining elements, and then the left lower hook member is used to securely hook onto another of the corresponding retaining elements. The right fixing belt is also wrapped round the pet's right leg after securely hooking the right upper hook member with one of the retaining elements, and then the right lower hook member is used to securely hook onto another of the corresponding retaining elements. Based on the aforementioned features of the structure, the fixing device comprises a first main body, a second main body, and a bending member positioned between the first main body and the second main body. The first main body and the second main body are respectively fitted with at least one corresponding male buckle and female buckle, as well as being provided with a central positioned, corresponding first passage and a second passage.

The first main body and the second main body are respectively fitted with a corresponding male clasp and female clasp. A protruding edge is provided on the first passage of the first main body, and the protruding edge is used to mount the pet droppings collection bag thereon. The corresponding male buckle and female buckle are used to hold down and fix the pet droppings collection bag between the first main body and the second main body and be located at the position on the of the first passage and the second passage; the female buckle can alternatively be replaced by male buckle and vise versa.

Based on the aforementioned features of the structure, the protruding edge located on the first passage is provided with a predetermined height and diameter, and after folding down the first main body and the second main body, the protruding edge of the pet droppings collection bag protrudes out from the second main body. Moreover, after covering the pet droppings collection bag on the fixing device and contacting the area surrounding the pet's anus, then feces excreted by the pet is unlikely to soil the fixing device. In addition, the protruding edge is provided with a clasp groove, thus, when the protruding edge protrudes out from the second main body, a clasping pin fitted on the peripheral edge of the second passage enables achieving a stable clasping effect therein.

Based on the aforementioned features of the structure, at least one external extended member is disposed at the top edge position of the end opening of the protruding edge provided on the first main body. After folding down the first main body and the second main body, the protruding edge protrudes out from the second main body, whereupon the external extended member is used to enable achieving a stable clasping effect with the peripheral edge of the second passage. Because the top edge at the end opening of the protruding edge is provided with the external extended member, when the user needs to open the first main body and the second main body, the user can press the external extended member to cause slight deformation thereof to enable separation of the first main body and the second main body.

Based on the aforementioned features of the structure, the two sides of the second main body are respectively fitted with left, right active holes and left, right swinging members. The left, right swinging members are respectively fitted with left, right movable members, and the left, right movable members and the left, right active holes correspondingly clasp together to form a movable configuration, which is used to adjust the circumferential angle of the fixing device surrounding the pet's anus.

Based on the aforementioned features of the structure, the upper edge of the second main body is provided with an indentation, and the upper portion of the second main body is further fitted with an arched body provided with a recess, which provides space for the pet's tail to pass through. The arched body is provided with a bending angle relative to the second main body, and is horizontally disposed on the pet's back after passing the pet's tail through the recess.

Based on the aforementioned features of the structure, the upper portion of the arched body is additionally provided with an upper hole, enabling connecting to a movable separable upper fixing belt through the upper hole and to the rings or the belt intersecting device provided on the support enclosure, thereby enabling more stable holding of the fixing device to the area surrounding the pet's anus. Because the upper edge of the second main body is provided with the indentation, after clasping together the first and second main bodies, only the upper edge of the first main body is positioned between the pet's anus and tail; moreover, because the area of contact surrounding the pet's anus is very small, thus, the pet's defecation easily drops into the interior of the pet droppings collection bag.

Another objective of the present invention lies in applying a flexible enclosure connected to an expansion/retaining device with combined multiple functions to facilitate the user in meeting the various different needs for outdoor activities. The body-worn structure comprises a flexible enclosure, an exit port and a wear-on port. The flexible enclosure further includes a front breadth and rear breadth. Both the exit port and the wear-on port have an enlarged opening structure; the exit port includes a side extension port, a front opening or a shrinking piece; and the wear-on port includes a lower opening, a left opening, a right opening, or a rear opening. By the enlarged exit port and wear-on port, the distance between the exit port and the wear-on port can be decreased, so that the body-worn structure can be put on and taken off quickly. An inner side of the front breadth of the flexible enclosure is further connected with an expansion/retaining device, allowing a user to expand a coat from or fold the coat into the retaining space while wearing on the coat, so that the user can fold and contain the coat without taking off the coat completely.

Based on the aforementioned features of the structure, the expansion/retaining device includes a front cover sheet, a rear cover sheet, and a connecting portion which connects the front cover sheet with the rear cover sheet. In addition, a retaining space is formed between the front cover sheet and the rear cover sheet. The expansion/retaining device also includes a cover piece which is disposed on a periphery of the front cover sheet, and a cover assembly which is disposed on a periphery of the rear cover sheet. By the cover piece and the cover assembly, the front breadth and the rear breadth after folding can be contained in the retaining space and the retaining space is closed.

Based on the aforementioned features of the structure, upon using the body-worn structure, the left opening and the right opening are first opened by a left open-close piece, a right open-close piece, a left open-close assembly and a right open-close assembly, so that after the left opening and the right opening of the coat are opened, the left and right openings are extended to the lower opening to form a U-shaped opening, acting as the wear-on port when the user wears on the coat.

By connecting the left, right openings, extending toward the lower opening, with the lower opening, the size of opening of the wear-on port can be enlarged, thereby decreasing the distance between the wear-on port and the exit port, so that the coat can be put on and taken off quickly.

Based on the aforementioned features of the structure, the flexible enclosure is further connected with a jumpsuit, wherein the jumpsuit is connected to the front breadth or the rear breadth, and the left and right openings are extended to an armpit location of a sleeve portion respectively and toward the lower opening, forming a U-shaped opening. The wear-on port is formed on a location where the jumpsuit is not connected to the front breadth or the rear breadth, so that the user can wear on and take off the flexible enclosure and the jumpsuit quickly.

Based on the aforementioned features of the structure, the rear breadth is provided with a rear opening and a back cover portion. The rear opening is extended toward the lower opening from a split location, and includes a left piece and a right piece which are split with respect to each other. In addition, an edge of the left piece is provided with an open-close piece, and an edge of the right piece is provided with an open-close assembly. The open-close piece and the open-close assembly are extended from the rear opening to the lower opening, and are connected together to form an enlarged and inverted-T opening acting as the wear-on port, so that the distance between the wear-on port and the exit port can be decreased, thereby allowing the coat to be put on and taken off quickly.

Based on the aforementioned features of the structure, the flexible enclosure is in shape of one piece of sheet material, and is bent and folded at a center to form the front breadth and the rear breadth. The left, right openings and the lower opening are connected between the front breadth and the rear breadth, and an inner side of the left and right openings is provided respectively with a fixing portion. Two ends of the fixing portion are provided respectively with a first fixing member and a first fixing assembly. Therefore, a user's wrist can be fixed on the inner sides of the left, right openings, achieving a function of a sleevelet. Besides that, a second fixing member and a second fixing assembly are disposed at locations corresponding to the first fixing member and the first fixing assembly, so that the fixing portion can be positioned on the inner side of the flexible enclosure.

Based on the aforementioned features of the structure, the front cover sheet or the rear cover sheet, vertically disposed below the connecting portion as an open end, is provided with a positioning portion opposite to the inner side of the front breadth. The positioning portion can position the front cover sheet or the rear cover sheet. The positioning portion is a pocket, and the pocket is provided with an insertion port with an upward opening, which facilitates the front cover sheet or the rear cover sheet, vertically disposed below the connecting portion, and a holding portion to be inserted from top to bottom. The pocket can catch an object which may drop out of the holding portion during operation, so as to assure that the object will not be lost and the object can be accessed conveniently.

Based on the aforementioned features of the structure, the front cover sheet or the rear cover sheet is provided with a jacket body. The jacket body is further provided with an assembly structure, so that the holding portion can be assembled or dismantled movably. The assembly structure includes a hook and loop fastener, a magnetic sheet or a snap.

Yet another objective of the present invention lies in applying the covering body in a body protective device, such as protective clothing or airbag clothing. The body protective device comprises a front cover sheet, which is a jacket formed from a front inner piece and a rear inner piece, wherein the jacket is provided with openings to enable the user to put on. The body protective device is fitted to the outer side of the jacket to enable use as an outer clothing or covering for the wearer. A containing space formed between the front cover sheet and the rear cover sheet is used to retain the folded up covering body, with fixing members and corresponding fixing members used to close up the front cover sheet and the rear cover sheet. When the body protective device is an airbag clothing, the airbag clothing comprises an inner airbag and an outer airbag. The structures of the inner and outer airbags can be either a single piece airbag or a plurality of independent airbags. Using a plurality of independent airbags as an example, each of the independent airbags is provided with an independent air chamber and a free end. When in a deflated state, the airbags assume a partial overlapping configuration, and when in an inflated state, the airbags are set upright and connected together.

Based on the aforementioned features of the structure, when applied in a body protective device, such as protective clothing or airbag clothing, the covering body mainly comprises three configurations, wherein the rear cover sheet of the first configuration further comprises a first covering piece, which is fitted to the periphery of the jacket. Moreover, the first covering piece is fitted with a front left covering piece and a front right covering piece, wherein the front left covering piece and the front right covering piece are respectively connected to a front inner piece, and are further respectively fitted with at least one fixing member and a corresponding fixing member. The covering body further comprises a front covering body, and a retaining space formed between the front inner piece and the left, right covering pieces is able to retain the folded up front covering body, as well as further close up the left, right covering pieces using the fixing members and the corresponding fixing members. In addition, the rear cover sheet further comprises a second covering piece.

Based on the aforementioned features of the structure, the rear cover sheet of the second configuration is the first covering piece corresponding to the front inner piece. The first covering piece is fitted to the periphery of the front side of the jacket, wherein the fixing members are fitted to the first covering piece, and the corresponding fixing members are fitted to the edge of the front inner piece. A retaining space formed between the front inner piece and the first covering piece is able to retain the folded up front covering body, as well as further close up the first covering piece using the fixing members and the corresponding fixing members.

Based on the aforementioned features of the structure, the rear cover sheet of the third configuration is fitted to the periphery of the front side of the jacket using the single covering piece. The single covering piece corresponds to the single inner piece, wherein the fixing members are fitted to the single covering piece, and the corresponding fixing members are fitted to the edge of the single inner piece. A retaining space formed between the single inner piece and the single covering piece is able to retain the folded up single covering body, as well as further close up the single covering piece using the fixing members and the corresponding fixing members.

Based on the aforementioned features of the structure, the covering body using a hollow spherical body or a hollow airbag of a body protective device, wherein the body protective device is provided with a plurality of support columns, which are either inflatable air cylindrical body structures or foldable elastic cylindrical bodies. In addition, the plurality of support columns are connected to either the front inner piece or the rear inner piece, and are used to support fixing the configurational shape of the exterior of the hollow spherical body or the hollow airbag. When the support columns are configured as air column structures, a connective inflating channel is provided between the air column structures and the hollow spherical body or the surface of the hollow spherical body. The surface of the hollow spherical body or the hollow airbag can be configured as a single sheet flat surface or a plurality of airbag surfaces. When the surface is configured as a plurality of airbags, an outer airbag having a plurality of independent airbag structures is adopted, with each of the independent airbags being provided with an independent air chamber and a free end. When in a deflated state, the structure assumes a partial overlapping configuration, and when in an inflated state, the airbags are set upright and connected together. The hollow spherical body or the hollow airbag either comprise at least front cover sheets or rear cover sheets, and further comprise at least one joining opening. The joining opening is formed from the joining of two joining ends, and the joining opening is provided with a sealing member.

Based on the aforementioned features of the structure, the body protective device comprises either an air supply, a manual inflating device, or an automatic inflating device. In an emergency situation, the jacket wearer can carry out a manual inflation operation. The automatic inflating device is fitted with a synchronous start switch, a sensor, and a manual changeover switch. In an emergency situation, the sensor transmits a signal to the synchronous start switch to open a fourth valve to channel in air from the air supply, thereby enabling achieving the objective of inflating the airbags. Under certain conditions, when the sensor malfunctions or is inappropriate to auto-start, the manual changeover switch can be used to control the fourth valve. In addition, the body protective device can further comprise a global satellite positioning device, which is connected to the synchronous start switch and the sensor. In an emergency situation, the sensor can automatically transmit a satellite positioning signal to facilitate rescuing the accident victim.

Based on the aforementioned features of the structure, the body protective device of the present invention has application in activities including mountain-climbing and skiing, use as a safety airbag when riding a motorcycle, in water activities such as boating, and aerial activities such as hand gliding or paragliding, or after pairing with essential life support equipment, can also be further applied in safety equipment for passengers travelling by airplane. According to the criteria required for each of the activities described above (such as: temperature, speed, altitude, pressure, impact force, etc.) the sensor can be set to transmit the appropriate signal to the synchronous start switch and when to transmit the signal.

To enable a further understanding of said objectives and the technological methods of the invention herein, a brief description of the drawings is provided below followed by a detailed description of the preferred embodiments.

BRIEF DESCRIPTION OF THE DRAWINGS

FIG. 4 is an overhead schematic view of the support enclosure structure of the present invention.

FIG. 5 and FIG. 6 are exploded schematic views of the holding portion being assembled onto the support enclosure according to the present invention.

FIG. 5-1 and FIG. 6-1 is a bottom schematic view depicting the process in assembling the holding portion onto the support enclosure according to the present invention.

FIG. 16 to FIG. 17 are structural schematic views depicting the fixing device with the pet droppings collection bag being operated on the support enclosure structure according to the present invention.

FIG. 16A are partial enlarged views of FIG. 16 according to the present invention.

FIG. 22 to FIG. 25 are lengthwise sectional schematic views showing an open and close state of the modified embodiments of the fixing device according to the present invention.

FIG. 24A, 24B to FIG. 25A, 25B are partial enlarged views of FIG. 24 and FIG. 25 according to the present invention.

FIG. 26 and.

FIG. 30 and FIG. 31 are a partial exploded schematic view and a schematic side view showing the modified embodiment of the fixing device according to the present invention.

FIGS. 36, 37 and 37A are a structural schematic view and a partial enlarged view depicting the fixing device with the pet droppings collection bag being retained on the support enclosure structure according to the present invention.

FIG. 48 and FIG. 49 show schematic views of the fourth embodiment of the present invention at an expanded condition.

FIG. 53A and FIG. 53B show partial enlarged views of FIG. 53.

FIGS. 56 and 57 show schematic views of the covering body applied in the embodiment of an airbag clothing covering piece for the body protective device.

DETAILED DESCRIPTION OF THE PREFERRED EMBODIMENTS

Figure 1:
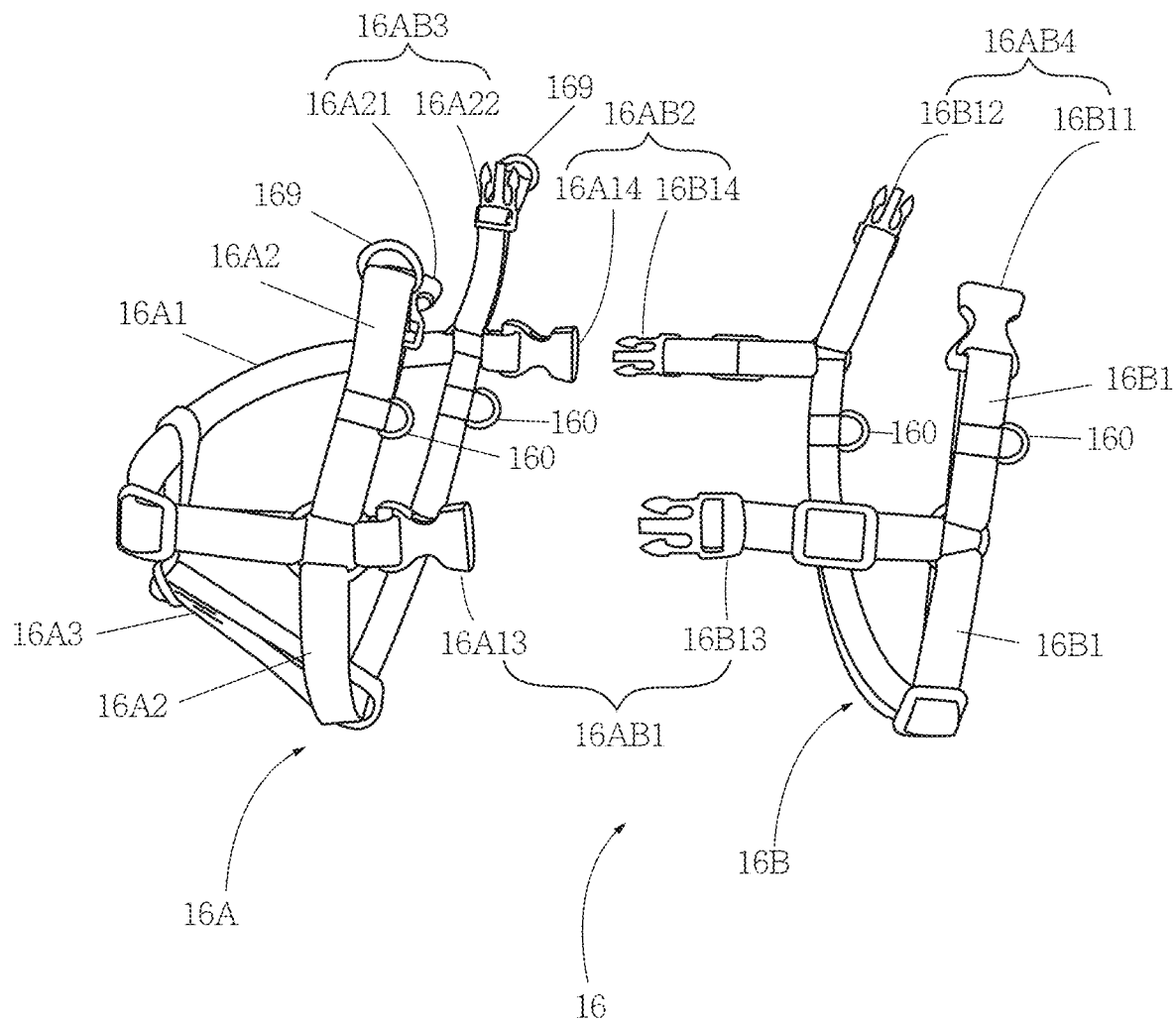
FIG. 1 is an exploded schematic view of the embodiment of the support enclosure structure according to the present invention.
Figure 2:
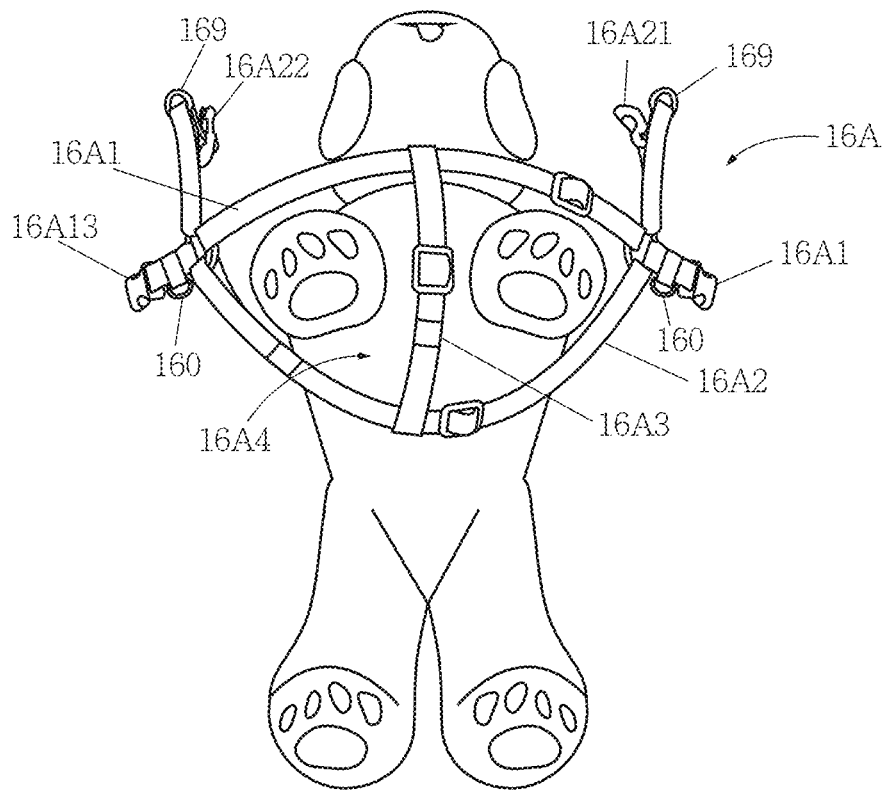
FIG. 2 is a schematic view of the embodiment of the support enclosure structure being worn on a pet from its bottom side according to the present invention.

Referring to FIGS. 1 to 4, which show an embodiment of the present invention applied in a support enclosure 16, wherein, the support enclosure 16 fitted with a front harness 16A, which further comprises a first traverse belt 16A1, a second traverse belt 16A2, and a lengthwise belt 16A3. The first traverse belt 16A1 is connected or cross-connected with the second traverse belt 16A2; moreover, the lengthwise belt 16A3 is fitted between the first traverse belt 16A1 and the second traverse belt 16A2, forming left and right gaps 16A4 (the present embodiment is also feasible without the lengthwise belt 16A3) to facilitate passing a pet's front two legs therethrough, after which the front harness 16A is put onto the pet's front body from the pet's underside upwards (see FIG. 2). The two ends of the first traverse belt 16A1 are respectively provided with left, right female buckles 16A13, 16A14. The two ends of the second traverse belt 16A2 are respectively provided with a second traverse belt male buckle 16A22 and a corresponding second traverse belt female buckle 16A21 to facilitate clasping the two together forming a front connected section 16AB3. In addition, either the second traverse belt female buckle 16A21 or the second traverse belt male buckle 16A22 is provided with at least one fixing ring 169; moreover, the second traverse belt female buckle 16A21 and the second traverse belt male buckle 16A22 can also be provided with the fixing ring 169 on corresponding sides respectively to facilitate connecting the hook ring 170 fitted to the front end of the pull cord 171 to the fixing rings 169 (see FIG. 8) when the user is taking their dog for a walk outdoors.

The support enclosure 16 is further fitted with a rear harness 16B, which comprises a third transverse belt 16B1, which is respectively provided with left, right male buckles 16B13, 16B14 corresponding to the left, right female buckles 16A13, 16A14 fitted to the two ends of the first traverse belt 16A1, thereby enabling forming left, right assembly sections 16AB1, 16AB2 after connecting together (see FIGS. 1 and 4). The two ends of the third transverse belt 16B1 are respectively provided with a third traverse belt male buckle 16B12 and a corresponding third traverse belt female buckle 16B11 to facilitate forming a rear connected section 16AB4 after clasping together thereof. Accordingly, the above-described support enclosure 16 assumes a square belt structure configuration after assembly thereof (see FIG. 4); the female buckle 16A13, 16A14, 16A21, 16B11 can alternatively be replaced by male buckle 16B13, 16B14, 16A22 16B12 and vise versa.

Referring to FIGS. 4 to 7, the holding portion 4 of the present embodiment is a carrier backpack 44 (see FIG. 5 and FIG. 5-1), wherein two sides of the holding portion 4 are respectively provided with a side portion 40, and a fixing member 42 is disposted on each of the side portion 40, along with a corresponding fixing member 43 provided on the main body of the holding portion 4. As shown in FIG. 5-1, the fixing member 42 along with the side portion 40 is used to fold toward the main body of the holding portion 4, to facilitate securely fastening each other by joining the fixing member 42 against the corresponding fixing member 43. As shown in the diagrams, the fixing member 42 and the corresponding fixing member 43 can be hook and loop fasteners, and can also be other types of male and female fastening members (not shown in the drawings).

Figure 6:
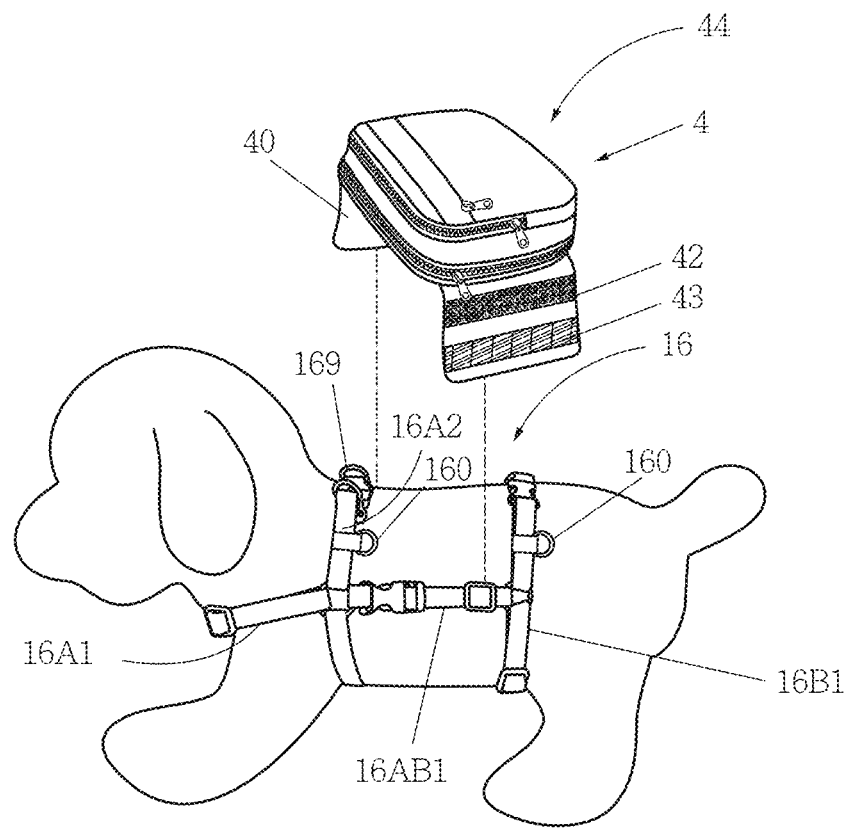
Figures 1, 6:
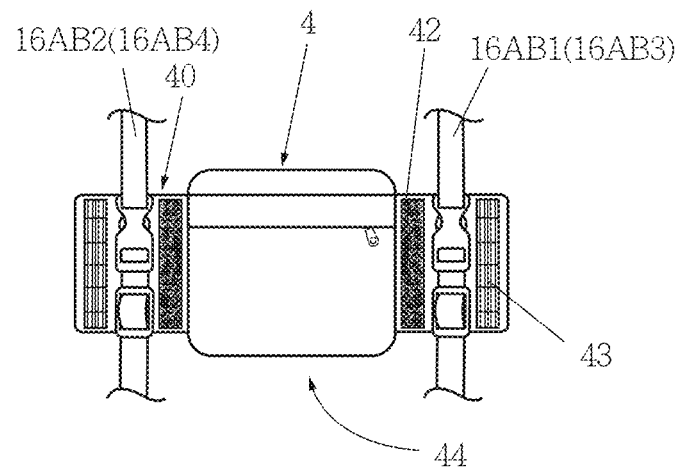
Figure 7:
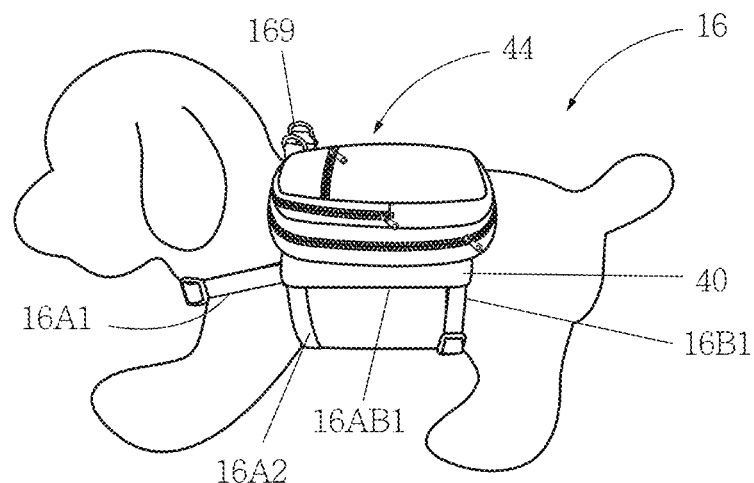
FIG. 7 is a schematic view depicting completion of the support enclosure assembled with the holding portion according to the present invention.

Referring to FIG. 6 and FIG. 6-1, in addition, an alternative structure is that both the fixing members 42 and the corresponding fixing members 43 are disposed each side portions 40 respectively. As shown in FIG. 6-1, the corresponding fixing members 43 along with the side portions 40 are used to fold against the fixing member 42, to facilitate securely fastening each other by joining the corresponding fixing members 43 with the corresponding fixing members 42. As shown in FIG. 5-1 and FIG. 6-1, the fixing members 42 and the corresponding fixing members 43 are used to movable cover and fix the left, right assembly sections 16AB1, 16AB2 therebetween, thus enabling positioning the holding portion 4 on the upper side of the support enclosure 16 assuming a square belt structure (see FIG. 7). In addition, the fixing members 42 and the corresponding fixing members 43 can alternatively have the front, rear connected sections 16AB3, 16AB4 covered and fixed therebetween, instead of the left, right assembly sections 16AB1, 16AB2.

Figure 8:
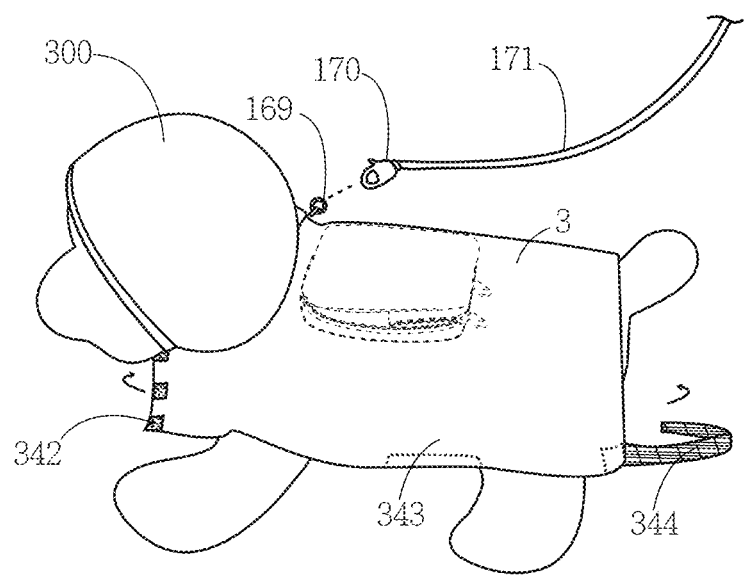
FIG. 8 is a schematic view depicting the unfolded state of the pet covering according to the present invention.
Figure 9:
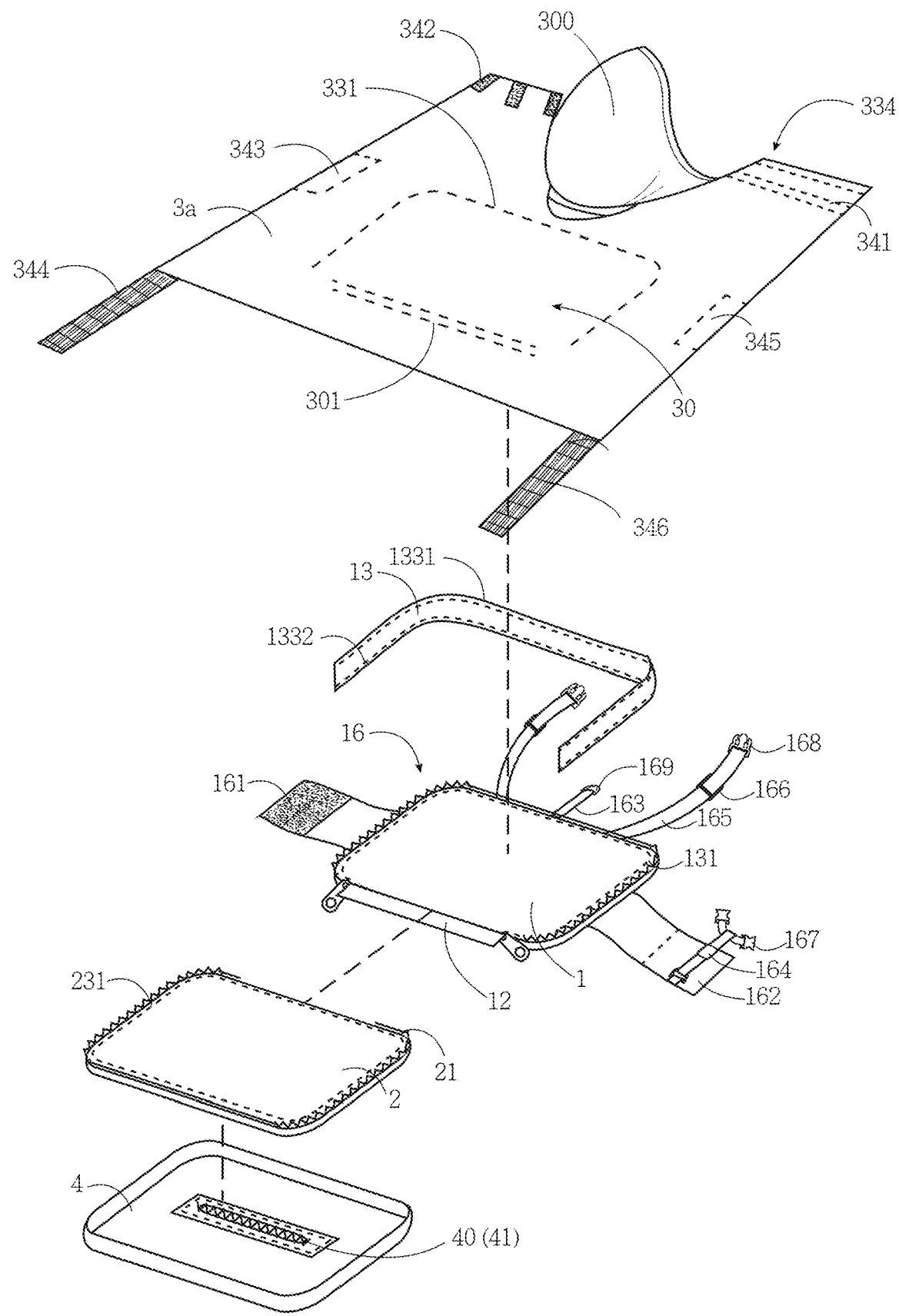
FIG. 9 is a structural exploded view depicting the unfolded state of the pet covering and the holding portion according to the present invention.

Referring to FIGS. 8 and 9, the covering 3a comprises a forepart 334, wherein one side of the forepart 334 is provided with a second fastening portion 341, and another side is provided with a second fastening assembly portion 342 corresponding to the second fastening portion 341. The second fastening portion 341 and the second fastening assembly portion 342 are mutually joined, which enables covering and securely fixing the covering 3a to the chest position of a pet. The left side and the left rear angled end of the covering 3a are respectively provided with a third fastening portion 343 and a third fastening assembly portion 344, while the right side and the right rear angled end are respectively provided with a fourth fastening portion 345 and a fourth fastening assembly portion 346. The mutual joining between the third fastening portion 343 and the third fastening assembly portion 344 and the mutual joining between the fourth fastening portion 345 and the third fastening assembly portion 346 are used to enable the covering 3a to respectively cover and be securely fixed on the hind legs portions of a pet.

In addition, the front cover sheet 1 is further provided with a side surround 13. The side surround 13 comprises a fourth joining edge 1331 corresponding to the third joining edge 331, and a fifth joining edge 1332 corresponding to the first joining edge 131. The side surround 13 uses the fourth joining edge 1331 to join to the third joining edge 331 of the flexible enclosure 3, and joins the fifth joining edge 1332 to the first joining edge 131 of the front cover sheet 1 (if the rear cover sheet 2 is set up as the support enclosure 16, then it can also be joined to the rear cover sheet 2), thereby enlarging the capacity within the containing space 30, accordingly, achieving the effectiveness of easily containing the rear cover sheet 2 and the carrier backpack 44 (see FIG. 7).

Figure 10:
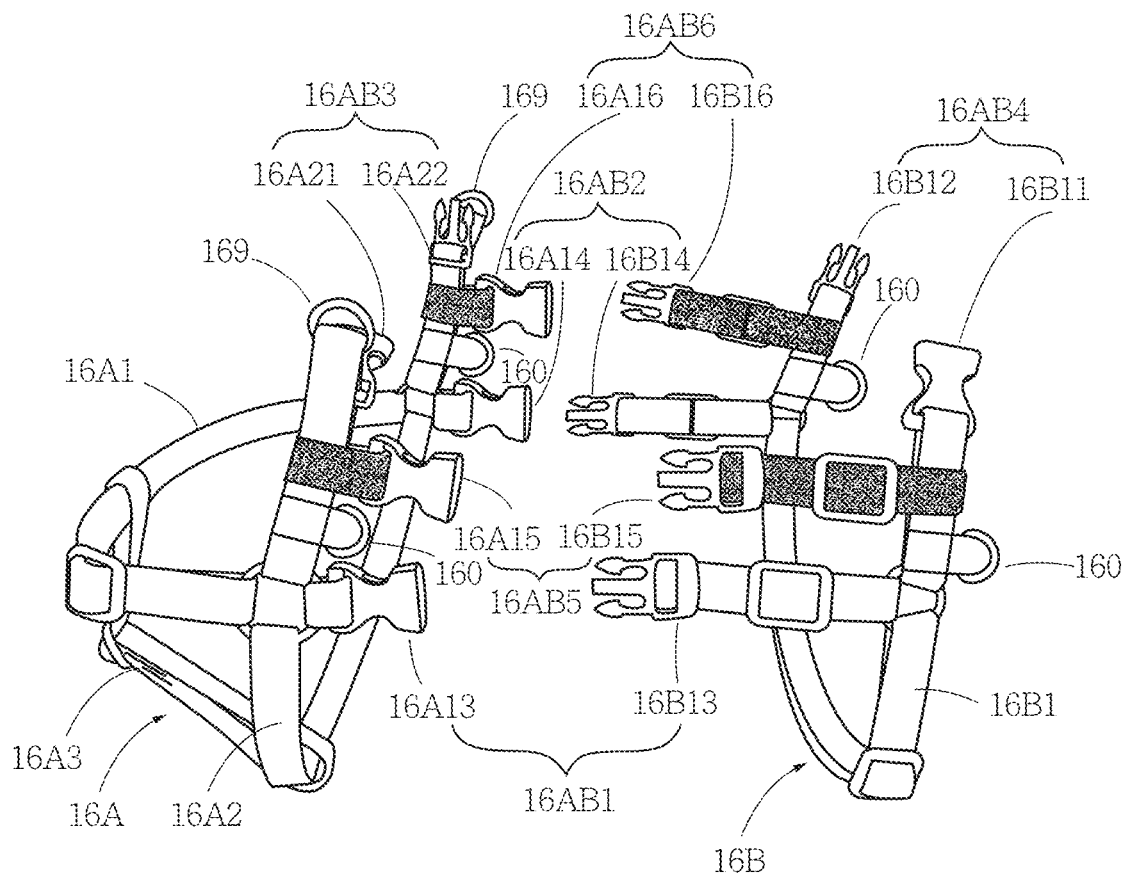
FIG. 10 is a structural exploded view of the support enclosure structure according to the present invention.
Figure 11:
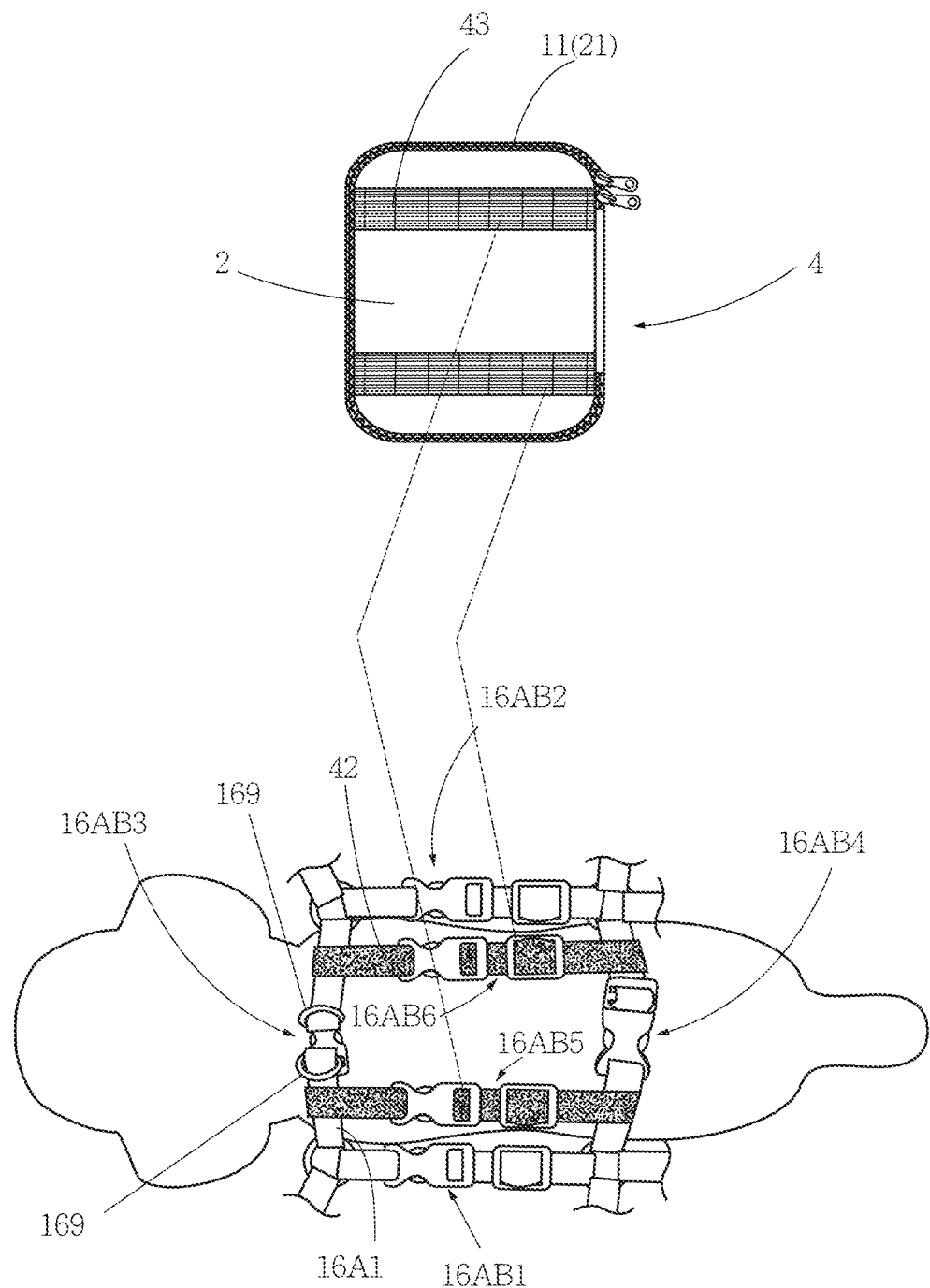
FIG. 11 is a partial exploded view depicting the carrier backpack being attached to the support enclosure according to the present invention.

As shown in FIG. 9, the support enclosure 16 directly forms the front cover sheet 1, wherein the left and right sides of the front cover sheet 1 are respectively joined to the first fastening portion 161 and the first fastening assembly portion 162, which is provided with the similar function as the fixing member 42, and the corresponding fixing member 43 provided on the holding portion 4. The first fastening portion 161 and the first fastening assembly portion 162 are used to mutually secure fixing the front cover sheet 1 and the rear cover sheet 2 to secure fixing to the covering body onto a pet. Furthermore, the front left and right sides of the front cover sheet 1 are respectively provided with the annular belt 165, which are used to fit around the chest of the pet (if the rear cover sheet 2 is set up as the support enclosure 16, then the annular belts 165 can also be provided on the rear cover sheet 2). The aforementioned annular belts 165 are provided with at least one first adjustment piece 166, and the first adjustment pieces 166 are used to adjust the length of the annular belts 165, accordingly, facilitating slipping the annular belt 165 onto pets with different body types. A retaining space formed between the front cover sheet 1 and the rear cover sheet 2 is used to retain the folded up covering 3a, and the cover piece 11 and the cover assembly 21 are further used to close up the front cover sheet 1 and the rear cover sheet 2 when the covering 3a is not in use. Moreover, as shown in FIGS. 10 to 11, a first upper female buckle 16A15 and a second upper female buckle 16A16 can further be fitted above the left, right female buckles 16A13, 16A14 respectively nearby a left, right end of the second traverse belt 16A2 where the second traverse belt female buckle 16A21 and the second traverse belt male buckle 16A22 are provided; and also, a first upper male buckle 16B15 and a second upper male buckle 16B16 can further be fitted above the left, right male buckles 16B13, 16B14 respectively nearby a left, right end of the third traverse belt 16B1 where the third traverse belt female buckle 16B11 and the third traverse belt male buckle 16B12 are provided. Accordingly, a first upper connected section 16AB5 and a second upper connected second 16AB6 are constructed by having the first upper female buckle 16A15, the second upper male buckle 16A16 and the first upper male buckle 16B15, the second upper male buckle 16B16 clasped correspondingly.

After the first upper connected section 16AB5 and the second upper connected section 16AB6 along with the front connected section 16AB3 and the rear connected section 16AB4 being clasped altogether, the support enclosure 16 movably assembled by the front harness 16A and the rear harness 16 further assumes a rectangular belt structure configuration after assembly thereof (see FIG. 11).

In compared with the square belt structure configuration assembled by the left, right assembly sections 16AB1, 16AB2 along with the front, rear connected sections 16AB3, 16AB4 (see FIG. 4), the rectangular belt structure configuration assembled by the first, second upper connected sections 16AB5, 16AB6 along with the front, rear connected sections 16AB3, 16AB4 (see FIG. 11) is right on top of the pet's back after the support enclosure 16 being worn-on the pet's body. At least one fixing member 42 can be provided on any surface of the rectangular belt structured enclosure, corresponding to the corresponding fixing member 43 provided on a bottom side of the holding portion 4. The preferred embodiment is that the first, second upper connected sections 16AB5, 16AB6 provided with the fixing member 42, corresponds to the corresponding fixing member 43 provided on the bottom side of the holding portion 4, which allows the holding portion 4 to be movably attached onto the first, second upper connected sections 16AB5, 16AB6 with each other. The fixing member 42 and corresponding fixing member 43 can be applied by using the hook and loop fasteners (see FIG. 11) or other types of male and female fastening members (not shown in the drawings). Accordingly, due to the rectangular belt structure configuration performed right on top of the pet's back as described above, the holding portion 4 can directly attached onto the support enclosure 16 using the hook and loop fasteners without the necessity of the fixing member 42 and the corresponding fixing member 43 respectively provided on two sides of the holding portion 4 (see FIG. 6).

Figure 12:
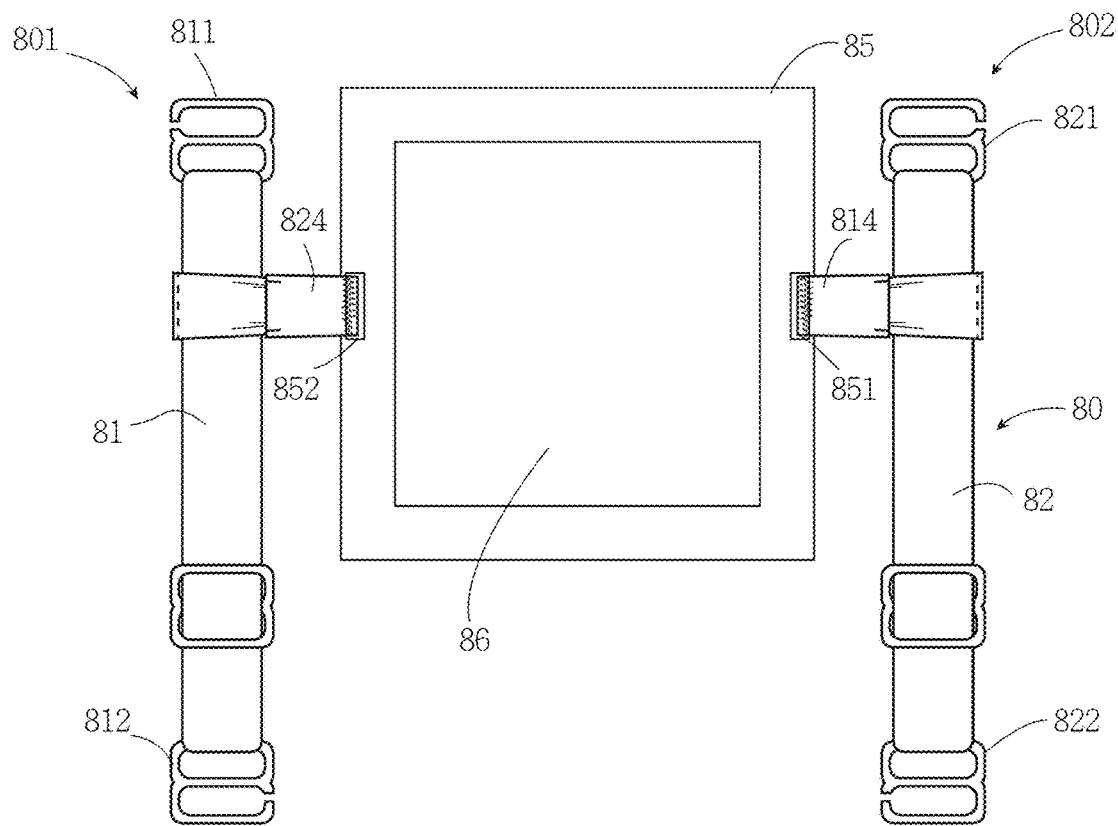
FIG. 12 to FIG. 15 are structural schematic views depicting the movements of the fixing device with the embodiments of the pet droppings collection bag.

Referring together to FIGS. 12 to 17, which shows an embodiment of the present invention applied in the support enclosure 16 being worn on the pet's body, and further applied in the fixing device 80 for the pet droppings collection bag 86, which comprises a left fixing belt 81 and a right fixing belt 82; a plurality of retaining elements 160 corresponding to the left, right fixing belt 81, 82. The left hook member 801 comprises a left upper hook member 811 and a left lower hook member 812 provided on the left fixing belt 81. The right hook member 802 comprises a right upper hook member 821 and a right lower hook member 822 provided on the right fixing belt 82. The left fixing belt 81 is wrapped round the pet's left leg after securely hooking the left upper hook member 811 with one of the corresponding retaining elements 160, and then the left lower hook member 812 is used to securely hook onto another of the corresponding retaining elements 160. The right fixing belt 82 is also wrapped round the pet's right leg after securely hooking the right upper hook member 821 with one of the retaining elements 160, and then the right lower hook member 822 is used to securely hook onto another of the corresponding retaining elements 160. In addition, the left and right fixing belts 81, 82 are provided with a left movable member 813 and a right movable member 823, respectively, as well as being provided with a left holding member 814 and a right holding member 824 respectively provided on the left movable member 813 and the right movable member 823, as depicted in FIG. 12. The pet droppings collection bag 86 is further provided with a frame 85, and the frame is provided with a left hole 851 and a right hole 852. The left and right holding members 814, 824 are used to secure fixing the pet droppings collection bag 86 to the left and right holes 851, 852 of the frame 85.

Figure 14:
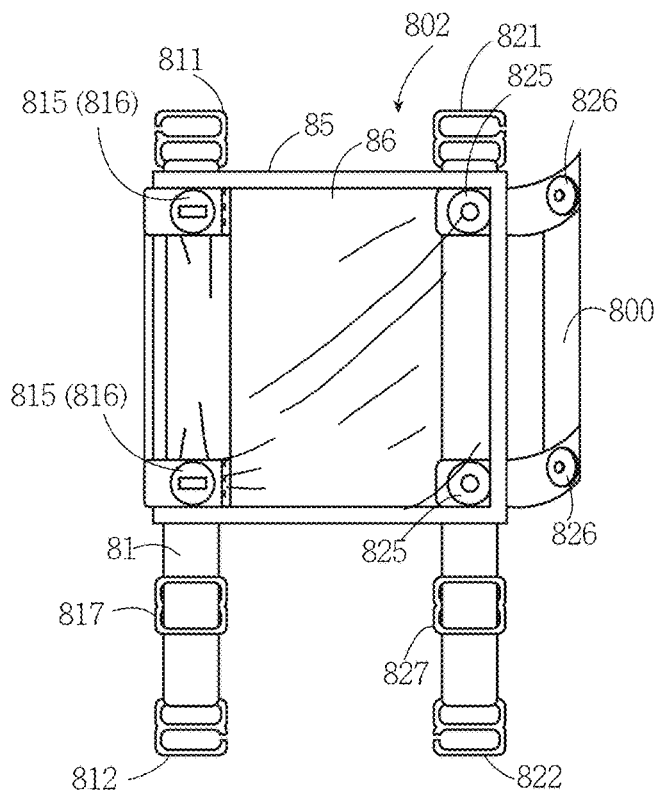
Figure 15:
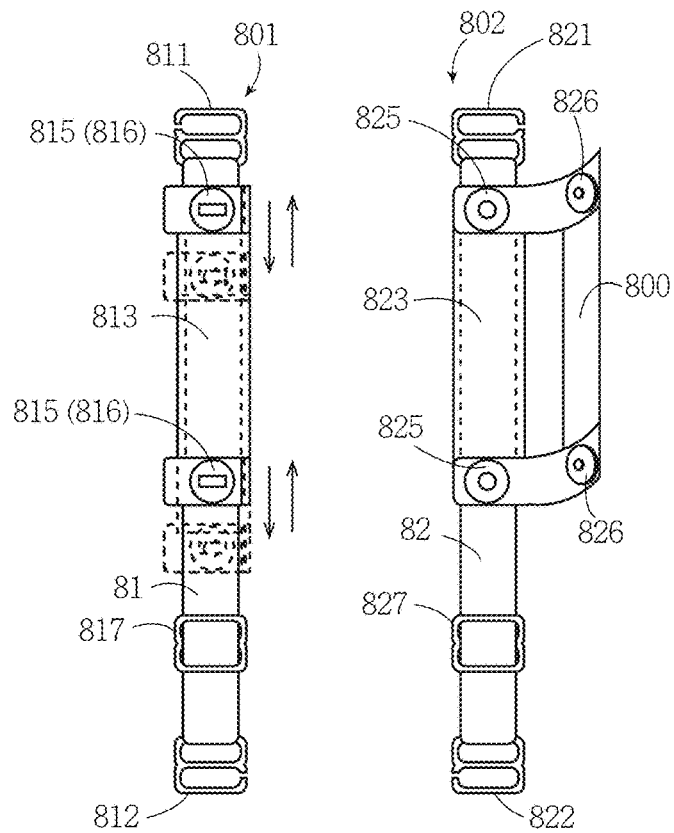

Referring to FIGS. 14 and 15, which shows the fixing device 80 being modified for the pet droppings collection bag 86, the only difference being in the left and right movable members 813, 823 which are further respectively provided with a pair of bendable left male and female magnetic clasps 815, 816, and a pair of bendable right male and female magnetic clasps 825, 826, respectively. The left male and female magnetic clasps 815, 816 and the right male and female magnetic clasps 825, 826 are used to form an entire body that assumes an inverse n-shape after connecting to a connecting belt 800, thereby achieving the function that facilitates the user to simultaneously manipulate the two pairs of magnetic clasps 815, 816 and 825, 826. After bending the left male and female magnetic clasps 815, 816 and fastening them together, and after bending the right male and female magnetic clasps 825, 826 and fastening them together, the pet droppings collection bag 86 is thereby held and securely positioned (see FIG. 14). The left and right movable members 813, 823 are provided on the left and right fixing belts 81, 82 using movable connected means, and the left and right movable members 813, 823 are used to enable upward or downward position adjustment. The left and right fixing belts 81, 82 are provided with a left adjustment member 817 and a right adjustment member 827, respectively, which are used to adjust the length of the left and right fixing belts 81, 82 for pets of different body types to suitably wear and enable secure fixing of the clothing.

Figure 3:
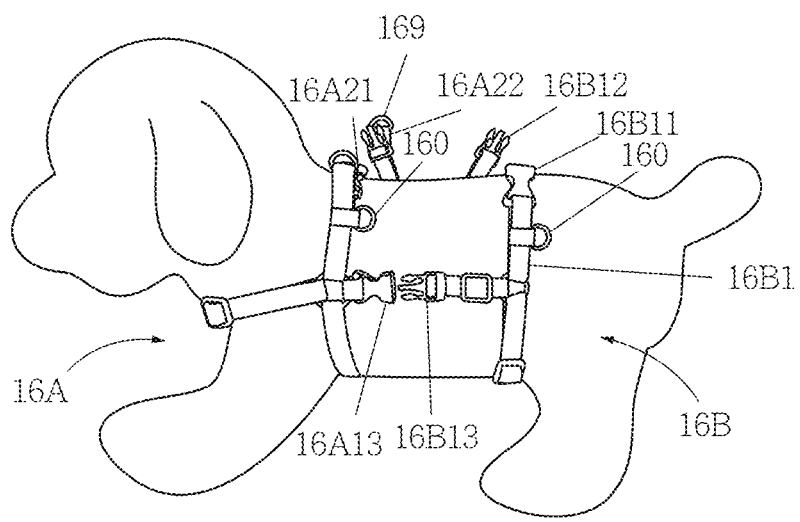
FIG. 3 is a schematic view of the support enclosure structure of the present invention.
Figure 18:
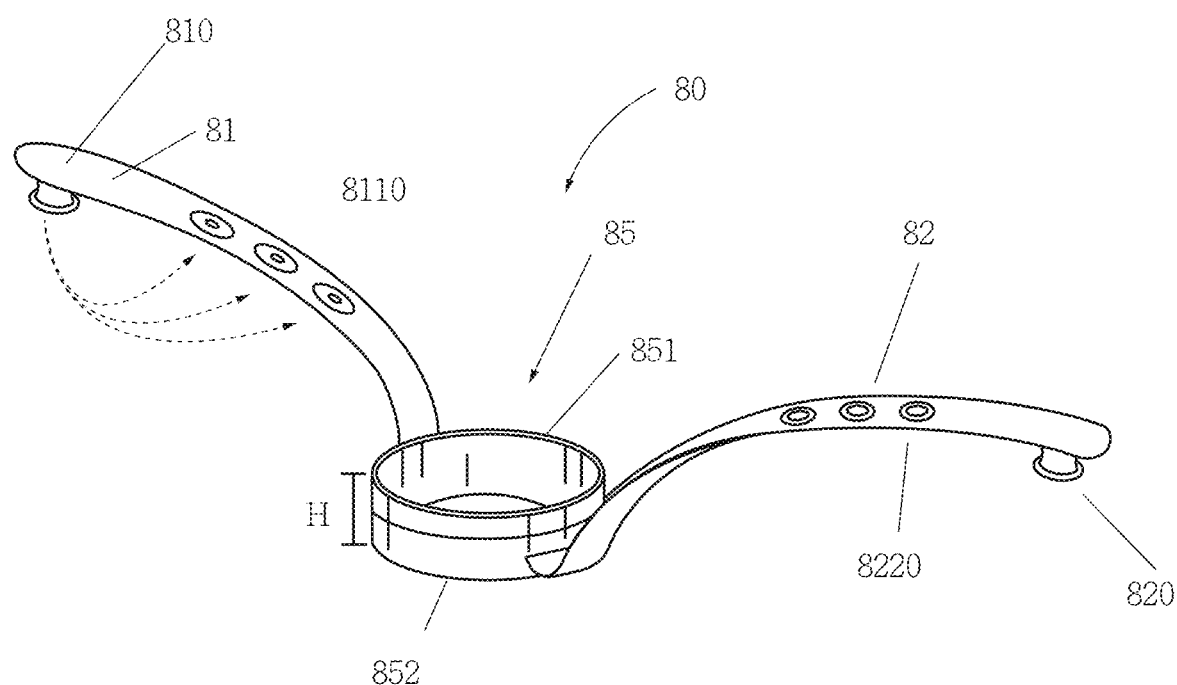
FIG. 18 and FIG. 19 are structural schematic views showing the other embodiment of the fixing device according to the present invention.
Figure 19:
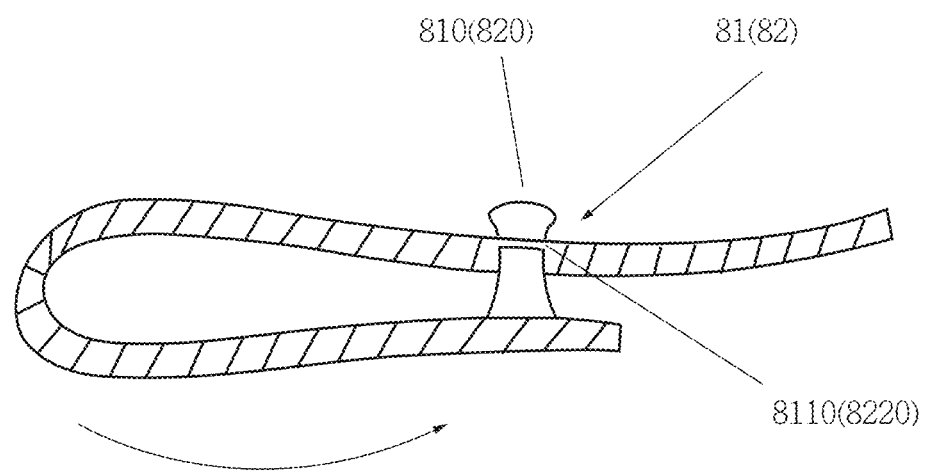

Referring to FIGS. 18 and 19, which show the embodiment as applied in the fixing device 80 for the pet droppings collection bag 86, wherein the frame 85 and the left, right fixing belts 81, 82 are formed as an integral body (see FIG. 18) or the separated left, right fixing belts 81, 82 (see FIG. 19) are structurally assembled to the frame 85. The side of the frame 85 is provided with a predetermined height H that forms an upper opening 855, a lower opening 856, and a passage between the upper, lower openings 855, 856. The left and right fixing belts 81, 82 are respectively fitted to the side of the frame 85 close to the area of the lower opening 852. Because of the predetermined height H that separates the upper opening 855 from the lower opening 856 that forms the passage between the left and right fixing belts 81, 82 that are connected close to the area of the lower opening 856, thus, when in use, the user can mount the opening of the pet droppings collection bag 86 on the upper opening 855 (see FIG. 36) and pass the body of the pet droppings collection bag 86 through the lower opening 856 (see FIG. 18), using the upper opening 855 to correspond to the position of the pet's anus to achieve the function to receive the feces discharged by a pet. Referring to FIGS. 3 and 10, the rear side of either the front harness 16A or the rear harness 16B can be fitted with plural retaining elements 160, whereby allowing the left and right fixing belts 81, 82 to respectively pass therethrough, and also to assemble and fix together locating members 810, 820 respectively fitted on the left and right fixing belts 81, 82 (see FIGS. 18 and 19), thereby pressing and fixedly positioning the upper opening 855 at the position of the pet's anus. The retaining elements 160 include any type of ring members (see FIGS. 3, 5 and 10) or sleeve members (see FIGS. 16 and 17) used for retaining/holding purposes.

Referring to FIGS. 20 to 23, the fixing device 80 as modified in the embodiment comprises a first main body 830, a second main body 840, and a bending member 8400 positioned between the first main body 830 and the second main body 840. The first main body 830 and the second main body 840 are respectively fitted with a corresponding male fastener 832 and female fastener 842, as well as a first passage 834 and a corresponding second passage 844 centrally positioned on the first main body 830 and the second main body 840, respectively. The male fastener 832 and the corresponding female fastener 842 are used to fix and hold down the pet droppings collection bag 86 at the position of the first passage 834 and the second passage 844 between the first main body 830 and the second main body 840; the female fastener 842 can alternatively be replaced by male fastener 832 and vise versa.

Figure 22:
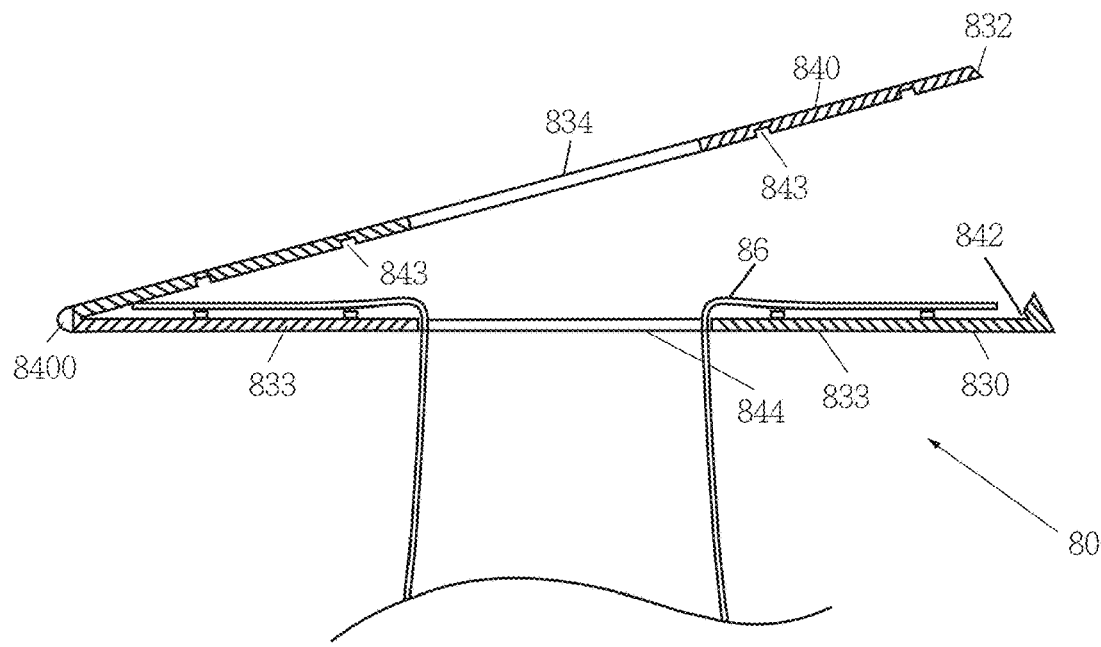
Figure 23:
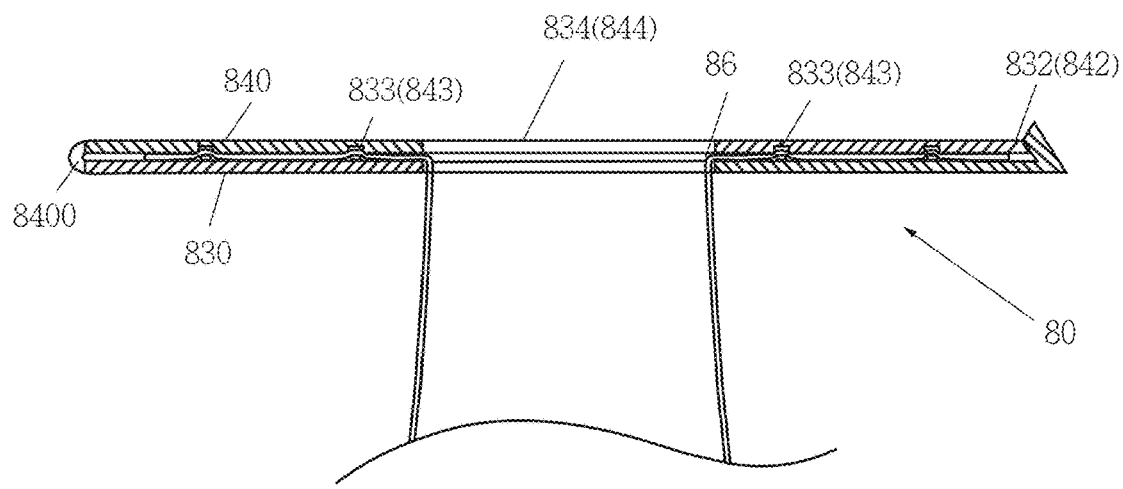
Figure 26:
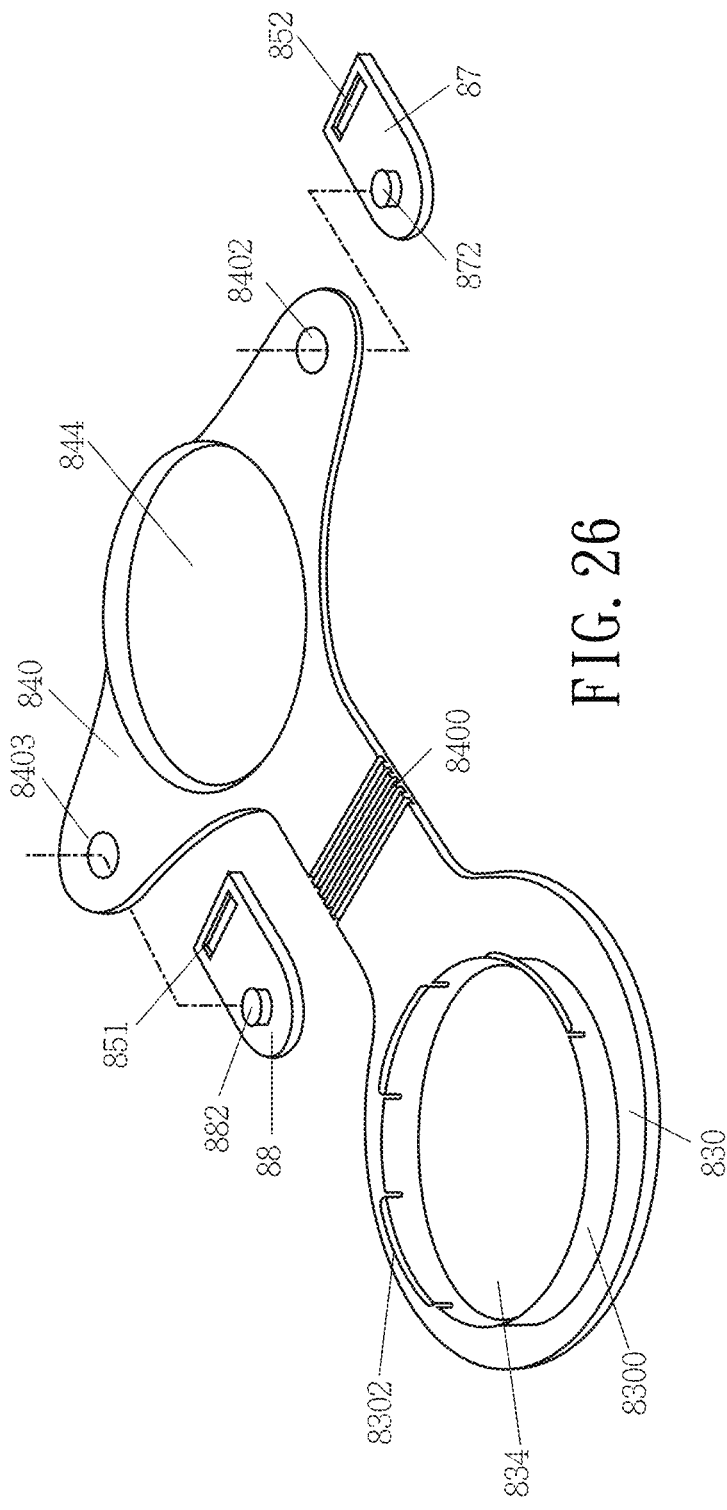
Figure 27:
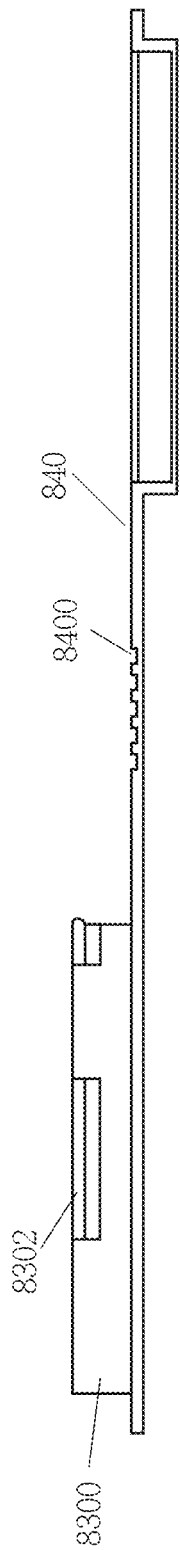
FIG. 27 are a perspective partial exploded view and a schematic side view showing the further modified embodiment of the fixing device according to the present invention.
Figure 28:
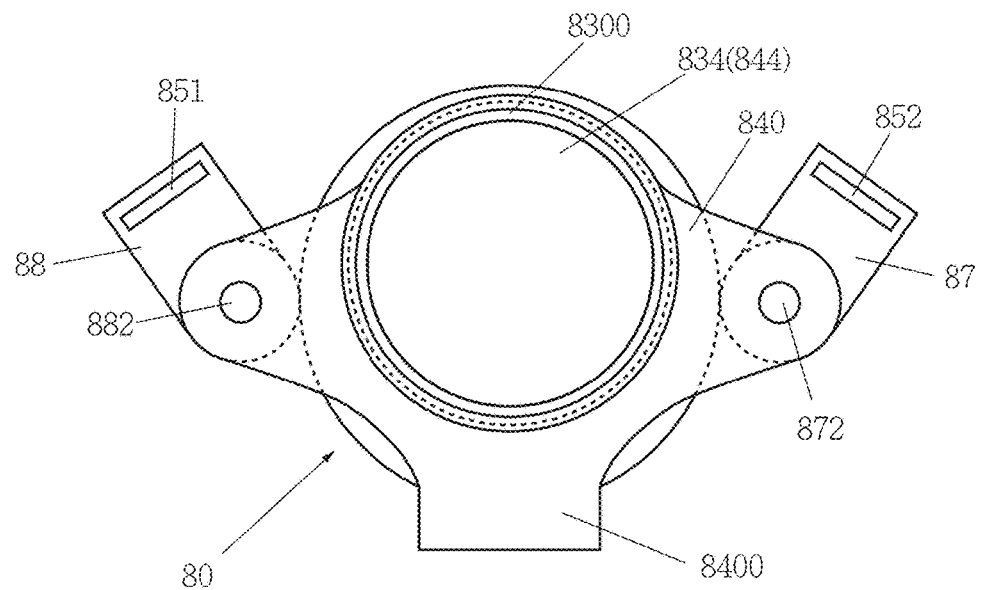
FIG. 28 is a schematic views of the modified embodiment showing an assembled state of the fixing device in FIG. 26 according to the present invention.
Figure 29:
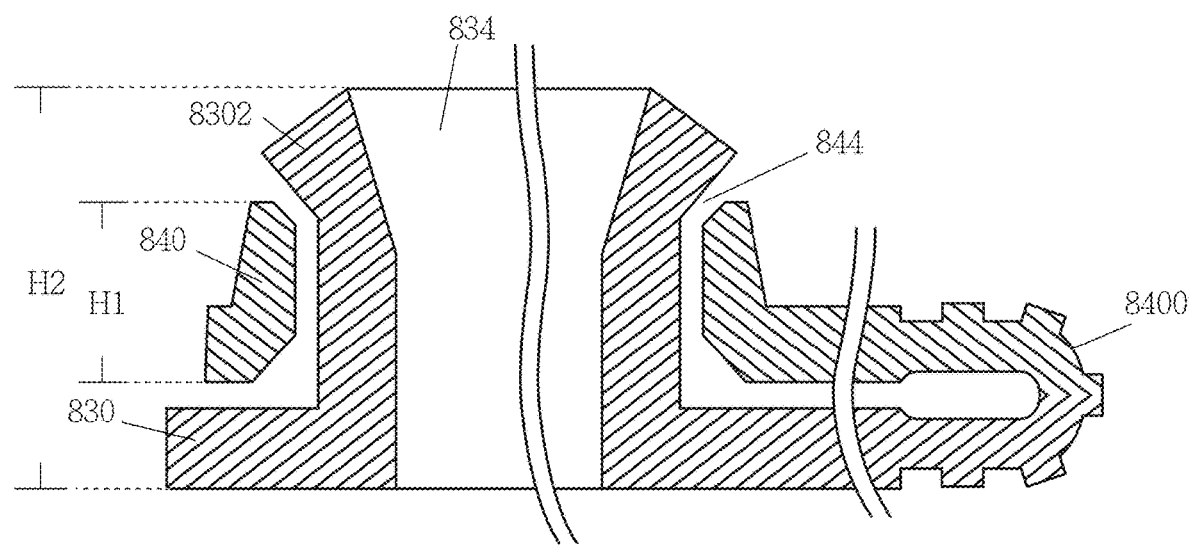
FIG. 29 Is a partial structural cross-sectional schematic view of the embodiment showing the assembled state of the fixing device in FIG. 26 according to the present invention.

Referring to FIGS. 22 and 23, which show the first main body 830 and the second main body 840 respectively fitted with at least one set of corresponding male, female clasps 833, 843, which enable more firmly fixing and holding down the pet droppings collection bag 86 between the first main body 830 and the second main body 840. Hence, when the pet is defecating, the pet droppings collection bag 86 is able to bear the weight of the feces and, thus, prevent the pet droppings collection bag 86 from falling off because of the weight; the female clasp 843 can alternatively be replaced by male clasp 833 and vise versa.

Figure 20:
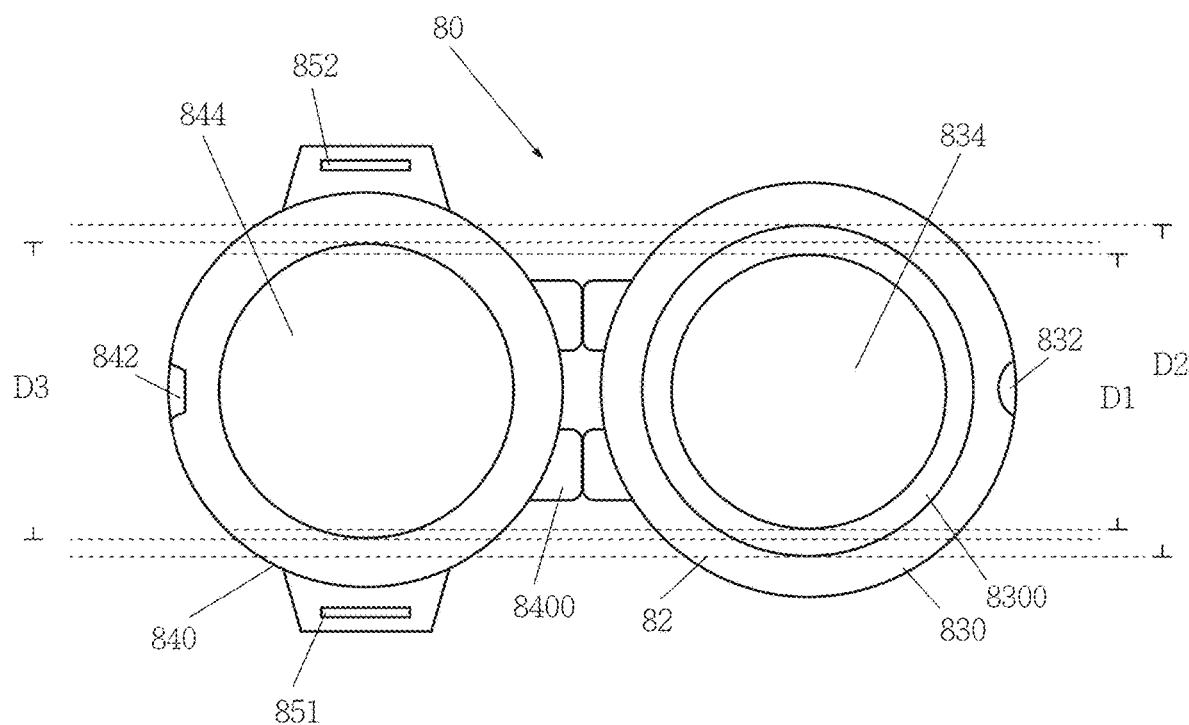
FIG. 20 and FIG. 21 are schematic views showing an open and a close state of another embodiment of the fixing device according to the present invention.
Figure 21:
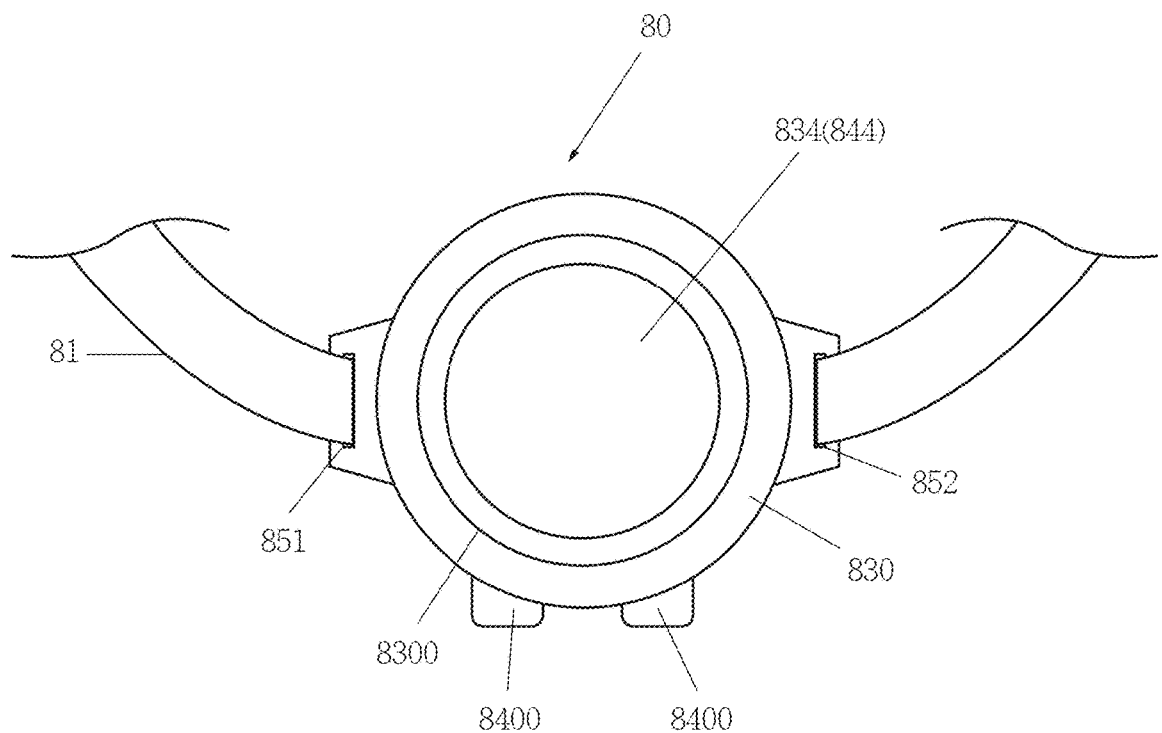

Referring to FIGS. 24, 24A, 24B to FIGS. 25, 25A, 25B, along with FIG. 20, which show a protruding edge 8300 additionally provided on the first passage 834 of the first main body 830 of the embodiment, wherein the sides of the protruding edge 8300 assume a slight gradient with a narrow upper and wide lower. A diameter D1 of the end opening of the protruding edge 8300 is slightly smaller than a diameter D2 of the bottom portion of the protruding edge 8300; moreover, the diameter D1 is smaller than a diameter D3 of the second passage 844 (see FIG. 20), thereby enabling an easier and more stable clasping operation between the first main body 830 and the second main body 840. To operate, the user first places the pet droppings collection bag 86 onto the protruding edge 8300, and then uses the female fastener 832 of the first main body 830 and the male fastener 842 of the second main body 840 to hold down and fix the pet droppings collection bag 86 therebetween. Furthermore, because the protruding edge 8300 fitted on the first passage 834 is provided with a height H (see FIGS. 20 and 24), after folding down the first main body 830 onto the second main body 840, the protruding edge 8300 fitted with the pet droppings collection bag 86 protrudes out from the second main body 840 (see FIGS. 25 and 25A), thereby causing the pet droppings collection bag 86 to contact the area surrounding the pet's anus, and, thus preventing, when the pet has diarrhea or is expelling soft stool, the discharged feces contacting and dirtying the fixing device 80 positioned surrounding the pet's anus.

As shown in the drawings, the exterior of the protruding edge 8300 is to provided with a clasp groove 8301, and a corresponding clasp 8401 is provided on the peripheral edge of the second passage 844. The angle of an inclination 51 of the clasp 8401 is such to operate in coordination with the shape of the clasp groove 8301. Moreover, the male fastener 842 of the second main body 840 is provided with an inclination S2, and the angle of the inclination S2 is such to operate in coordination with the shape of the female fastener 832 of the first main body 830. After folding down the first main body 830 onto the second main body 840, the protruding edge 8300 protrudes out from the second main body 840, whereupon the clasp groove 8301 provided on the peripheral edge of the first passage 834 corresponds to the clasp 8401 provided on the peripheral edge of the second passage 844, and the female fastener 832 of the first main body 830 corresponds to the male fastener 842 of the second main body 840, thereby achieving a firmer clasping effect; the female fastener 842 can alternatively be replaced by male fastener 832 and vise versa.

Referring to FIGS. 26 to 29, which show the embodiment of the fixing device 80 as modified, wherein the two sides of the second main body 840 are additionally fitted with a left swinging member 88 and a right swinging member 87. Furthermore, the left, right swinging members 88, 87 are respectively provided with left, right holes 851, 852, which enable joining together of the separable left, right fixing belts 81, 82 (see FIG. 21). The two sides of the second main body 840 are respectively provided with left, right active holes 8403, 8402, and the left, right swinging members 88, 87 are respectively fitted with left, right movable members 882, 872 corresponding to the left and right active holes 8403, 8402. When the left, right fixing belts 81, 82 are joined together through the respective left, right holes 851, 852, the left, right movable members 882, 872 and the left, right active holes 8403, 8402 enable movable adjusting the joining angle of the left, right swinging members 88, 87 and the left, right fixing belts 81, 82 with the retaining element 160 fitted on the support enclosure 16, as well as enabling forming a firmer joining angle between the fixing device 80 and the pet's buttocks.

In addition, at least one outer extended member 8302 is provided on the top edge position at the end opening of the protruding edge 8300 provided on the first main body 830. After folding down the first main body 830 onto the second main body 840, the protruding edge 8300 protrudes out from the second main body 840, whereupon the outer extended members 8302 are used to achieve a stable clasping effect with the peripheral edge of the second passage 844. In the present embodiment, because the end opening top edge of the protruding edge 8300 is provided with the outer extended members 8302, thus, the sides of the passage 834 do not need to assume a tapered shape with a narrow upper and wide lower; moreover, the clasp groove 8301 and the clasp 8401 shown in the above-described embodiment are also not needed between the first and second passages 834, 844.

When its required to open the first main body 830 and the second main body 840, the user can press the external extended members 8302 to cause slight deformation thereof and enable separation of the first main body 830 and the second main body 840.

Figure 32:
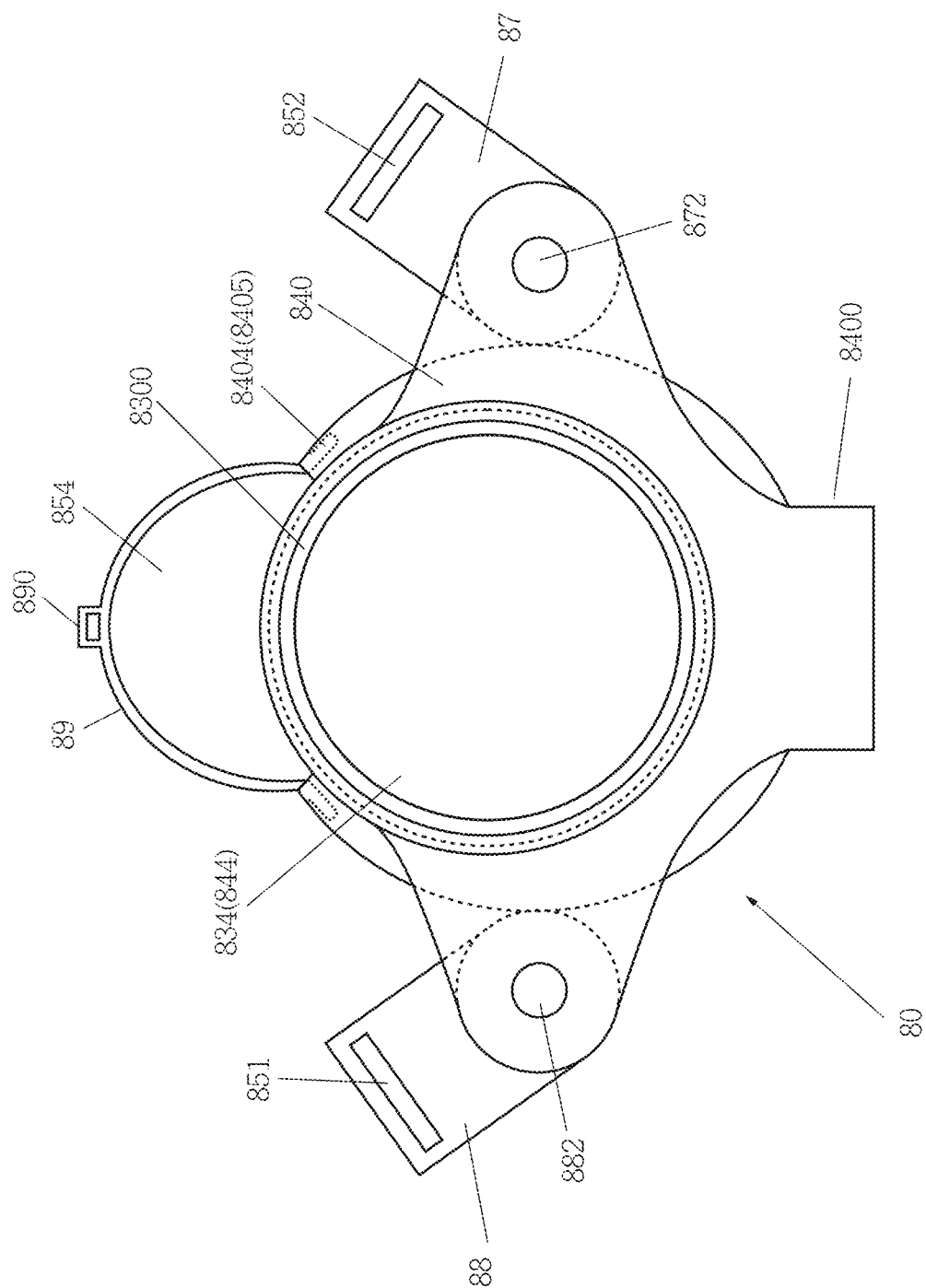
FIG. 32 is a assembled state schematic view of FIG. 30 according to the present invention.
Figure 33:
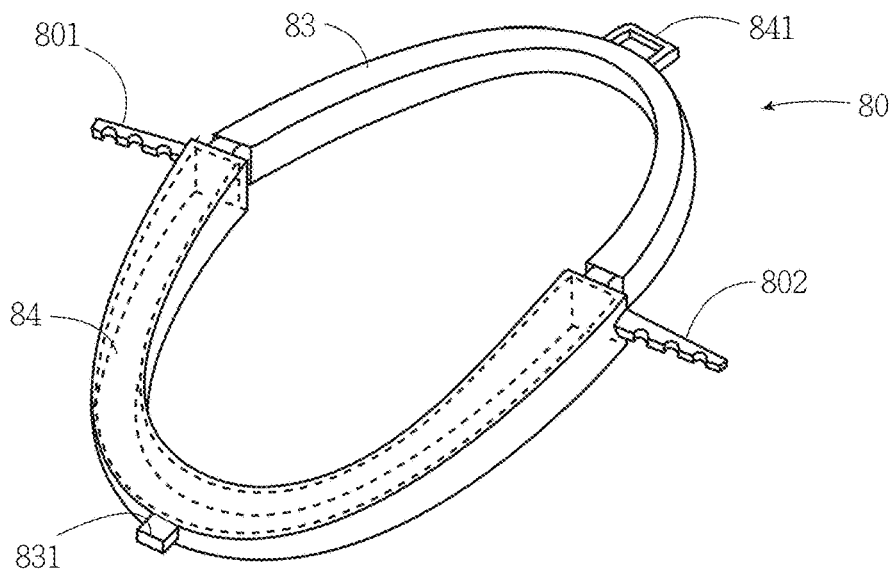
FIG. 33 to FIG. 35 are structural schematic views of the modified embodiment depicting operating states of the fixing device according to the present invention.

Referring to FIGS. 30 to 32, the fixing device 80 as shown in FIGS. 68 to 71, wherein the embodiment further provides the upper edge of the second main body 840 with an indentation 8441, the two sides of which are respectively provided with a left pin hole 8405 and a right pin hole 8404. The upper portion of the second main body 840 is further fitted with an arched body 89 provided with a recess 854, wherein the arched body 89 is an inverse U shape as shown in the diagrams; however, the arched body 89 can also be configured as an inverse V shape or other shapes (not shown in the drawings). The two ends of the arched body 89 are respectively fitted with a left pin member 891 and a right pin member 892, which are movable disposed within the left right pin holes 8405, 8404, respectively, thereby enabling rotational movement of the arched body 89 to the required angle. To operate, the angle of the arched body 89 is rotated until parallel with the angle of the second passage 844, whereupon the recess 854 provides space for a pet's tail to easily pass therethrough, after which the arched body 89 is rotated approximately 90 degrees and horizontally disposed on the pet's back. The upper side of the second main body 840 of the present embodiment uses the structure of the indentation 8441 to enable the arched body 89 provided with the recess 854 to connect therein. The fixing device 80 can also be changed and produced as an integral body provided with an appropriate bend angle (not shown in the drawings).

In addition, the upper portion of the arched body 89 is additionally provided with an upper hole 890, which is used to connect a movable separable upper fixing belt (not shown in the drawings, reference FIG. 63), with the other end of the upper fixing belt connected to the retaining elements 160 (including ring member or sleeve member) provided on the support enclosure 16, thereby enabling more stable holding of the fixing device 80 at the position surrounding the pet's anus. In the present embodiment, because the upper edge of the second main body 840 is to provided with the indentation 8441, hence, after clasping together the first and second main bodies 830, 840, only the upper edge of the first main body 830 is positioned between the pet's anus and tail. Because the area of contact surrounding the pet's anus is very small, thus the pet's defecation easily drops into the interior of the pet droppings collection bag 86.

Figure 34:
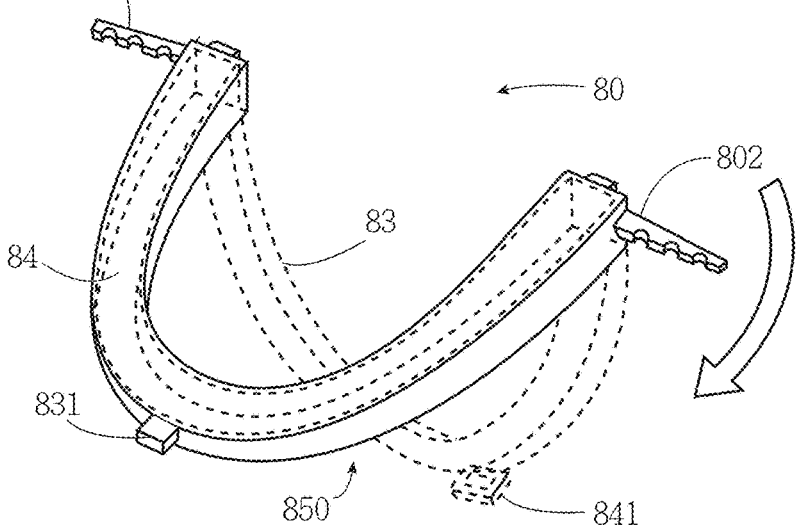
Figure 35:
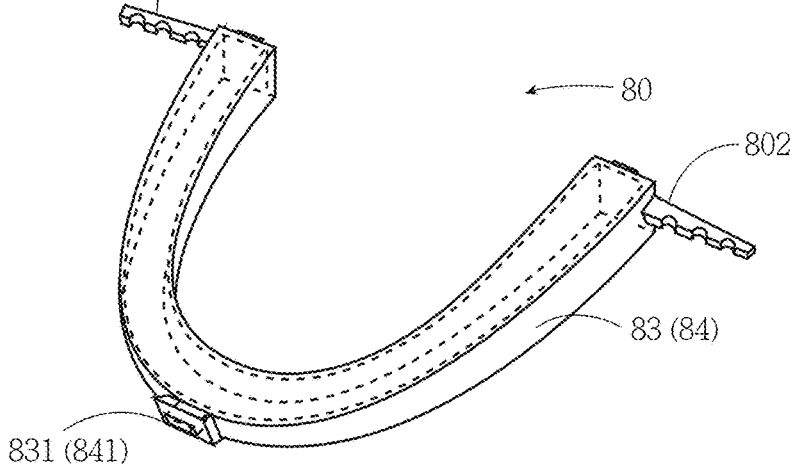

Referring to FIGS. 33 to 37, which show the embodiment applied in the support enclosure 16 being worn on the pet's body, and further applied in a fixing device 80 for a pet droppings collection bag 86, wherein the rear side of the support enclosure 16 is provided with a plurality of retaining elements 160. The plurality of retaining elements 160 are fitted with the external connection fixing device 80, and the fixing device 80 is used to securely fix the pet droppings collection bag 86. The fixing device 80 is provided with left and right hook members 801, 802 able to securely hook onto the plurality of retaining elements 160 (see FIGS. 36 and 37). The surfaces of the left and right hook members 801, 802 are provided with a plurality of indentations (see FIGS. 33 to 35) or at least one indentation to reinforce the secure hooking effectiveness. The left and right hook members 801, 802 are used to penetrate inside the plurality of retaining elements 160, enabling secure positioning of the pet droppings collection bag 86 at the position of a pet's anus. The fixing device 80 is a ring member provided with corresponding male and female clasp grooves 83, 84. The bend structure on the two ends of the male and female clasp grooves 83, 84 are used to achieve an open/close function (see FIGS. 33 to 35); moreover, the male and female clasp grooves 83, 84 comprise a male fastener 831 and a female fastener 841, respectively. When in use, the opening of the pet droppings collection bag 86 is correspondingly positioned at a clip opening 850 formed before closing the male and female clasp grooves 83, 84 (as shown in FIG. 34), whereupon the clip opening 850 and the closing action of the male and female fasteners 831, 841 are used to securely fix the pet droppings collection bag 86 (as shown in FIGS. 36 and 37).

Furthermore, as shown in FIGS. 1 and 3, the front harness 16A or the rear harness 16B fitted with at least one retaining element 160 is used to mount the external connected fixing device 80, and the fixing device 80 is used to securely fix the pet droppings collection bag 86. The fixing device 80 being fixedly positioned with the retaining elements 160, the left, right fixing belts 81, 82 (see FIGS. 18 and 19) or the left and right hook members 801, 802 (see FIGS. 33 to 35) are formed as an integral body, or the movable separable left, right fixing belts 81, 82 are used to pass through the left, right holes 851, 852 (see FIGS. 20 to 28), further joining together the left, right fixing belts 81, 82 and the retaining elements 160, facilitates fixedly positioning of the pet droppings collection bag 86 at the position of the pet's anus. Moreover, the fixing device 80, apart from enabling fixedly joining the retaining elements 160 fitted on the rear harness 16B, the second traverse belt 16A2 of the front harness 16A of the embodiment can also be fitted with the retaining elements 160 (see FIGS. 1 and 10) to enable fixedly joining the fixing device 80. Because the pet's anus and tail are extremely close together (especially in small sized pets), thus, the first, second passages 834, 844 of the embodiment are provided at positions close to the upper edges of the first, second main bodies 830, 840, hence, after clasping the two together, the upper edges form a small size (see FIG. 28) and are located at a position between the pet's anus and tail in respect of the present invention applied in rain outfit structure for people use, please refer to FIGS. 38 and 39, which show a first embodiment of the rain outfit structure, comprising a flexible enclosure 3 constituted by a front breadth 30F and a rear breadth 50, a wear-on port 27 and an exit port 28. The wear-on port 27 includes a left opening 22, a right opening 23 and a lower opening 25. The exit port 28 is disposed above a space between the front breadth 30F and the rear breadth 50. The flexible enclosure 3 further includes two shoulder portions 208 and two sleeve portions 209. The exit port 28 is extended toward the shoulder portions 208 and the sleeve portions 29 from left and right, and the left and right sides of the exit port 28 include a side extension port 200 respectively. A left and right side of the side extension port 200 on an edge of the front breadth 30F is provided respectively with an upper open-close piece 52, and the left and right side of the side extension port 200 on an edge of the rear breadth 50 is provided respectively with an upper open-close assembly 51. As shown in the drawing, the present embodiment takes a cape-like raincoat as an example. As the exit port 28 is provided with a structure that extends rightward and leftward, when the exit port 28 is combined with the side extension ports 200 and is completely opened, the aperture of the exit port 28 can be configured to be twice large as a diameter of a helmet that is worn on a user's head. Therefore, when there is unexpected heavy rain, the user can quickly put on or take off the coat without taking off the helmet.

Referring to FIG. 53A and FIG. 53B at a same time, the rear breadth 50 of a raincoat is provided with an upper covering strip 511 above the upper open-close piece 52 and the upper open-close assembly 51. The upper open-close piece 52 and the upper open-close assembly 51 are disposed on a height of the shoulder of the user, an opening between the upper open-close piece 52 and the upper open-close assembly 51 is toward a lower front of the shoulder obliquely, and the area of the upper covering strip 511 is larger than the area of the combination of the upper open-close piece 52 and the upper open-close assembly 51; therefore, by that the upper covering strip 511 covers toward the lower front direction, even the heavy rain impinges on the upper covering strip 511, the rain will slide down instantly, without seeping into the gap between the upper open-close piece 51 and the upper open-close assembly 51.

Figure 38:
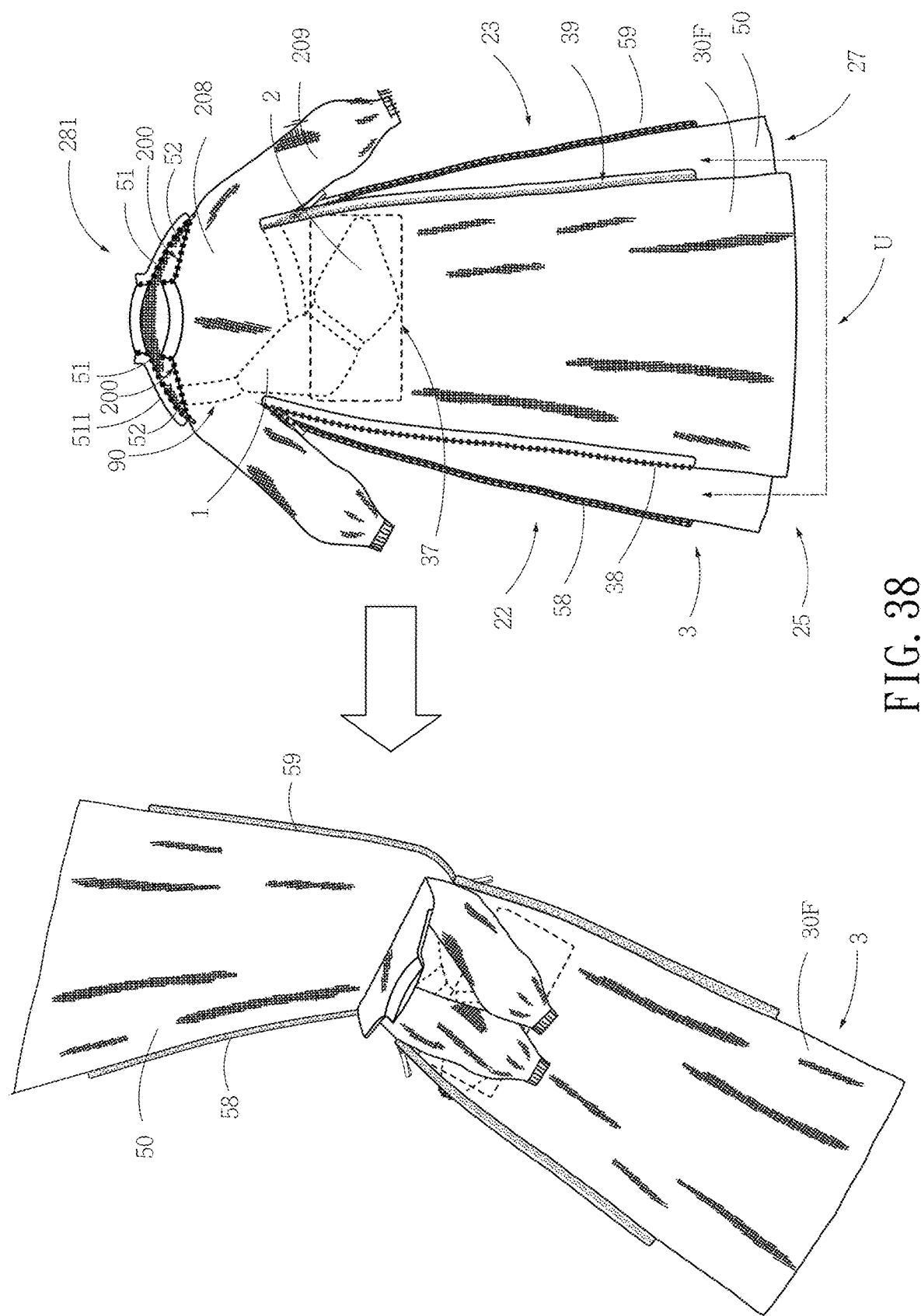
FIG. 38 and FIG. 39 show schematic views of a folding procedure, according to a first embodiment of the present invention.

Moreover, the left and right openings 22, 23 are disposed on a left side and a right side between the front breadth 30F and the rear breadth 50, the left and right openings 22, 23 are extended toward the lower opening 25 from an armpit location below the sleeve portions 209, and edges of the front breadth 30F and the rear breadth 50 at the left and right openings 22, 23 are provided with a left open-close piece 38, a left open-close assembly 58, a right open-close piece 39, and a right open-close assembly 59. Upon using the body-worn structure, the left open-close piece 38, the left open-close assembly 58, the right open-close piece 39, and the right open-close assembly 59 are opened first. Therefore, a U-shaped opening U (as shown in FIG. 38) is formed by connecting the left, right sides to the lower side of the raincoat or coat, acting as the wear-on port 27. In the present embodiment, by the left and right openings 22, 23 that connect the lower opening 25, the opening size of the wear-on port 27 can be enlarged, so as to decrease the distance between the wear-on port 27 and the exit port 28, thereby allowing the user to put on or take off the raincoat or coat quickly.

Figure 41:
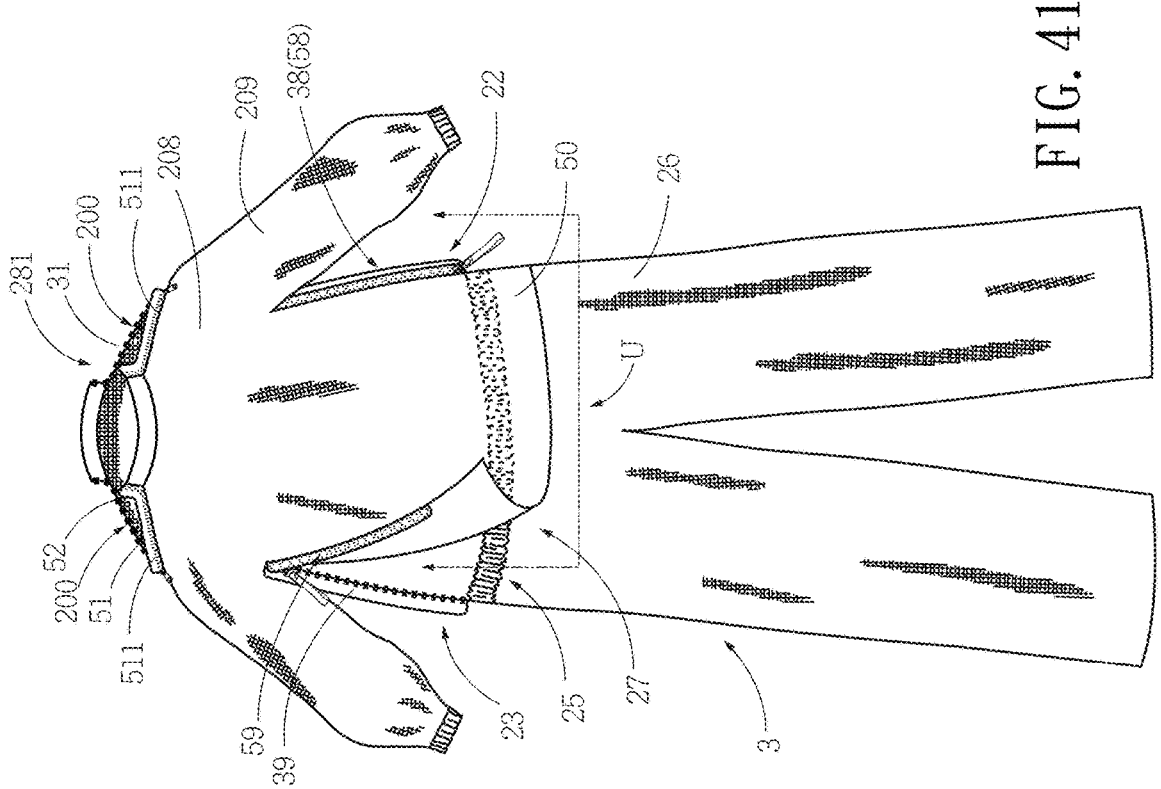
FIG. 41 shows a rear structural view of the second embodiment of the present invention at the expanded condition.
Figure 40:
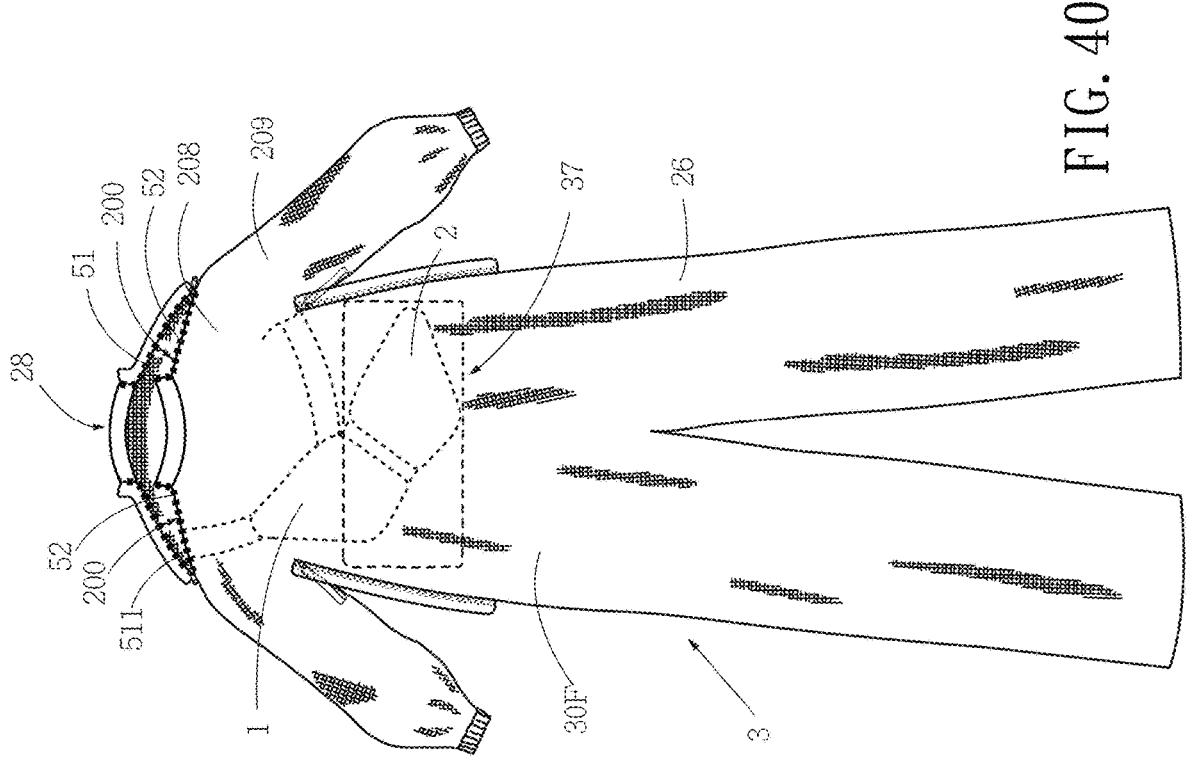
FIG. 40 shows a front structural view of a second embodiment of the present invention at an expanded condition.
Figure 42:
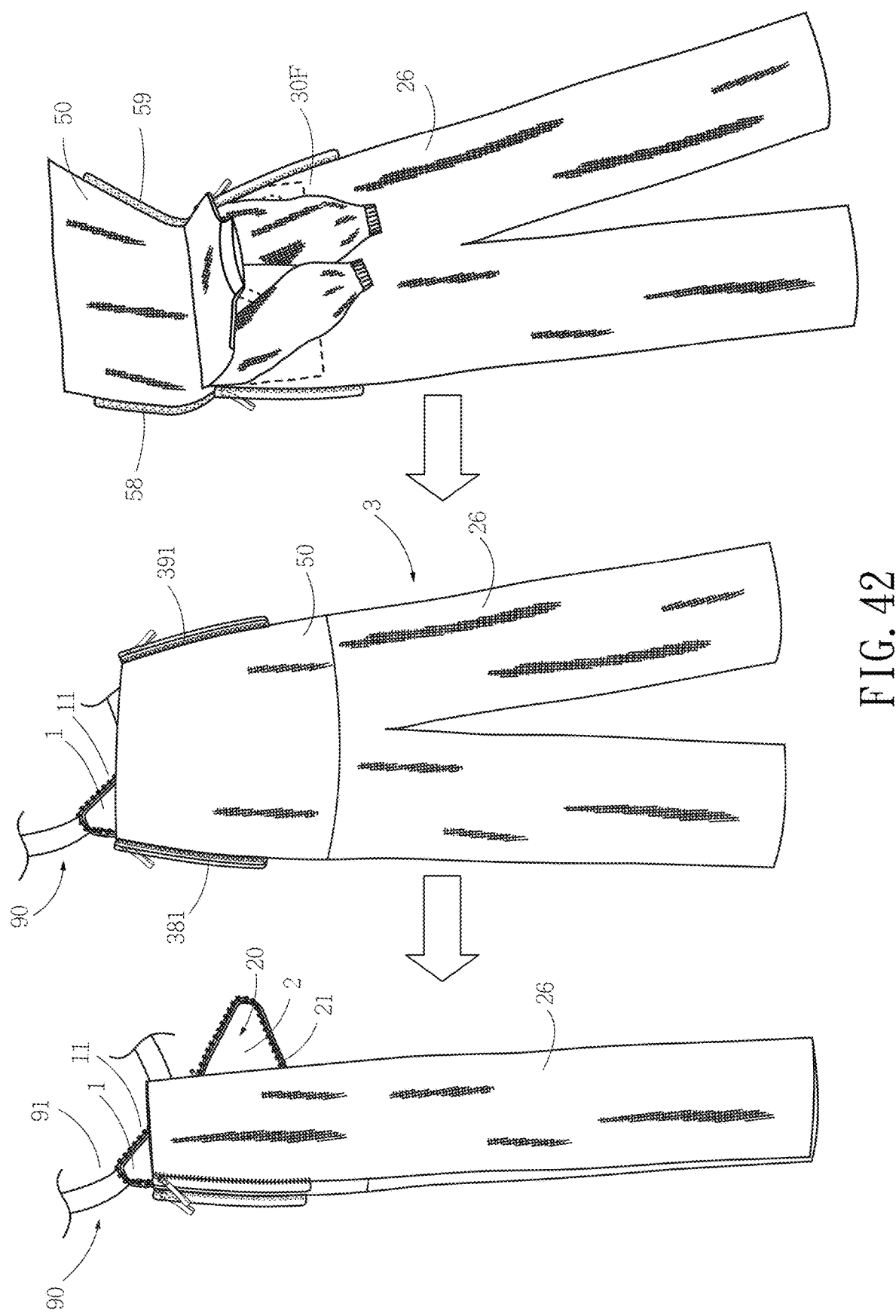
FIG. 42 shows a schematic view of a folding procedure according to the second embodiment of the present invention.

Referring to FIGS. 40 to 42, which show a second embodiment of the rain outfit structure, comprising a flexible enclosure 3 constituted by a front breadth 30F and a rear breadth 50, an exit port 28, a left opening 22, a right opening 23 and a lower opening 25. The exit port 28 is disposed above a space between the front breadth 30F and the rear breadth 50. The flexible enclosure 3 further includes two shoulder portions 208 and two sleeve portions 209. The left and right sides of the exit port 28 include a side extension port 200 respectively, and the side extension port 200 is extended toward the shoulder portions 208 and the sleeve portions 209 from the left and right sides of the exit port 28.

A left and right side of the side extension port 200 on an edge of the front breadth 30F is provided respectively with an upper open-close piece 52, and the left and right side of the side extension port 200 on an edge of the rear breadth 50 is provided respectively with an upper open-close assembly 51. As shown in the drawing, the present embodiment is a structure that combines the flexible enclosure 3 with a jumpsuit 26. The exit port 28 of the present embodiment is the same as that in the first embodiment, i.e., a structure that extends leftward and rightward. Therefore, when the exit port 28 is combined with the side extension ports 200 and is opened completely, an automobile rider can put on or take off the coat quickly without taking off the helmet in heavy rain while riding an automobile. In addition, the rear breadth 50 is provided with an upper covering strip 511 above the upper open-close piece 52 and the upper-close assembly 52, which can achieve the same rain-proofing effect as described in the first embodiment.

The present embodiment is different from the first embodiment in that the front breadth 30F or the rear breadth 50 of the present embodiment is connected with a jumpsuit 26, wherein the wear-on port 27 is formed at a location where the front breadth 30F or the rear breadth 50 is not completely connected with the jumpsuit 26, and the wear-on port 27 is exactly at a U-shaped opening U that is formed by the left, right openings 22, 23 extending to an armpit location below the sleeve portions 209 and toward the lower opening 25. Therefore, this U-shaped opening U is the wear-on port 27 for both the jumpsuit 26 and the flexible enclosure 3. In addition, edges of the front breadth 30F and the rear breadth 50 at the left, right openings 22, 23 are provided respectively with a left open-close piece 38, a left open-close assembly 58, a right open-close piece 39 and a right open-close assembly 59. Upon using the present embodiment, the left open-close piece 38, the left open-close assembly 58, the right open-close piece 39, and the right open-close assembly 59 are opened first. By using the enlarged U-shaped opening U (as shown in FIG. 41) as the wear-on port 27, the distance between the wear-on port 27 and the exit port 28 is decreased, thereby allowing the user to put on or take off the flexible enclosure 3 and the jumpsuit 26 quickly.

Referring to FIGS. 8 to 10, a third embodiment of the rain outfit structure, comprises a flexible enclosure 3 constituted by a front breadth 30F and a rear breadth 50, an exit port 28, a rear opening 24, a lower opening 25 and a back cover portion 500. The exit port 28 is disposed above a space between the front breadth 30F and the rear breadth 50. The flexible enclosure 3 includes two shoulder portions 208 and two sleeve portions 209. A left and right side of the exit port 28 includes a side extension port 200 which is extended toward the shoulder portions 208 and the sleeve portions 209 via the left and right side of the exit port 28. A left and right side of the side extension port 200 on an edge of the front breadth 30F is provided respectively with an upper open-close piece 52; whereas, the left and right side of the side extension port 200 on an edge of rear breadth 50 are provided respectively with an upper open-close assembly 51. As shown in the drawing, the present embodiment is a cape-like raincoat, and the exit port 28, the upper open-close piece 52, the upper open-close assembly 51, and the upper covering strip 511 are the same as that described in the first and second embodiments in terms of structures and functions; therefore, no further description is provided.

The present embodiment is different from the first and second embodiments in that the rear opening 24 of the present embodiment is disposed on the rear breadth 50, including a left piece 501 and a right piece 502 which are split with respect to each other. In addition, the rear opening 24 is extended toward the lower opening 25 from a central split location. An edge of the left piece 501 is provided with an open-close piece 503, and an edge of the right piece 502 is provided to with an open-close assembly 504 correspondingly. A pull-back piece 506 is disposed between the open-close piece 503 and the open-close assembly 504. In wearing the present embodiment, the open-close piece 503 and the open-close assembly 504 are first pulled by the pull-back piece 506 to open the rear opening 24. Then, the user can first sheath in the head from the rear opening 24, and sheath the head out of the exit port 28. For the raincoat or the coat, an inverted-T opening T is formed by connecting the rear opening 25 to the lower opening 25 to act as the wear-on port 27, so that the opening size of the wear-on port 27 can be enlarged, thereby decreasing the distance between the wear-on port 27 and the exit port 28 and thus achieving the effect that the raincoat or coat can be put on or taken off quickly.

In the present embodiment, the back cover portion 500 is disposed above the rear opening 24, and an upper edge of the back cover portion 500 is connected with an upper edge of the rear breadth 50; whereas, a lower edge of the back cover portion 500 covers on the split rear opening 24 in an open-end condition, forming a rain-stopping rear baffle like an eave. Therefore, in heavy rain, rain impinges on the back cover portion 500 from top to bottom, and then slides downward, which further intensifies the rain-proofing effect of preventing rain from seeping into the gap between the open-close piece 503 and the open-close assembly 504.

Figure 13:
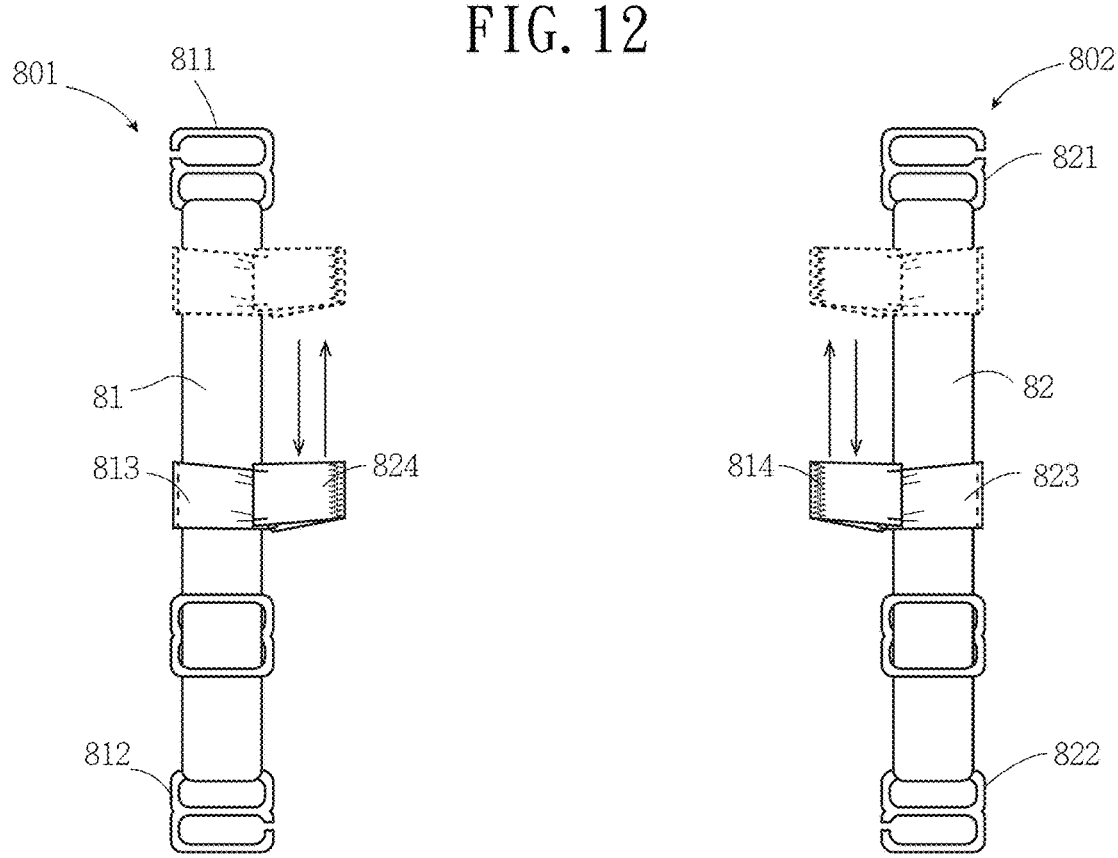

Referring to FIGS. 48 to 51, a fourth embodiment of present invention applied in rain outfit structure comprises a flexible enclosure 3 constituted by a front breadth 30F and a rear breadth 50, a wear-on port 27 and an exit port 28. The wear-on port 27 includes a left opening 22, a right opening 23 and a lower opening 25. The flexible enclosure 3 is in shape of one piece of sheet material, and a central location 3X of the flexible enclosure 3 is bent and folded to form the front breadth 30F and the rear breadth 50 (as shown in FIG. 13). The exit port 28 is disposed above a space between the front breadth 30F and the rear breadth 50. The left and right openings 22, 23 are disposed on a left side and a right side between the front breadth 30F and the rear breadth 50, are extended toward the lower opening 25 from an armpit location below the sleeve portions 209, and are connected together between the front breadth 30F and the rear breadth 50 to form a U-shaped opening U (as shown in FIG. 12 and FIG. 13). This U-shaped opening U acts as the wear-on port 27.

The exit port 28 is provided with a front opening 34 on the front breadth 30F, edges on two sides of the front opening 34 are provided to respectively with a front open-close piece 35 and a front open-close assembly 36, so that the front opening 34 can be opened or closed. In wearing the present embodiment, the user can first sheath in the head from the U-shaped opening U, and then sheath the head out of the exit port 28. By the enlarged U-shaped opening U, the distance between the wear-on port 27 and the exit port 28 can be decreased, thereby allowing the user to put on or take off the raincoat or coat quickly. The exit port 28 in the present embodiment can be also configured as the upper open-close piece 52 and the upper open-close assembly 51 as described in the first to third embodiment, and is used as a substitute for the front open-close piece 35 and the front open-close assembly 36.

A periphery of the exit port 28 can be also provided with a shrinking piece 280 to facilitate restoring the exit port 28 to the size of an ordinary neckline by the extension function of the shrinking piece 280 after the helmet is sheathed out of the exit port 28, when the user wears on the present embodiment. The shrinking piece 280 includes an elastic ribbon, a contraction band or a collecting element associated with a rope (these are all conventional structures and thus are not shown in the drawings). Besides that, the exit port 28 can be further combined with the front opening 34. Therefore, when the exit port 28, associated with the front opening 34, is fully opened, the aperture of the exit port 28 can be double or even larger than the diameter of the coat after the user wears on a helmet, so that the user can quickly put on or take off the coat without taking off the helmet. In addition to being applied to the present embodiment, the abovementioned shrinking piece 280 that is disposed on the periphery of the exit port 28 can be also combined in and applied to the first to third embodiment described above to assist the open-close function.

Accordingly, as the flexible enclosure 3 of the present embodiment is in shape of one piece of sheet material structure before folding, inner sides of the left and right openings 22, 23 are provided respectively with a fixing portion 201, and two ends of the fixing portion 201 are provided respectively with a first fixing member 202 and a first fixing assembly 203, so that a wrist of the user can be fixed on the inner sides of the left and right openings 22, 23 (as shown in FIG. 48).

Opposite to the first fixing member 202 and the first fixing assembly 203, an inner side of the one-piece-like flexible enclosure 3 in the present embodiment is provided with a second fixing member 204 and a second fixing assembly 205. When the fixing portion 201 is not used, by matching the second fixing member 204 and the second fixing assembly 205 with the first fixing member 202 and the first fixing assembly 203, the fixing portion 201 can be positioned on the inner side of the flexible enclosure 3.

Figure 43:
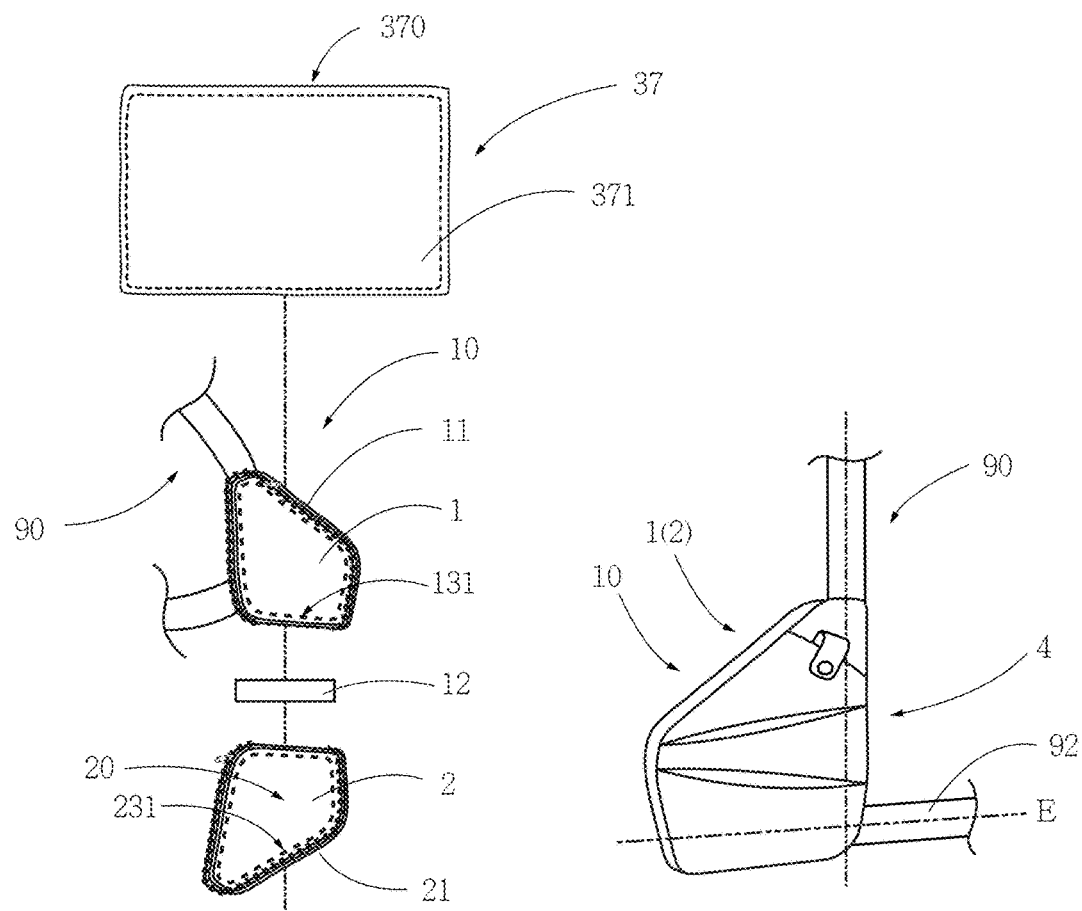
FIG. 43 shows a schematic view of a shoulder bag formed by a front cover sheet and a rear cover sheet, according to the present invention.
Figure 44:
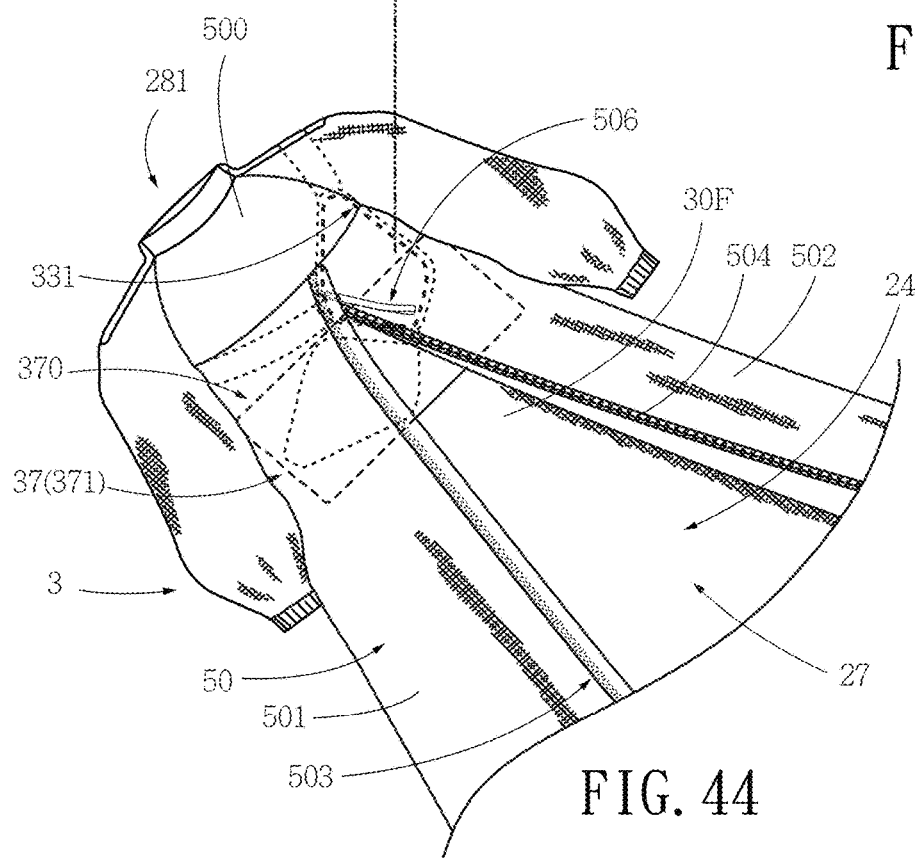
FIG. 44 shows an exploded view of a third embodiment of the present invention at an expanded condition.
Figure 45:
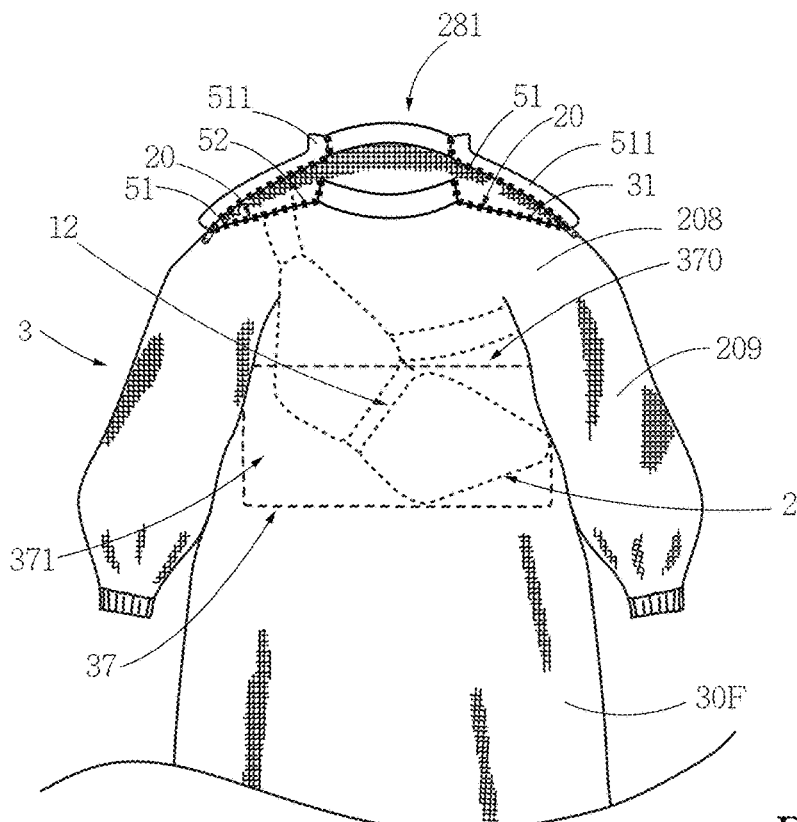
FIG. 45 and FIG. 46 show schematic views of the third embodiment of the present invention at the expanded condition.
Figure 46:
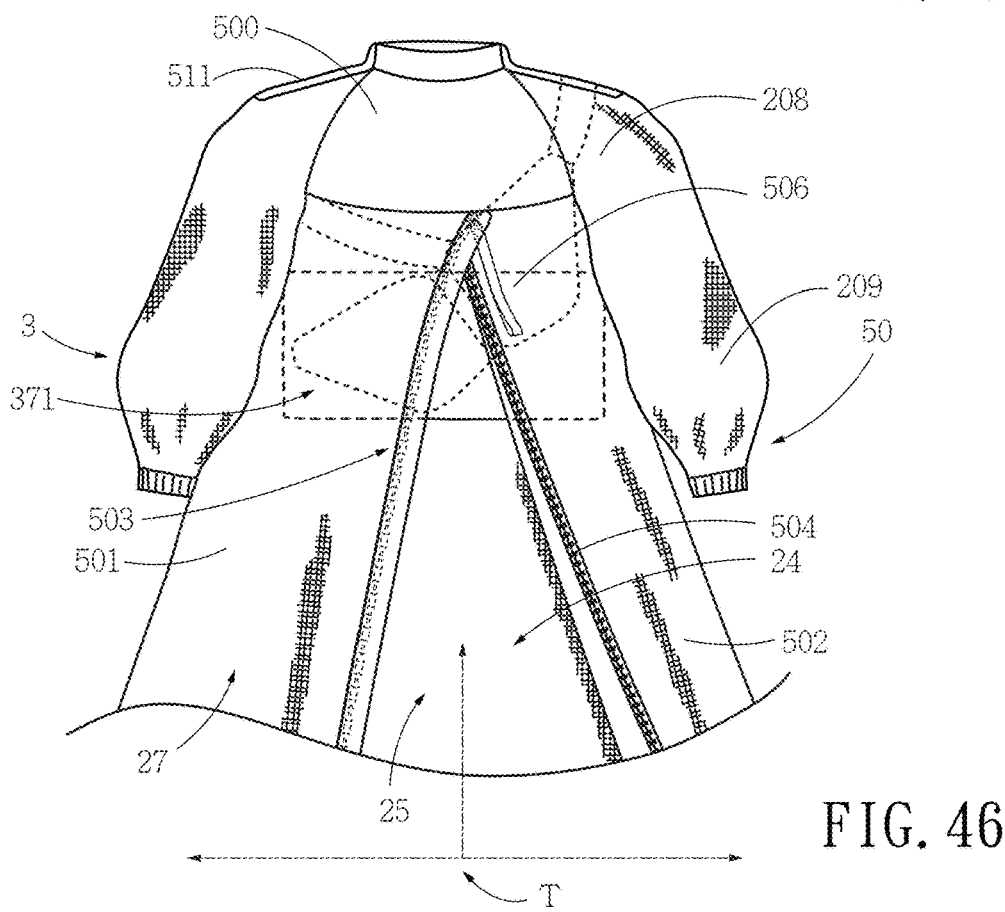

Referring to FIG. 43 and FIG. 44, and related drawings of the first to fourth embodiment, the present invention can be further combined with an expansion/retaining device 10 constituted by a front cover sheet 1 and a rear cover sheet 2. The front cover sheet 1 and the rear cover sheet 2 are connected together by a connecting portion 12, the front cover sheet 1 is provided with a first joining edge 131, and the rear cover sheet 2 is provided with a second joining edge 231. An inner side of the front breadth 30F is provided with a third joining edge 331, and the front cover sheet 1 or the rear cover sheet 2 can be connected with the third joining edge 331 on the inner side of the front breadth 30F by the first and second joining edges 131, 231. As shown in the drawings, the present embodiment uses the first joining edge 131 of the front cover sheet 1 to connect with the third joining edge 331 of the front breadth 30F; therefore, the rear cover sheet 2 that is not connected with the front breadth 30F is vertically suspended below the connecting portion 12 as an open end. The front cover sheet 1 or the rear cover sheet 2 is provided at least with a shoulder strap 90, and a retaining space 20 is to formed between the front cover sheet 1 and the rear cover sheet 2. A cover piece 11 is disposed on the periphery of the front cover sheet 1, corresponding to a cover assembly 21 disposed on the periphery of the rear cover sheet 2. By the cover piece 11 and the cover assembly 21, the front breadth 30F and the rear breadth 50F, after being folded, can be contained in the retaining space 20 and the retaining space 20 is closed.

Furthermore, the front cover sheet 1 or the rear cover sheet 2 that is vertically suspended below the connecting portion 12 as an open end is provided with a positioning portion 37 opposite to the inner side of the front breadth 30F, and the positioning portion 37 includes all kinds of structures that can position the front cover sheet 1 or the rear cover sheet 2, such as a hook and loop fastener, a snap latch, a magnetic buckle, a fixing strap or a pocket. As shown in the drawings, a pocket 371 is provided with an insertion port 370 with an upward opening, allowing the front cover sheet 1 or the rear cover sheet 2 that is vertically suspended below the connecting portion 12 as an open end to be put into the pocket 371 from top to bottom. The pocket 371 can further catch an object that may drop out of a holding portion 4 when the holding portion 4 flips up and down along with the front cover sheet 1 or the rear cover sheet 2, during the expansion operation of the body-worn structure. This can assure that the contained object will not be lost, and can even allow the user to access the object in the holding portion 4 conveniently while the coat is put on the user.

Referring to FIG. 43, FIG. 44, FIG. 54 and FIG. 55 at a same time, the front cover sheet 1 and the rear cover sheet 2 are combined into a shoulder bag (as shown in FIG. 43 and FIG. 44) through the connecting portion 12. In addition, the front cover sheet 1 or the rear cover sheet 2 is provided with the holding portion 4 to put the required personal belongings.

Figure 54:
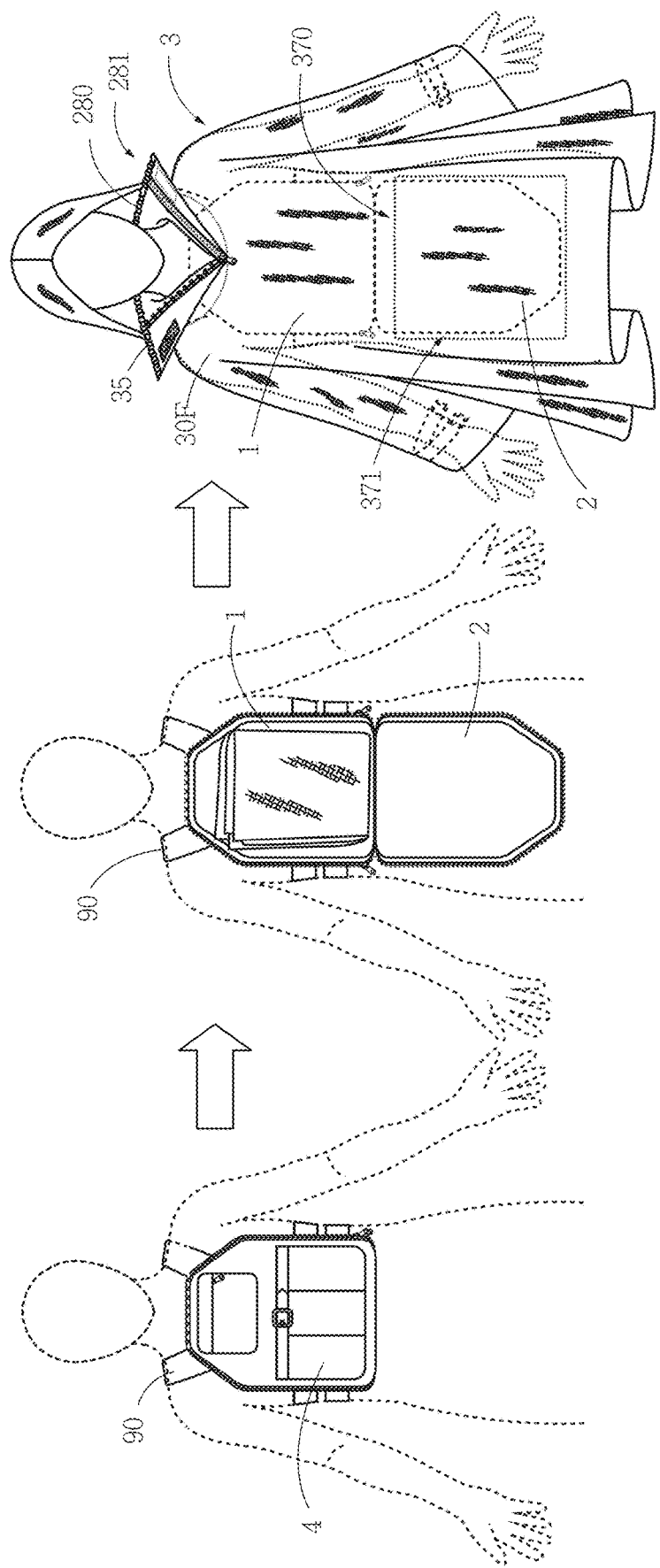
FIG. 54 shows a schematic view of the expanding operation when being applied to a vest according the fourth embodiment of the present invention.
Figure 55:
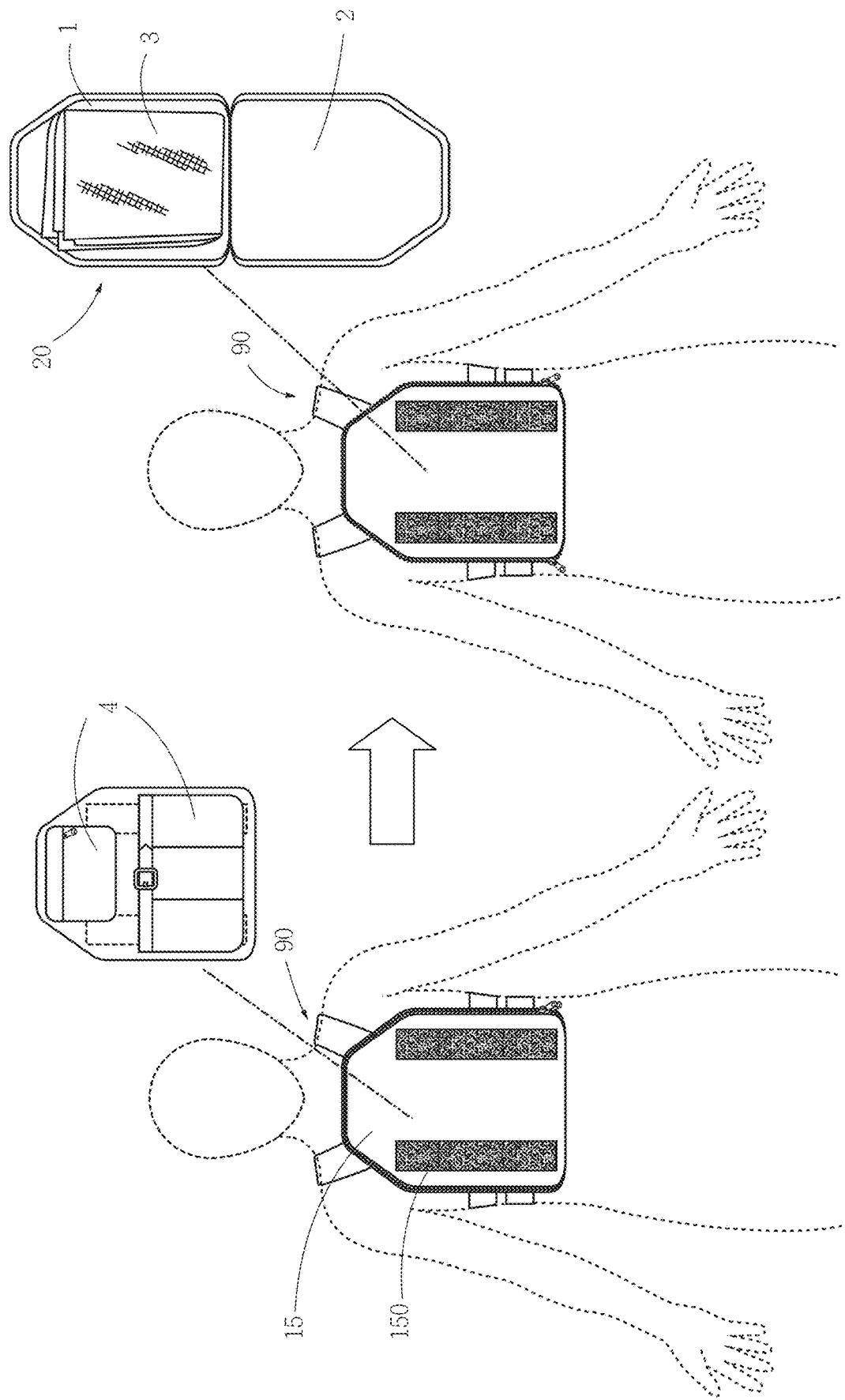
FIG. 55 shows a partial exploded view when being applied to a movable holding portion according to the present invention.

The expansion/retaining device 10 disclosed in the related drawings of the first to fourth embodiment takes primarily a shoulder bag in FIG. 43 and FIG. 44 as an example, describing the joining structure between the front, rear cover sheets 1, 2 and the flexible enclosure 3 (front breadth 30F and rear breadth 50) and the function thereof. However, as shown in FIG. 54 and FIG. 55, the front cover sheet 1 and the rear cover sheet 2 can be also configured as a jacket body 15 (vest), and the jacket body 15 is further provided with an assembly structure 150 (as shown in FIG. 55), so that the holding portion 4 can be assembled or dismantled movably for use.

Figure 52:
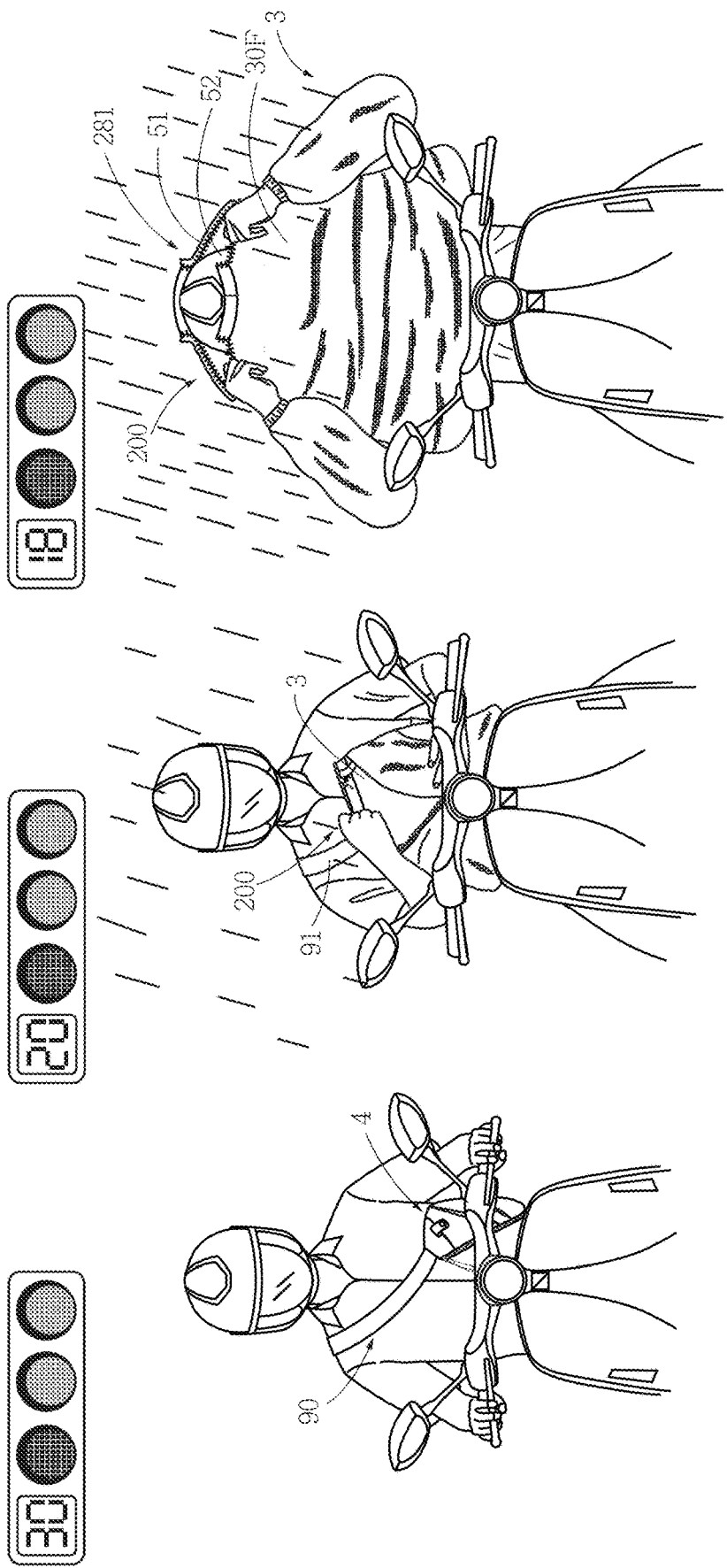
FIG. 52 and FIG. 53 show schematic views for the movements when carrying out the expanding procedure according to the present invention.
Figure 53:
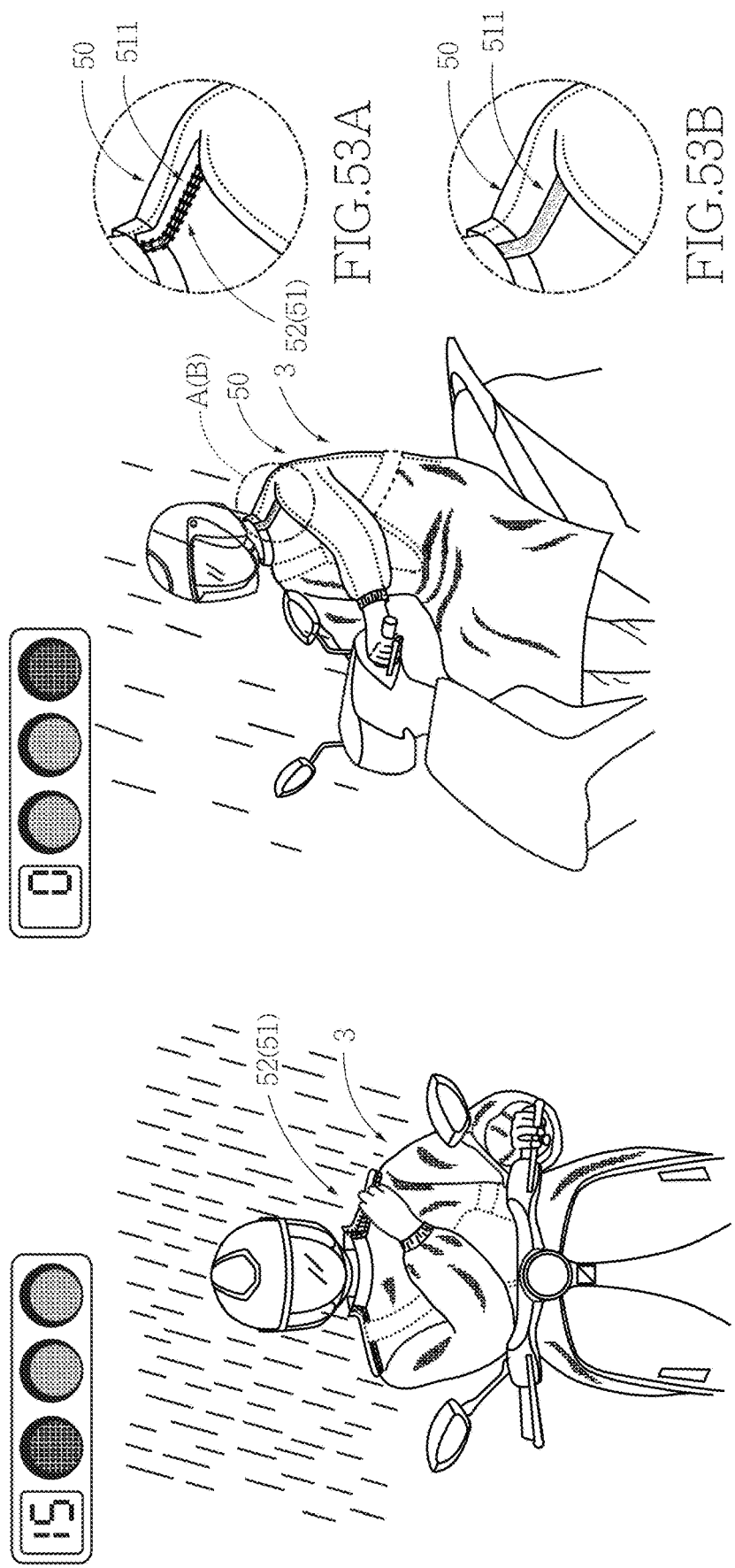

By the abovementioned structures, the embodiments as applied in the present invention can achieve the effect of putting on or taking off a coat quickly within a minimal time limit. As shown in FIG. 52 and FIG. 53, when the user rides a scooter or motorcycle in a rainy season and there is an unexpected heavy rain, the user can stop the scooter or motorcycle at a traffic light, and keep the original riding posture (30-second drawing). He or she first moves the shoulder bag from a side of the body to a chest (20-second drawing), expands the flexible enclosure 3 (cape-like raincoat) from the retaining space 30 of the shoulder bag constituted by the front and rear cover sheets 1, 2, and sheaths the head from top to bottom via the exit port 28 (18-second drawing), and finally closes the left and right side of the exit port 28 by the upper open-close pieces 52 at the left and right side on the edge of the front breadth 30F, and the upper open-close assemblies 51 at the left and right side on the edge of the rear breadth 50 (15-second drawing). Therefore, the user can expand the raincoat in the shoulder bag and wear it on in the shortest time (0-second drawing), without the need to park the scooter/motorcycle, get off scooter/motorcycle, take the raincoat out of the storage compartment, and then put it on, like using a conventional raincoat. Therefore, the traffic will not be interfered and the safety will not be affected.

For the first to fourth embodiment of the present invention, as each one has its own structural features, the folding method of each embodiment will be different too. The operating procedure of folding the outfit in each embodiment into the expansion/retaining device 10 while the user wears on the outfit is described below.

Figure 39:
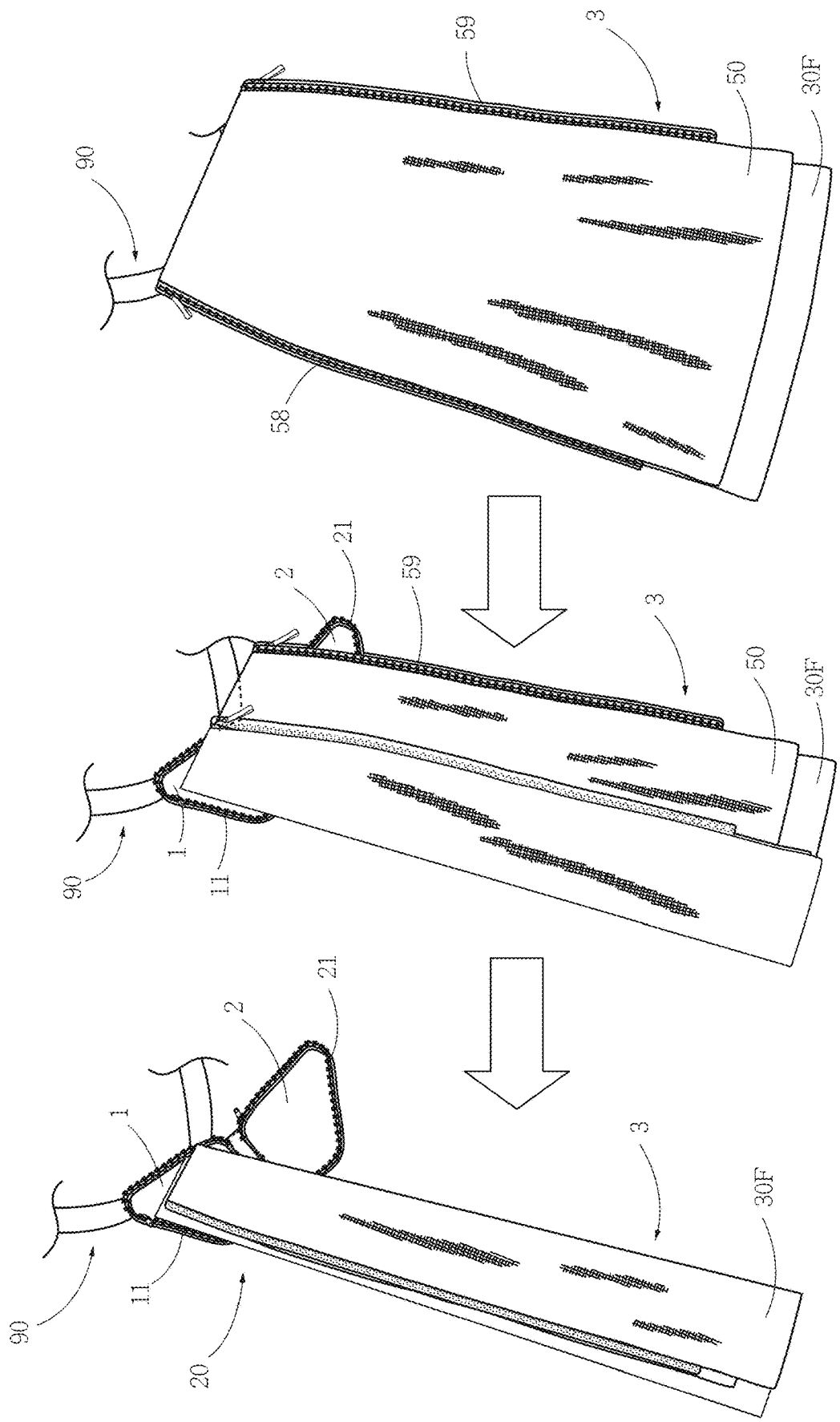

For the first embodiment, step (a) is to open the exit port 28 by the upper open-close pieces 52 and the upper open-close assemblies 51; step (b) is to open the left and right openings 22, 23 by the left open-close pieces 38, the left open-close assemblies 58, the right open-close pieces 39, and the right open-close assemblies 59; step (c) is that the user puts the head and the body out of the U-shaped opening U via the exit port 28; step (d) is to flip the rear breadth 50 toward the front breadth 30F (as shown in FIG. 38), and then cover the rear breadth 50 on the front breadth 30F; and step (e) is to fold the front breadth 30F, along with the rear breadth 50, into a long strip (as shown in FIG. 39).

For the second embodiment, steps (a), (b), (c), and (d) are the same as that in the first embodiment; whereas, step (e) is to fold the front breadth 30F and the rear breadth 50, along with the jumpsuit 26, into a long strip (as shown in FIG. 42).

Figure 47:
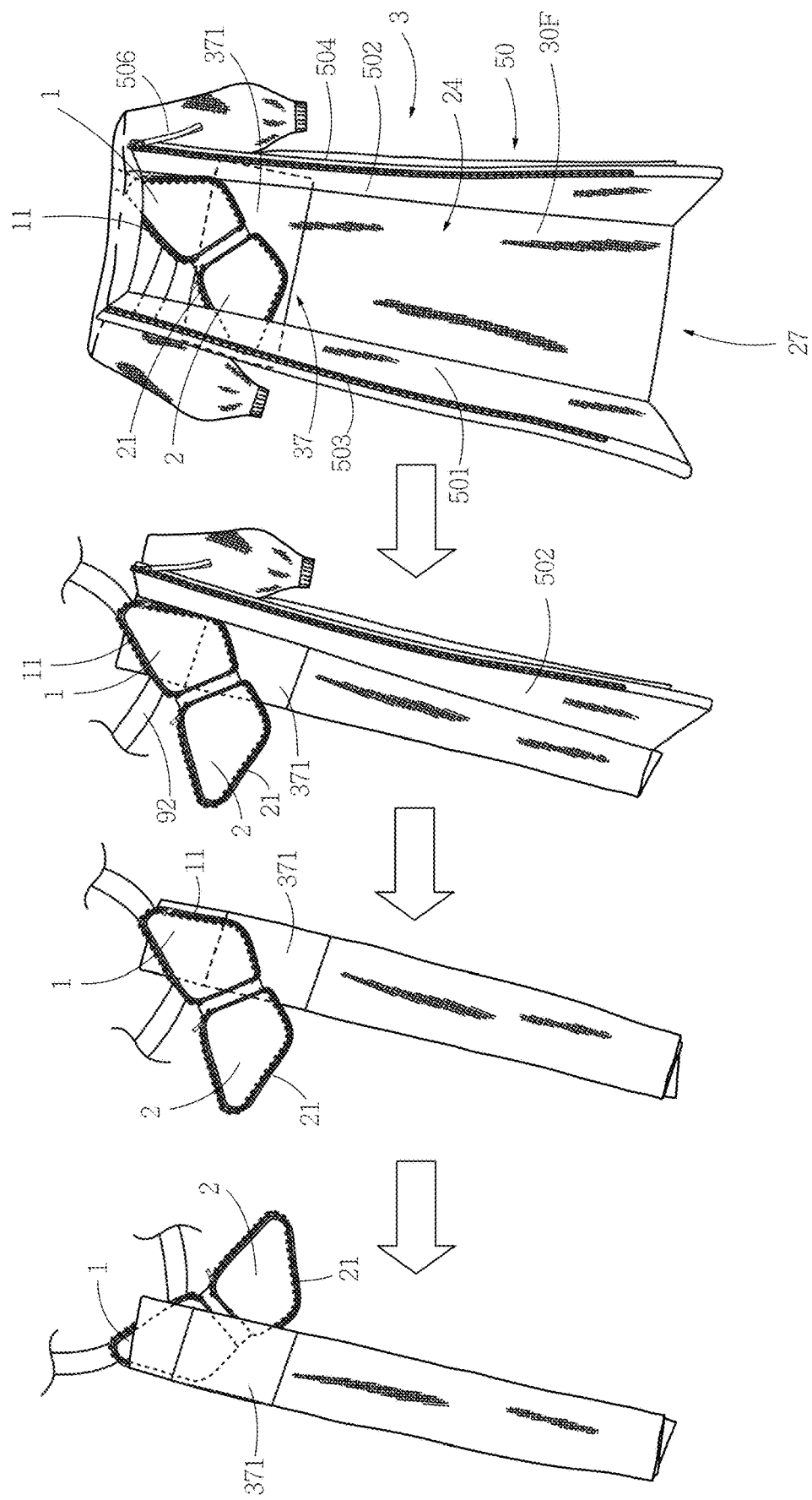
FIG. 47 shows a schematic view of the folding procedure, according to the third embodiment of the present invention.

For the third embodiment, step (a) is to open the exit port 28 by the upper open-close pieces 52 and the upper open-close assemblies 51; step (b) is to open the rear opening 24 by using the pull-back piece 506 to pull the open-close pieces 503 and the open-close assemblies 504; step (c) is to open the left piece 501 and the right piece 502 toward the left and right side from the rear opening 24; step (d) is that the user puts the head and the body out of the rear opening 24 via the exit port 28; and step (e) is to fold the opened left and right pieces 501, 502 forward, and then fold the left and right pieces 501, 502 into a long strip (as shown in FIG. 47).

Figure 50:
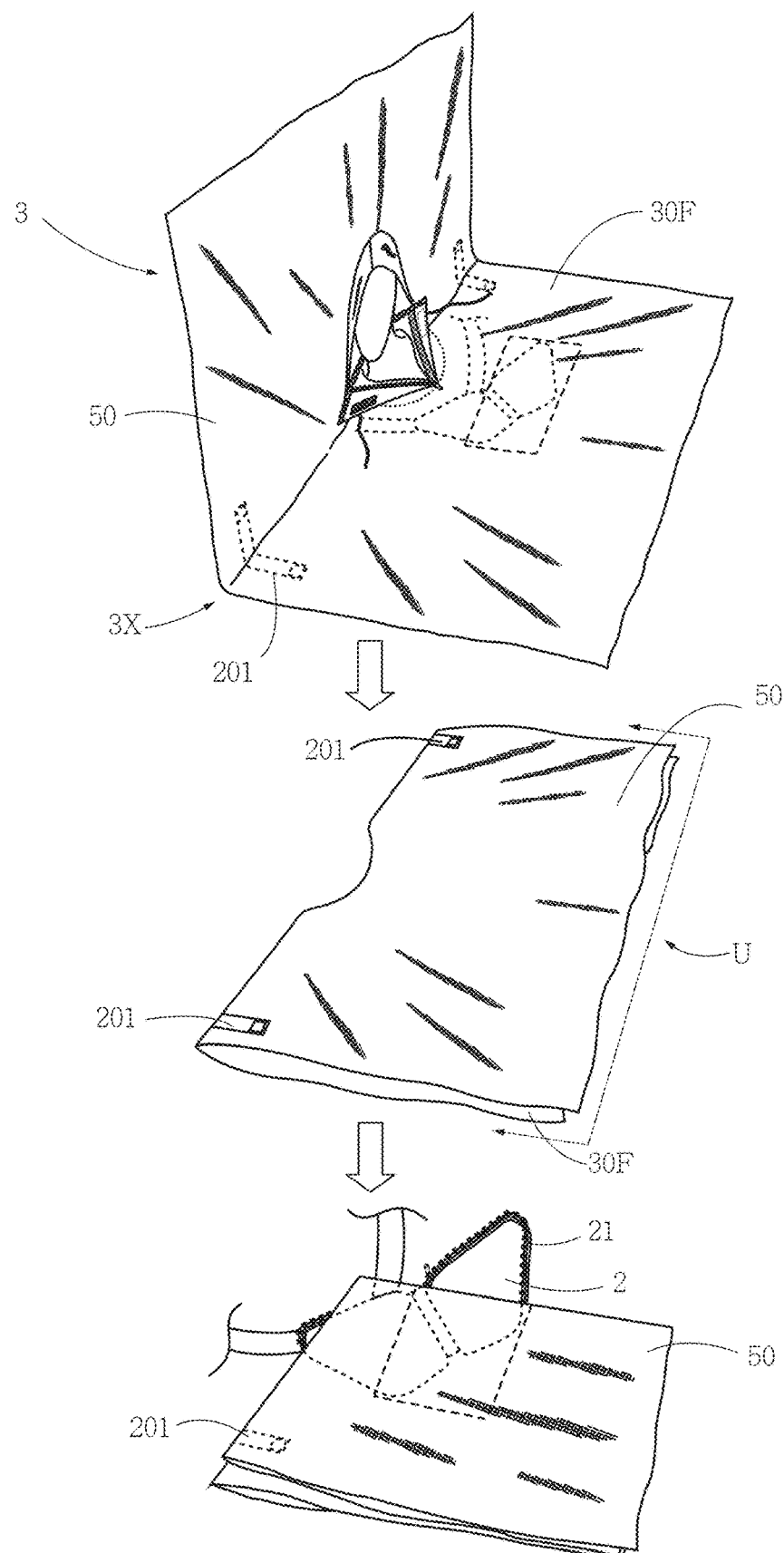
FIG. 50 and FIG. 51 show schematic views of the folding procedure, according to the fourth embodiment of the present invention.
Figure 51:
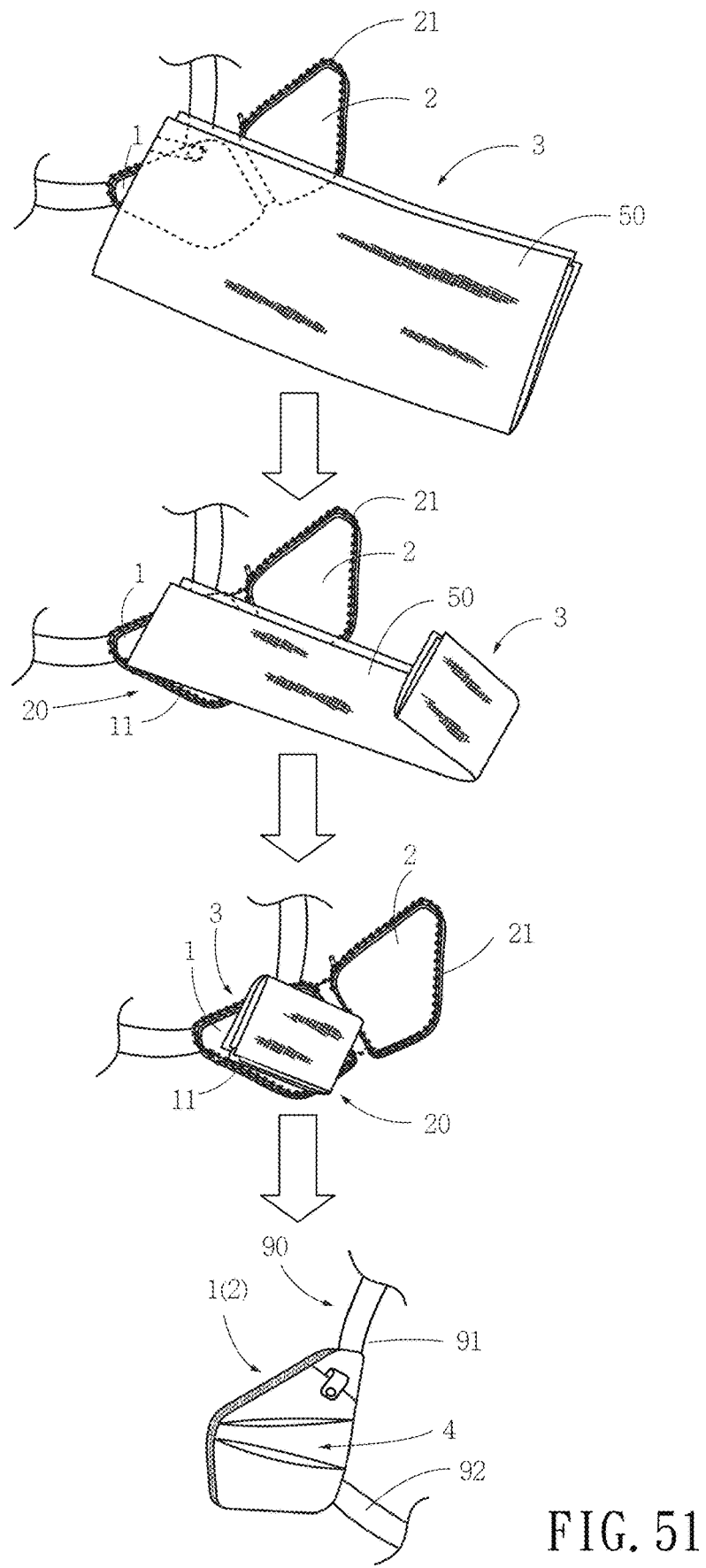

For the fourth embodiment, step (a) is to open the front opening 34 by the front open-close pieces 35 and the front open-close assemblies 36; step (b) is that the user puts the head and the body out of the U-shaped opening U via the exit port 28; step (c) is to fold the rear breadth 50 toward the front breadth 30F, and cover the rear breadth 50 on the front breadth 30F, folding into a half of overlapping condition (as shown in FIG. 13; step (d) is to fold the front breadth 30F, along with the rear breadth 50, into a quarter of overlapping condition (as shown in FIG. 50); and step (e) is to fold the front breadth 30F and the rear breadth 50 that have been folded into the quarter of overlapping condition into a long strip (as shown in FIG. 51).

The steps (a) to (e) are different for the abovementioned first to fourth embodiment; however the following steps (f) and (g) are the same for the first to fourth embodiment. Step (f) is to roll and fold the flexible enclosure 3 that has been folded into the long strip into the retaining space 20 formed between the front cover sheet 1 and the rear cover sheet 2, so as to form the flexible enclosure 3 that fits the size of the holding portion 4; and step (g) is to contain the front breadth 30F and the rear breadth 50 that have been folded into the retaining space 20 by the cover piece 11 and the cover assembly 21, and then close the retaining space 20.

Referring to FIGS. 56 to 62, which show an embodiment of the present invention applied in a covering body for a body protective device, such as a protective clothing or an airbag clothing. The body protective device comprises the front cover sheet 1, which is a jacket 15 formed from a front inner piece 1A and a rear inner piece 1B (see FIGS. 58 and 59), wherein the jacket is provided with openings 15A, 15B and an inner space to enable a user to put on the jacket 15. A rear cover sheet 2 is provided with at least one fixing member 21A and one corresponding fixing member 21B (see FIGS. 56 and 57). A first joining edge 131 is to provided on the front cover sheet 1, a second joining edge 231 is provided on the rear cover sheet 2, and the flexible enclosure 3 is fitted on the outer side of the jacket 15. The flexible enclosure 3 of the present embodiment is a body protective device such as either a protective clothing or an airbag clothing, which is used as an outer clothing or a covering for the wearer. The covering body comprises a third joining edge 331, and either the first joining edge 131 or the second joining edge 231 is used to join together with the third joining edge 331 and securely fix either the front cover sheet 1 or the rear cover sheet 2 to the covering body. A retaining space formed between the front cover sheet 1 and the rear cover sheet 2 is used to retain the folded up covering body; moreover, the fixing members 21A and the corresponding fixing members 21B are further used to close up the front cover sheet 1 and the rear cover sheet 2 (see FIG. 56). When the body protective device is an airbag clothing, the airbag clothing comprises an inner air bag 3D and an outer air bag 3F, wherein the structures of the inner and outer air bags 3D, 3F can be either a single air bag or a plurality of independent air bags. Using a plurality of independent air bags as an example, each of the independent air bags is provided with an independent air chamber and a free end. When in a deflated state, a partial overlapping to configuration is assumed between each of the airbags. When in an inflated state, the air bags are set upright and connected together.

Concrete examples of the present embodiment primarily consist of three configurations. A first configuration is shown in FIGS. 75, 76, and 84 (a cross-sectional view), wherein the rear cover sheet 2 further comprises a first covering piece 2A, which is fitted to the periphery of the jacket 15. The first covering piece 2A is further fitted with a front left covering piece 2AL and a front right covering piece 2AR, wherein the front left covering piece 2AL and the front right covering piece 2AR respectively use the second joining edge 231 and the first joining edge 131 to connect to the front inner piece 1A. The front left, right covering pieces 2AL, 2AR are respectively provided with the at least one fixing member 21A and the corresponding fixing member 21B. The covering body further comprises a front covering body 3A, which comprises a third joining edge 331, wherein either the first joining edge 131 or the second joining edge 231 is used to join together with the third joining edge 331 and securely fix the front inner piece 1A and the front left, right covering pieces 2AL, 2AR to the front covering body 3A (see FIG. 68). The retaining space formed between the front inner piece 1A and the left, right covering pieces 2AL, 2AR is able to retain the folded up front covering body 3A; moreover, the fixing members 21A and the corresponding fixing members 21B are further used to close up the left, right covering pieces 2AL, 2AR. The rear cover sheet 2 further comprises a second covering piece 2B, which is fitted with a rear left covering piece 2BL and a rear right covering piece 2BR, wherein the rear left, right covering pieces 2BL, 2BR are respectively provided with the at least one fixing member 21A and the corresponding fixing member 21B. The covering body further comprises a rear covering body 3B, and the retaining space formed between the rear inner piece 1B and the left, right covering pieces 2BL, 2BR is used to retain the folded up rear covering body 3B, as well as further close up the rear left, right covering pieces 2BL, 2BR using the fixing members 21A and the corresponding fixing members 21B.

Figure 66:
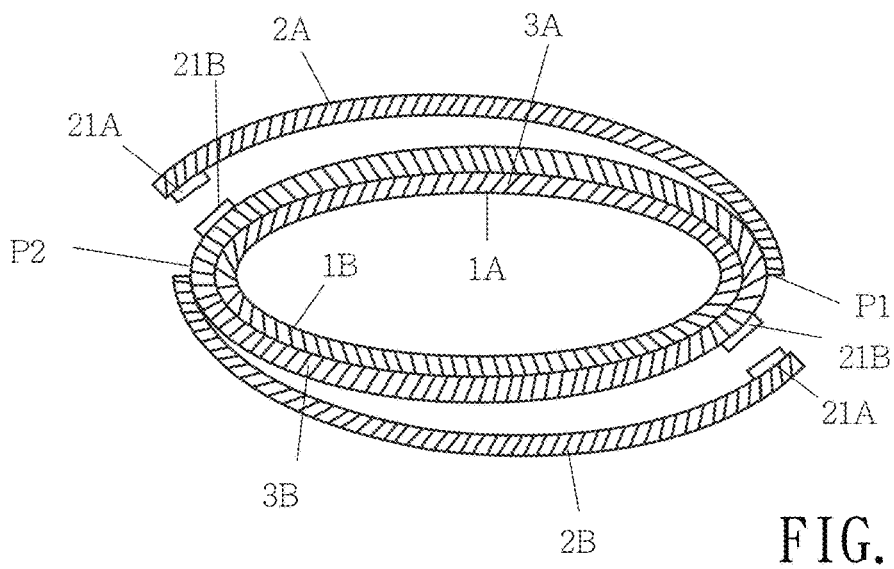
FIG. 66 is a cross-sectional schematic view of a second configurational embodiment of the airbag clothing covering piece applied in the body protective device.

The second configuration of the present embodiment is shown in FIG. 66 (a cross-sectional view), wherein the first covering piece 2A corresponds to the inner piece 1A, and the first covering piece 2A is fitted to the periphery of the front side of the jacket 15; moreover, the starting point of the first covering piece 2A is P1. The fixing members 21A are fitted to the first covering piece 2A, and the corresponding fixing members 21B are fitted to the edge of the front inner piece 1A, wherein the edge of the front inner piece 1A is a terminal point P2. The retaining space formed between the front inner piece 1A and the first covering piece 2A is able to retain the folded up front covering body 3A; moreover, the fixing members 21A and the corresponding fixing members 21B are used to close up the first covering piece 2A. After closing up the first covering piece 2A, starting from point P1, the first covering piece 2A is made to cover the front covering body 3A within the range to the terminal point P2 (the first covering piece 2A can also set P2 as the starting point and P1 as the terminal point). The same structure as described above can also be applied in the second covering piece 2B contained in the rear cover sheet 2, wherein the second covering piece 2B is fitted to the periphery of the rear side of the jacket 15, and the starting point of the second covering piece 2B is P2. The fixing members 21A are fitted to the second covering piece 2B, and the corresponding fixing members 21B are fitted to the edge of the front inner piece 1B. The edge of the front inner piece 1B is the terminal point P1. The covering body further comprises the rear covering body 3B, and the retaining space formed between the rear inner piece 1B and the second covering piece 2B is used to retain the folded up rear covering body 3B, and also closes up the second right covering piece 2B using the fixing members 21A and the corresponding fixing members 21B. After closing up, starting from point P2, the second covering piece 2B is made to cover the rear covering body 3B within the range to the terminal point P1 (the second covering piece 2B can also set P1 as the starting point and P2 as the terminal point).

Figure 67:
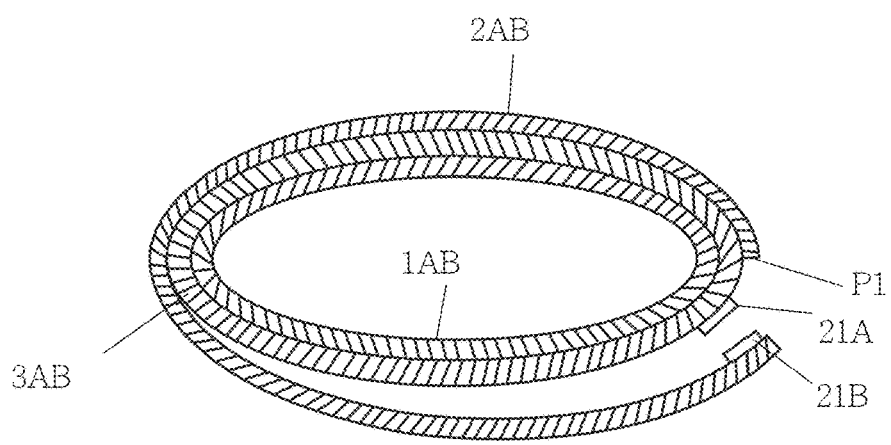
FIG. 67 is a cross-sectional structural schematic view of a third configurational embodiment of the airbag clothing covering piece applied in the body protective device.

The third configuration of the present embodiment is shown in FIG. 67 (a cross-sectional view), wherein the configuration is realized with only the single covering piece 2AB fitted to the periphery of the front side of the jacket 15. The single covering piece 2AB corresponds to the single inner piece 1AB, and the starting point of the single covering piece 2AB is P1. Moreover, the fixing members 21A are fitted to the single covering piece 2AB, and the corresponding fixing members 21B are fitted to the edge of the single inner piece 1AB. The retaining space formed between the single inner piece 1AB and the single covering piece 2AB is able to retain the folded up single covering body 3AB, and also closes up the single covering piece 2AB using the fixing members 21A and the corresponding fixing members 21B. After closing up, the range covered by the single covering piece 2AB includes coiling round once starting from the starting point P1 and returning to the original starting point P1.

Referring to FIGS. 58 to 61, which show the covering body of the present embodiment further comprising an upper covering body 3C, which is fitted to the upper side of the jacket 15, and can be used to cover the head portion of a wearer. In addition, the upper covering body 3C is fitted with an upper inner piece 10 and an upper covering piece 2C, wherein the upper inner piece 10 is provided with a first upper joining edge 1311, and the upper covering piece 2C is provided with a second upper joining edge 1312. The first, second upper joining edges 1311, 1312 are joined together, and the retaining space formed between the upper inner piece 10 and the upper covering piece 2C is used to retain the folded up upper covering body 3C. The upper inner piece 10 and the upper covering piece 2C are respectively provided with the fixing members 21A and the corresponding fixing members 21B; moreover, the upper inner piece 10 and the upper covering piece 2C are also closed up using the fixing members 21A and the corresponding fixing members 21B. The upper covering body 3C further comprises a plurality of pleats 310, 320, 330, and in a folded state, the plurality of pleats 310, 320, 330 are used to collect together and fold up the upper covering body 3C.

Figure 59:
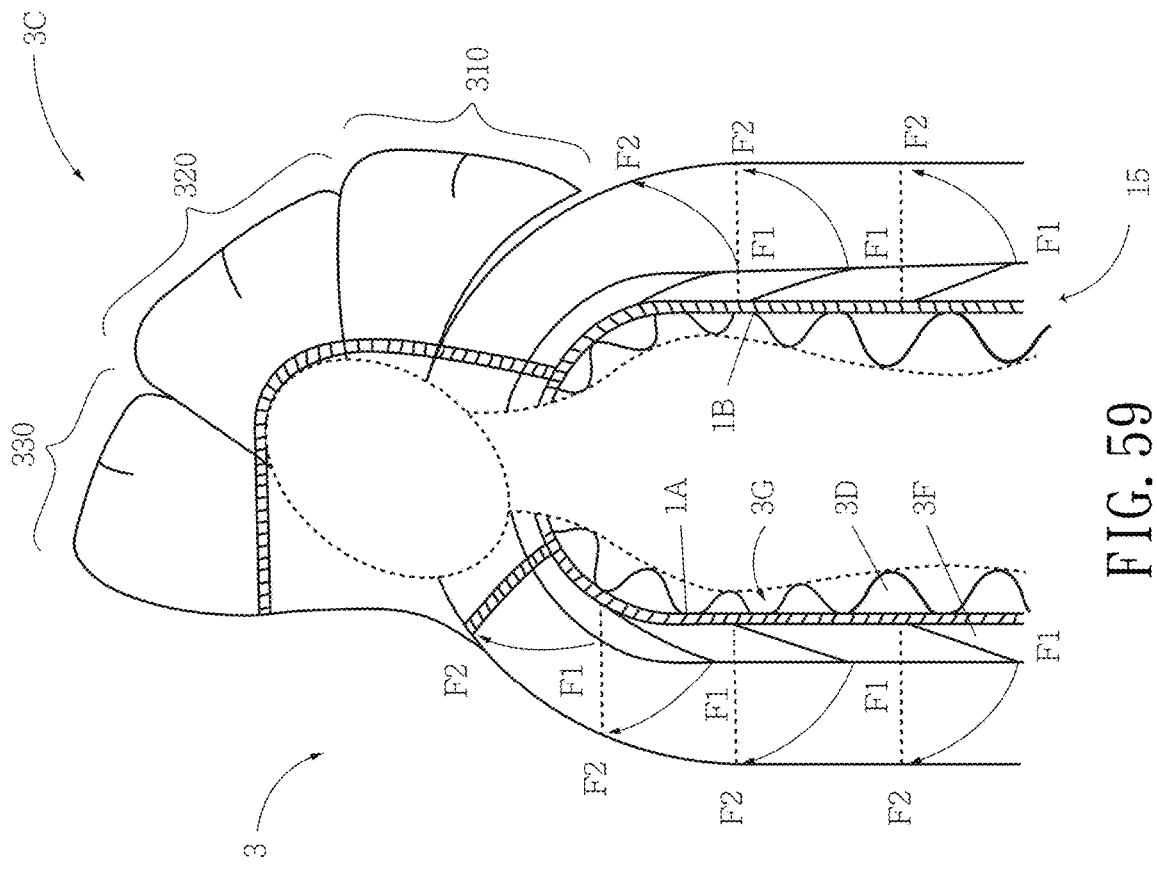
FIGS. 58 and 59 show lengthwise sectional schematic views of the covering body applied in the embodiment of an airbag clothing covering piece for the body protective device.
Figure 58:
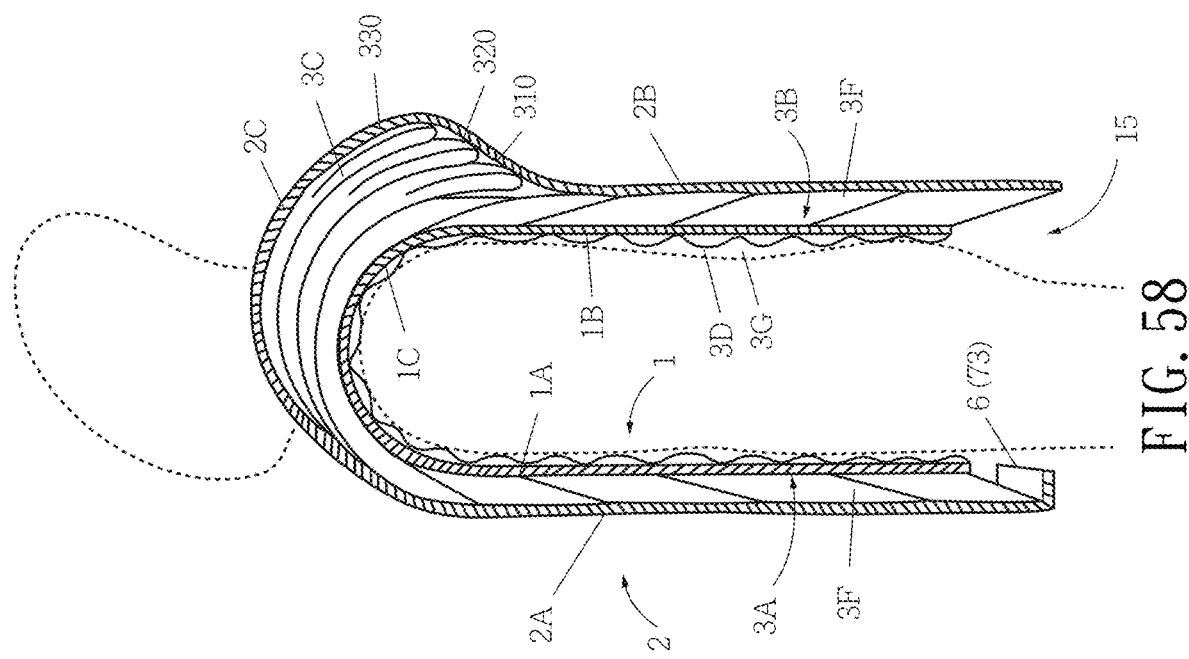
Figure 60:
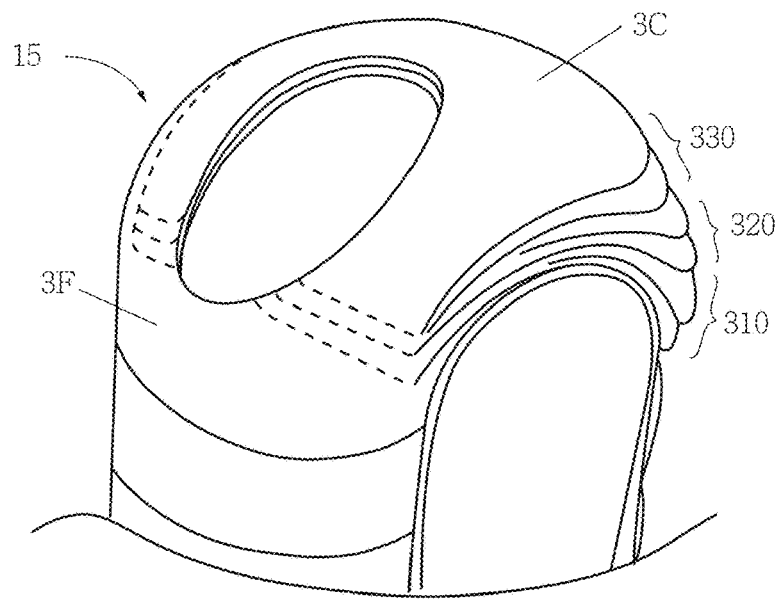
FIG. 60 is a perspective structural schematic view of the present invention applied in the embodiment of the airbag clothing covering piece of the body protective device.
Figure 61:
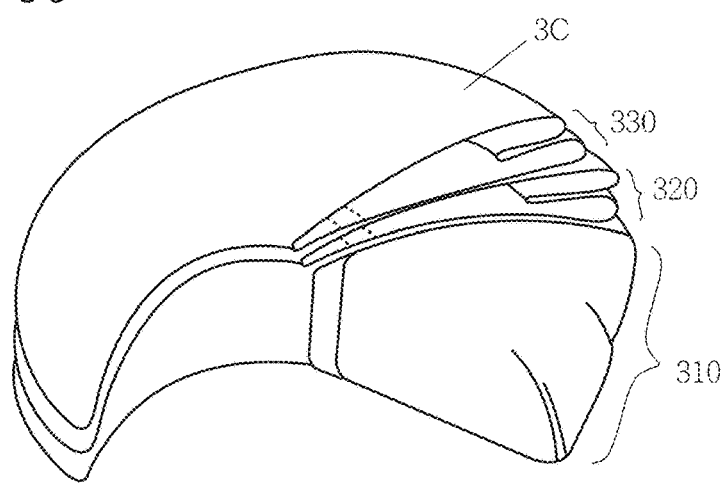
FIG. 61 is a partial lengthwise sectional view of FIG. 60 according to the present invention.
Figure 62:
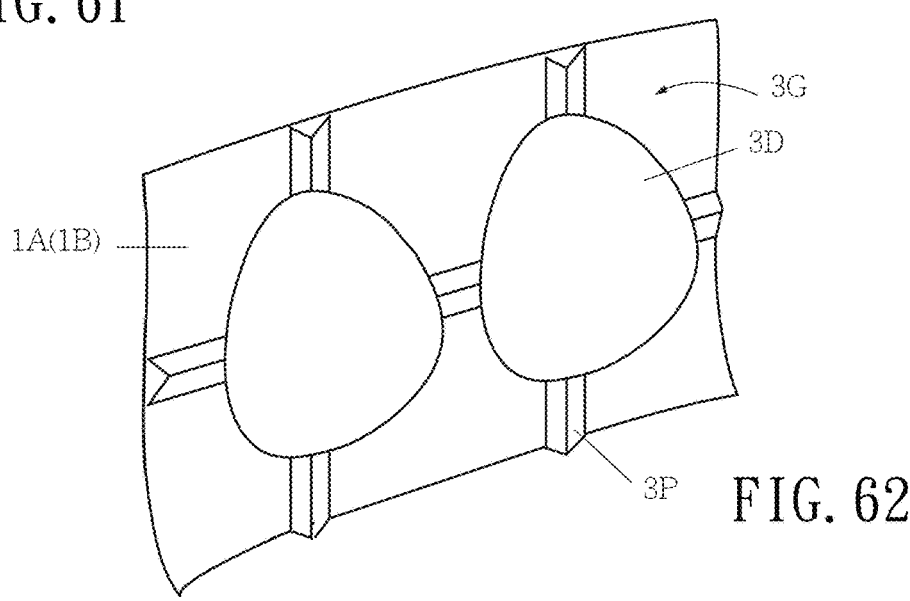
FIG. 62 is a partial structural schematic view of FIGS. 58 and 59 according to the present invention.

In addition, referring to FIGS. 58, 59, and 62, the front inner piece 1A, the rear inner piece 1B, and the upper inner piece 10 of the present embodiment positioned on one side of the inner space of the jacket 15 are provided with a plurality of supporting protrusions 3D. Connective channels 3P are provided between the plurality of supporting protrusions 3D, and the connective channels 3P are used to channel air to the interior of the supporting protrusions 3D, thereby causing the supporting protrusions 3D to form bulging structures provided with adequate supporting force. The inner space of the jacket 15 contacts one side of the wearer's body and is used to form a protective effect; moreover, because the plurality of supporting protrusions 3D assume a transverse, longitudinal, or diagonal arrangement, thus, long gaps 3G are also formed between the rows and columns of the supporting protrusions 3D. When the protective clothing or airbag clothing unfolds and inflates, the wearer's hands are free to carry out other operations using the long gaps 3G, for example: operating survival equipment or a mobile phone, eating and drinking, taking things out from their clothing pockets or carry bag, etc.

Figure 63:
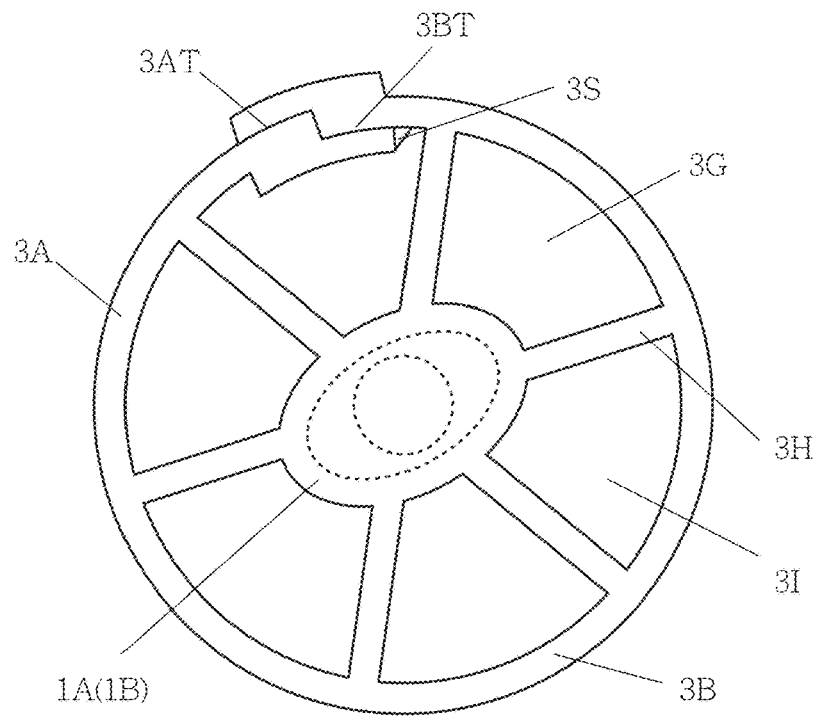
FIG. 63 is a cross-sectional structural schematic view of the covering body applied in the embodiment of a hollow spherical body for a body protective device.
Figure 64:
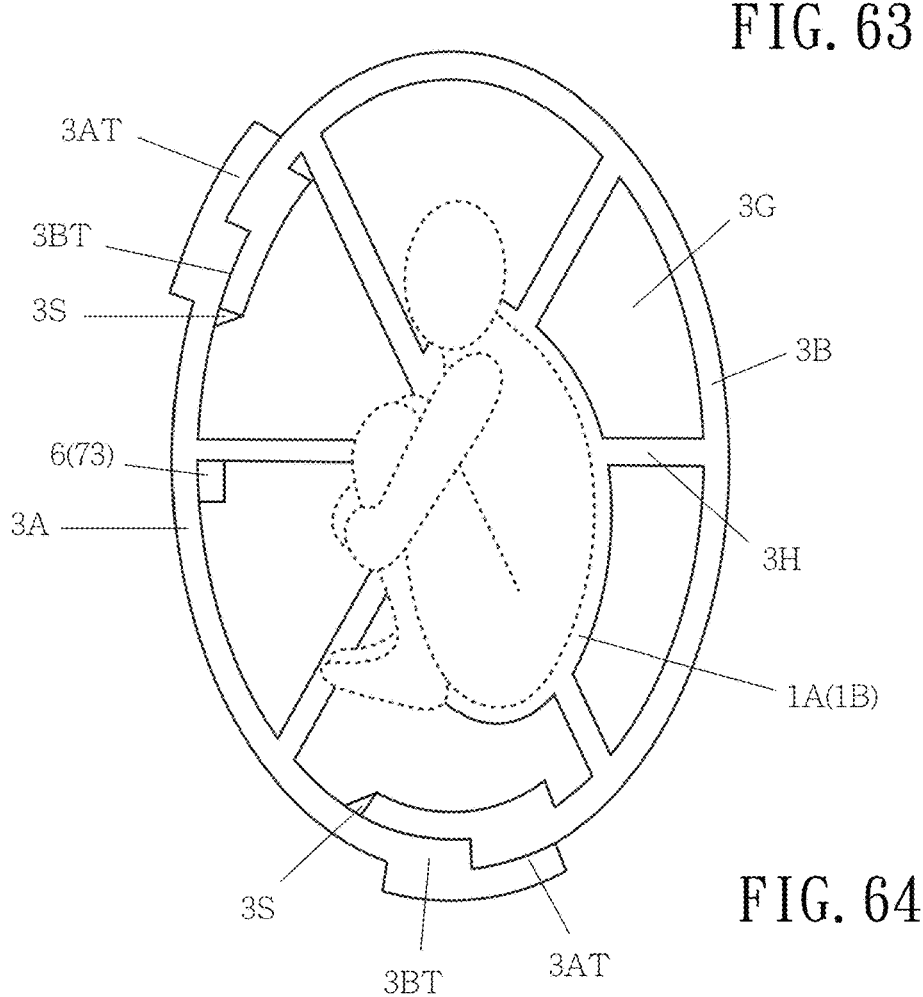
FIG. 64 is a lengthwise sectional structural schematic view of the covering body applied in the embodiment of the hollow spherical body for the body protective device.
Figure 65:
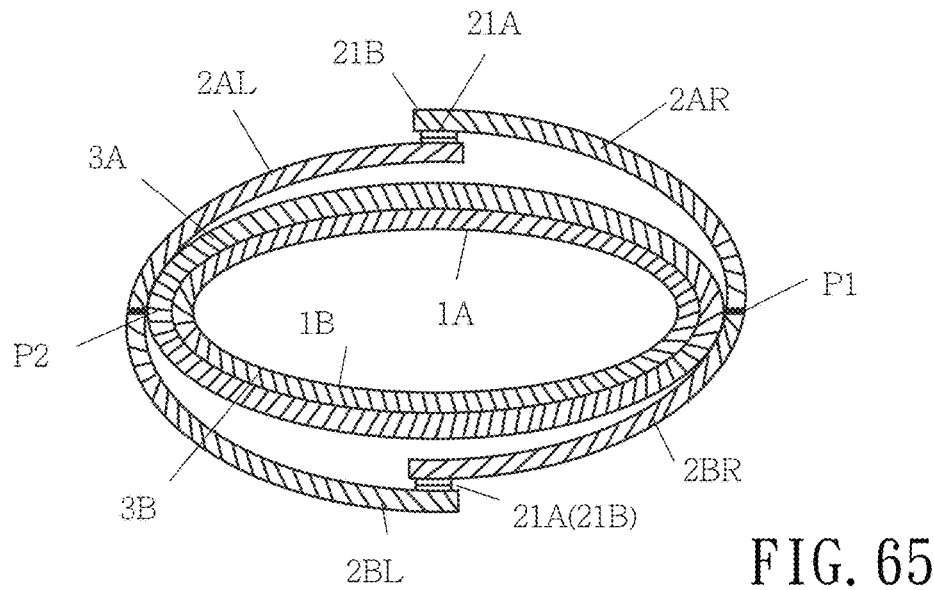
FIG. 65 is a cross-sectional schematic view of a first configurational embodiment of the airbag clothing covering piece applied in the body protective device.
Figure 68:
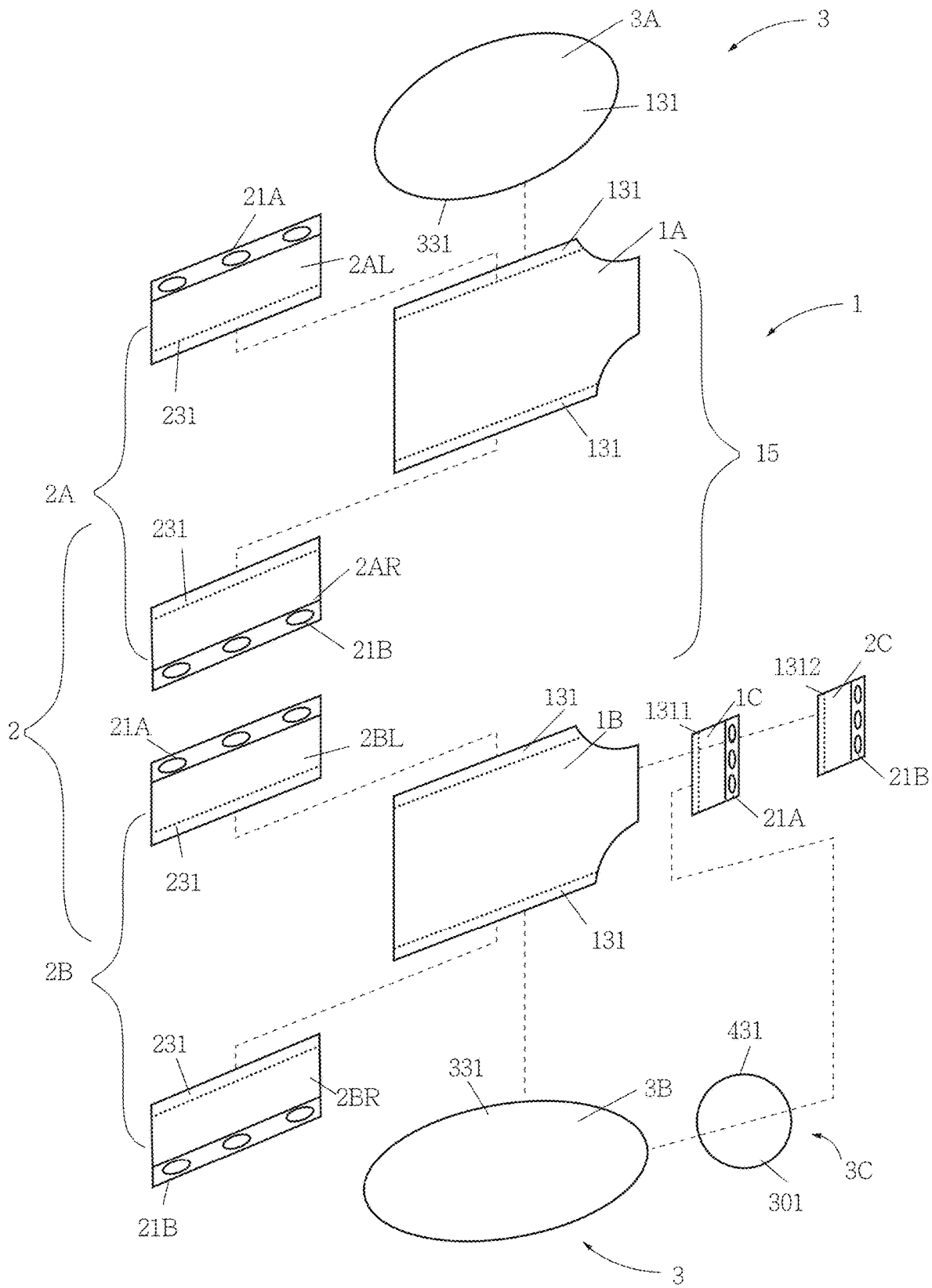
FIG. 68 is an exploded structural schematic view of the covering body applied in the body protective device according to the present invention.

Referring to FIGS. 63, 64, and FIG. 68, which show an embodiment of the present invention applying the covering body in a body protective device, such as a hollow spherical body or a hollow airbag. The body protective device is provided with a plurality of supporting columns 3H, which are either inflatable air cylindrical body structures or foldable elastic cylindrical bodies. In addition, the plurality of supporting columns 3H are connected to either the front inner piece 1A or the rear inner piece 1B, with the plurality of supporting columns 3H used to support and fix the configurational shape of the exterior of the hollow spherical body or the hollow airbag by causing the exterior to assume an airbag cover body with a spherical body shape, circular shape, or an elliptical shape. When the supporting columns 3H are configured as air column structures, connective inflating channels are provided between the air column structures and the hollow spherical body or the surface of the hollow spherical body. The surface of the hollow spherical body or the hollow airbag can be configured as a single sheet flat surface or a plurality of airbag surfaces. A structure with a plurality of independent airbags structure can be adopted when configured as a plurality of airbags, such as the outer air bags 3F shown in FIGS. 58 and 59, with each of the independent airbags provided with an independent air chamber and a free end. When in an deflated state, the airbags assume a partial overlapping configuration, and when in an inflated state, the air bags are set upright and connected together. The hollow spherical body or the hollow airbags either comprise at least the front cover sheet 1 or to the rear cover sheet 2, and further comprises at least one joining opening, which is formed from the joining of two joining ends 3AT, 3BT. In addition, each of the joining openings is provided with a sealing member 3S, which can be either a zipper, hook and loop fastener, magnetic fastener, or zipper adhesive tape.

Figure 69:
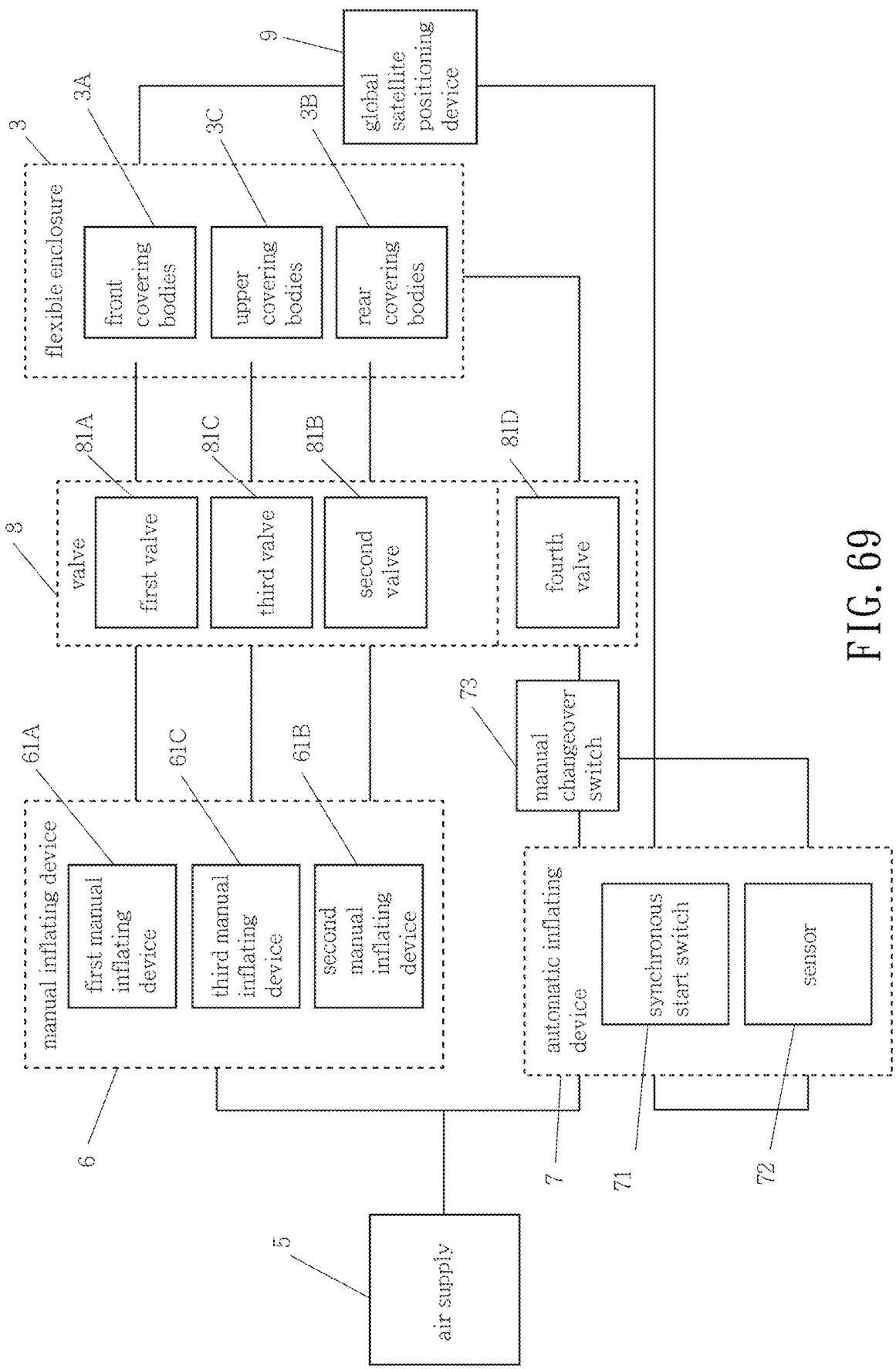
FIG. 69 is an operational flow diagram of the covering body applied in the body protective device according to the present invention.
Figure 70:
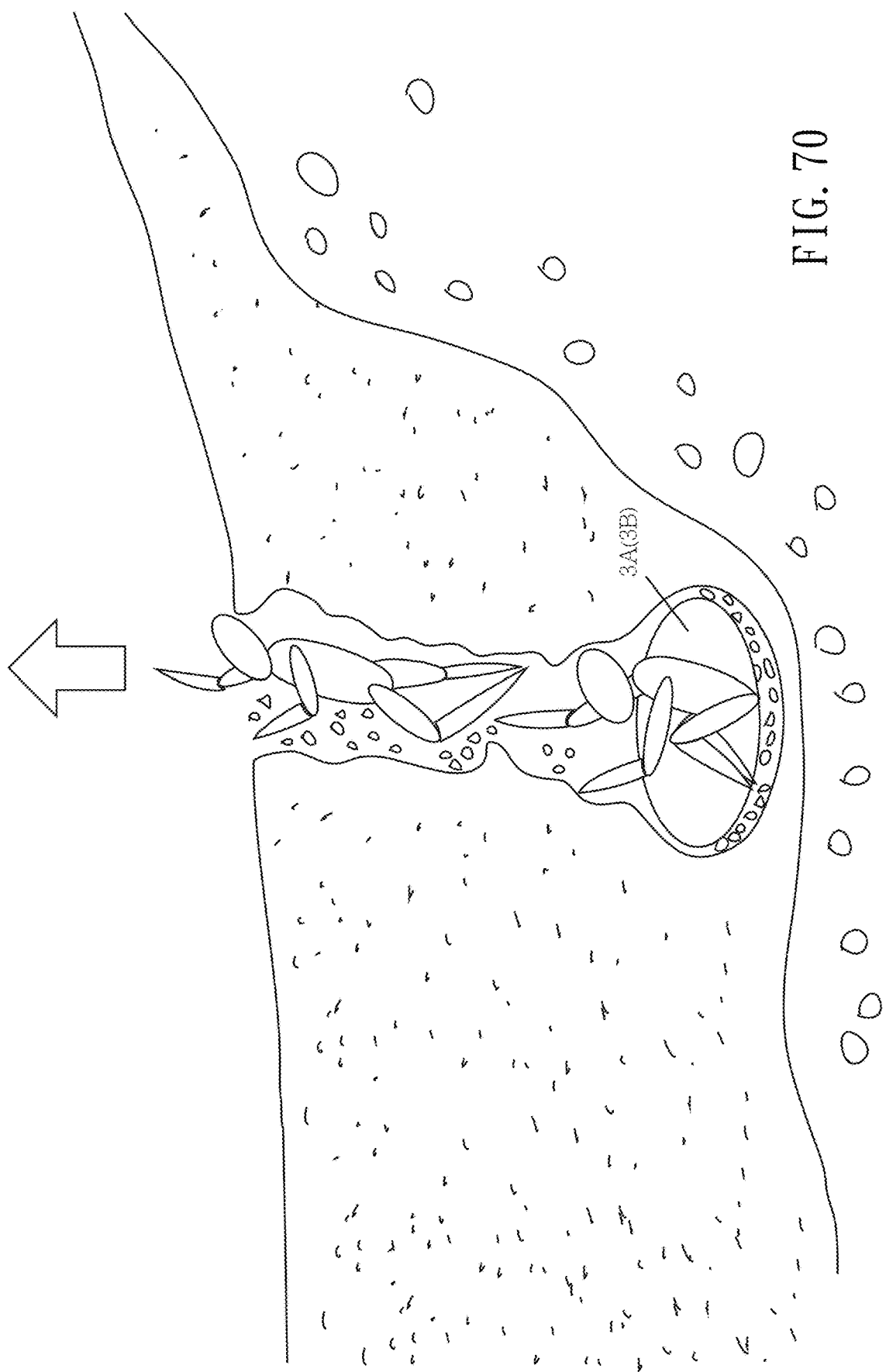
FIG. 70 is a schematic view of the covering body applied in the body protective device during an outdoor emergency situation.

Referring to FIG. 69, wherein a body protective device comprises either an air supply 5, a manual inflating device 6, or an automatic inflating device 7, wherein the air supply 5 can be an inflation tube, a pump, or a pressure bottle. The manual inflating device 6 is fitted with a valve 8 for the purpose of respectively channeling air from the air supply 5 to inside the fitted airbags at the front, rear, and upper covering bodies 3A, 3B, and 3C, which respectively use a first, second, and third manual inflating device 61A, 61B, and 61C to control opening of a first, second, and third valve 81A, 81B, and 81C, thereby achieving the objective of inflating the airbags. in an emergency situation, the jacket wearer can carry out a manual inflating operation respectively on the front, rear, or upper covering bodies 3A, 3B, 3C according to circumstances (see FIG. 58 or 64). The automatic inflating device 7 is fitted with a synchronous start switch 71, a sensor 72, and a manual changeover switch 73. In an emergency situation, the sensor 72 transmits a signal to the synchronous start switch 71 to open a fourth valve 81D and channel in air from the air supply 5 to enable achieving the objective of inflating the airbags. Under certain conditions, when the sensor 72 malfunctions or is inappropriate to auto-start, the manual changeover switch 73 can be used to control the fourth valve 81D (see FIG. 58 or 64). In addition, the body protective device can further comprise a global satellite positioning device 9, which is connected to the synchronous start switch 71 and the sensor 72 (see FIG. 59). In an emergency situation, the sensor 72 can automatically transmit a satellite positioning signal to facilitate rescuing the accident victim. The front manual inflating device 6 comprises a device such as a conventional inflation tube, pump, or a one-way valve, and further comprises a device to open the valve, such as a pull cord or water soluble material using various types of physical or chemical principles.

When the body protective device of the present invention is applied in mountain-climbing activities as an example, and a climber accidentally falls into a valley, the sensor 72 immediately transmits a signal to the synchronous start switch 71, causing the fourth valve 81D to open and channel air from the air supply 5 to achieve the effect of inflating the airbags of the covering body, forming an elliptical shaped or circular shaped body protective device that covers the wearer's body, thereby protecting the wearer from otherwise fatal injuries from falling into a valley. In particular, should an avalanche occur when climbing a high snow-capped mountain (see FIG. 70), and the wearer is buried under an accumulation of snow from the avalanche, because of the gaps 3G fitted inside the covering body (see FIG. 59 or 64), the wearer is able to manipulate or separate themself from the body protective device and use the space occupied by the body protective device after being buried by the accumulation of snow to slowly, upwardly dig themself out from the accumulation of snow, causing the accumulation of snow to fall into the occupied space as they dig upward, finally seeking help on the surface away from the snow dugout. Apart from having use in activities such as skiing, mountain-climbing, etc., the body protective device can also be used when riding a motorcycle, in water activities such as boating, aerial activities such as paragliding and hand gliding, etc., or after pairing with essential life support equipment, can also be further applied in safety equipment for passengers travelling by airplane. According to the criteria required for each of the activities described above (such as: temperature, speed, altitude, pressure, impact force, etc.), the sensor 72 can be set to transmit the appropriate signal to the synchronous start switch 71 and when to transmit the signal.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A body-worn structure, comprising:
a support enclosure provided with a front harness, the front harness being provided with a first traverse belt and a second transverse belt, the first traverse belt being connected with the second traverse belt, the first traverse belt and the second traverse belt being placed in a lateral direction respectively; wherein
two ends of the first traverse belt are respectively fitted with left and right female buckles toward a rear side and are configured to receive left and right male buckles respectively, the left and right female buckles are replaceable alternatively by the left and right male buckles and vise versa,
one end of the second traverse belt is provided with a second traverse belt male buckle and another end of the second traverse belt is provided with a corresponding second traverse belt female buckle to facilitate clasping with the second traverse belt male buckle at an upper side; either side of the second traverse belt male buckle or the second traverse belt female buckle is provided with at least a fixing ring; the second traverse belt female buckle is replaceable alternatively by the second traverse belt male buckle and vise versa;
wherein the support enclosure further comprises a rear harness, and the rear harness comprises a third transverse belt; the third transverse belt is respectively fitted with the left and right male buckles fitted at two ends thereof corresponding to the left and right female buckles fitted at the two ends of the first traverse belt, thereby facilitating forming left and right assembly sections after mutual connection thereof; the two ends of the second traverse belt are respectively fitted with the second traverse belt male buckle and the corresponding second traverse belt female buckle to facilitate forming a front connected section after being clasped; the two ends of the third transverse belt are respectively provided with a third traverse belt male buckle and a corresponding third traverse belt female buckle to facilitate clasping each other together and forming a rear connected section; after assembling the front harness and the rear harness, a square belt harness structure is formed, wherein the square belt structured support enclosure provides for mounting a holding portion selectively; the first, second and third traverse belt female buckles are replaceable alternatively by the first, second and third traverse belt male buckles and vise versa.

2. The body-worn structure according to claim 1, wherein two sides of the holding portion are respectively provided with a side portion and a fixing member is disposed on the side portion, and corresponding fixing members are either disposed on the main body of the holding portion or on the side portions; the fixing members and the side portions are configured to be folded toward the corresponding fixing members to fasten each other by joining the fixing members and corresponding fixing members together and to cover and fix either the left or right assembly sections or the front or rear connected sections therebetween, thus enabling positioning the holding portion on the upper side of the square belt structured support enclosure.

* * * * *